(12) United States Patent
Aoki et al.

(10) Patent No.: US 7,734,668 B2
(45) Date of Patent: Jun. 8, 2010

(54) INFORMATION MANAGEMENT SYSTEM, INFORMATION PROCESSING DEVICE, AND PROGRAM

(75) Inventors: Kazuma Aoki, Kasugai (JP); Satoshi Watanabe, Kasugai (JP); Satoru Yanagi, Nagoya (JP); Kazushige Muroi, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 283 days.

(21) Appl. No.: 11/492,901

(22) Filed: Jul. 26, 2006

(65) Prior Publication Data
US 2007/0027834 A1    Feb. 1, 2007

(30) Foreign Application Priority Data

| Jul. 26, 2005 | (JP) | ............................ P2005-215939 |
| Jul. 26, 2005 | (JP) | ............................ P2005-215940 |
| Jul. 26, 2005 | (JP) | ............................ P2005-215942 |

(51) Int. Cl.
G06F 17/30 (2006.01)
(52) U.S. Cl. ...................................... 707/827; 709/230
(58) Field of Classification Search ........................ None
See application file for complete search history.

(56) References Cited

U.S. PATENT DOCUMENTS

| 5,361,134 | A | * | 11/1994 | Hu et al. ...................... 358/296 |
| 5,361,173 | A | * | 11/1994 | Ishii et al. ...................... 360/27 |
| 5,371,873 | A | * | 12/1994 | Niwa ............................. 710/20 |
| 5,610,980 | A | * | 3/1997 | Johnson et al. ............. 713/189 |
| 5,813,009 | A | * | 9/1998 | Johnson et al. ............. 707/100 |
| 5,864,679 | A | * | 1/1999 | Kanai et al. .................. 709/238 |
| 6,119,117 | A | | 9/2000 | Yoda et al. |
| 6,219,768 | B1 | * | 4/2001 | Hirabayashi et al. ......... 711/154 |
| 6,229,620 | B1 | * | 5/2001 | Makitani et al. ............ 358/1.15 |
| 6,370,546 | B1 | * | 4/2002 | Kondo ......................... 707/201 |
| 2002/0052907 | A1 | | 5/2002 | Wakai et al. |
| 2002/0059227 | A1 | * | 5/2002 | Narahara ......................... 707/6 |
| 2002/0097262 | A1 | * | 7/2002 | Iwase et al. ................... 345/744 |
| 2002/0114001 | A1 | * | 8/2002 | Oyanagi ..................... 358/1.15 |
| 2002/0181006 | A1 | * | 12/2002 | Chrisop et al. ............. 358/1.14 |
| 2003/0110132 | A1 | * | 6/2003 | Sako ............................ 705/51 |
| 2004/0184066 | A1 | * | 9/2004 | Urabe ....................... 358/1.14 |
| 2006/0221383 | A1 | * | 10/2006 | Katsurabayashi ........... 358/1.15 |

FOREIGN PATENT DOCUMENTS

| JP | 10-40068 | 2/1998 |
| JP | 10-63151 | 3/1998 |

(Continued)

*Primary Examiner*—Pierre M Vital
*Assistant Examiner*—Augustine Obisesan
(74) *Attorney, Agent, or Firm*—McDermott Will & Emery LLP

(57) ABSTRACT

An information management system comprises: an external device a comprising interactive communication unit that interactively communicates with an interactive communication device through a public telephone line; an information processing device connected to the external device in a communication-practicable manner; and a third storage unit that stores utilization data, which is accessed by the external device and the information processing device. When a period specified by a start and end of a communication performed by the interactive communication unit of the external device and a period specified by the start and end of utilization of the utilization data overlap with each other, the utilization data are correlated with the communication of the interactive communication unit.

34 Claims, 28 Drawing Sheets

FOREIGN PATENT DOCUMENTS

| | | |
|---|---|---|
| JP | 10-240457 | 9/1998 |
| JP | 10-254719 | 9/1998 |
| JP | 11-39293 | 2/1999 |
| JP | 11-239259 | 8/1999 |
| JP | 2000-076109 | 3/2000 |
| JP | 2000-181759 | 6/2000 |
| JP | 2000-207018 | 7/2000 |
| JP | 2000-315203 | 11/2000 |
| JP | 2000-353172 | 12/2000 |
| JP | 2001-084032 | 3/2001 |
| JP | 2001-084206 | 3/2001 |
| JP | 2001-337895 | 12/2001 |
| JP | 2002-171515 | 6/2002 |
| JP | 2003-186348 | 7/2003 |
| JP | 2004-32085 | 1/2004 |
| JP | 2004-199667 | 7/2004 |
| JP | 2004-348685 | 12/2004 |
| JP | 2005-198231 | 7/2005 |

* cited by examiner

FIG. 2A

| ID | START TIME | END TIME | STATUS ID | DESTINATION ADDRESS | TARGET DOCUMENT ADDRESS | AMOUNT |
|---|---|---|---|---|---|---|
| sid1 | 20xx/xx/xx xx:xx:xx | 20xx/xx/xx xx:xx:xx | PRN | | file://**//** | 1 |
| sid2 | 20xx/xx/xx xx:xx:xx | 20xx/xx/xx xx:xx:xx | FXT | 05x-xxx-xxxx | file://**//** | |
| sid3 | 20xx/xx/xx xx:xx:xx | 20xx/xx/xx xx:xx:xx | PRN | | http://**//** | 2 |
| sid4 | 20xx/xx/xx xx:xx:xx | 20xx/xx/xx xx:xx:xx | BKX | 4-xxxx-xxxx-x | http://**//** | 30 |

FIG. 2B

| STATUS | STATUS ID | GID | DESTINATION ADDRESS | TARGET DOCUMENT ADDRESS | AMOUNT |
|---|---|---|---|---|---|
| PC PRINT | PRN | 1 | NONE | ADDRESS OF PRINTED DOCUMENT | NUMBER OF COPIES |
| PC FAX TRANSMISSION | FPT | 2 | DESTINATION FAX NUMBER | ADDRESS OF TRANSMITTED DOCUMENT | NONE |
| PC FAX RECEPTION | FPR | 2 | SOURCE FAX NUMBER | ADDRESS OF RECEIVED DOCUMENT | NONE |
| SCAN-TO-PC | SCN | 0 | NONE | ADDRESS OF SCANNED IMAGE | NONE |
| SCAN-TO-MEDIA | SCM | 0 | NONE | ADDRESS OF SCANNED IMAGE (COPIED TO PC) | NONE |
| SCAN-TO-MAIL | SML | 2 | DESTINATION MAIL ADDRESS | ADDRESS OF TRANSMITTED IMAGE (COPIED TO PC) | NONE |
| FAX TRANSMISSION | FXT | 2 | FAX NUMBER OF DESTINATION | ADDRESS OF TRANSMITTED IMAGE (COPIED TO PC) | NONE |
| FAX RECEPTION | FXR | 2 | SOURCE FAX NUMBER | ADDRESS OF RECEIVED IMAGE (COPIED TO PC) | NONE |
| COPY | CPY | 0 | NONE | ADDRESS OF COPIED IMAGE (COPIED TO PC) | NUMBER OF COPIES |
| EMISSION OF TELEPHONE CALL | TLT | 2 | DESTINATION TELEPHONE NUMBER | ADDRESS OF COMMUNICATION SOUND (COPIED TO PC) | COMMUNICATION TIME |
| RECEPTION OF TELEPHONE CALL | TLR | 2 | TELEPHONE NUMBER OF SOURCE | ADDRESS OF COMMUNICATION SOUND (COPIED TO PC) | COMMUNICATION TIME |
| MEDIA PRINT | PRM | 0 | NONE | ADDRESS OF PRINTED IMAGE (COPIED TO PC) | NUMBER OF COPIES |
| BOOK | BKX | 2 | ISBN | ADDRESS OF BOOK INTRODUCING HP (SEARCHED) | TIME (MINUTE) |

FIG. 3

| ID | TIME | DOCUMENT ADDRESS | EVENT | APPLICATION | OPERATOR |
|---|---|---|---|---|---|
| did1 | 20xx/xx/xx xx:xx:xx | file://****/d1 | create | MULTIFUNCTION MACHINE A | user2 |
| did2 | 20xx/xx/xx xx:xx:xx | file://****/d2 | open | EDITOR | user1 |
| did3 | 20xx/xx/xx xx:xx:xx | file://****/d2 | update | EDITOR | user1 |
| did4 | 20xx/xx/xx xx:xx:xx | file://****/d1 | open | VIEWER | user2 |
| did5 | 20xx/xx/xx xx:xx:xx | file://****/d2 | print | EDITOR | user1 |
| did6 | 20xx/xx/xx xx:xx:xx | file://****/d3 | open | MAILER | user1 |
| did7 | 20xx/xx/xx xx:xx:xx | file://****/d3 | send | MAILER | user1 |
| did8 | 20xx/xx/xx xx:xx:xx | file://****/d2 | close | EDITOR | user1 |

FIG. 4

| ID | REGISTRATION TIME | PAPER FILE ID | DOCUMENT ADDRESS |
|---|---|---|---|
| pid1 | 20xx/xx/xx xx:xx:xx | xxx1 | file://###/###/### |
| pid2 | 20xx/xx/xx xx:xx:xx | xxx2 | file://###/###/### |
| pid3 | 20xx/xx/xx xx:xx:xx | xxx1 | file://###/###/### |

FIG. 5

| DEVICE TYPE | DEVICE ID |
|---|---|
| MULTIFUNCTION MACHINE | MULTIFUNCTION MACHINE ID1 |
| BOOK SENSOR | BOOK SENSOR ID2 |
| PAPER FILE READER | PAPER FILE READER ID3 |

FIG. 6

| ID | WEIGHT |
|---|---|
| did100 | 1 |
| did101 | 2 |

FIG. 10A

THIS DOCUMENT IS PREVIOUSLY PRINTED IN 200x/xx/xx xx:xx:xx
CHECK # ★ ★ ★ ★ FILE

FIG. 10B

THIS DOCUMENT IS PREVIOUSLY PRINTED IN 200x/xx/xx xx:xx:xx

FIG. 10C

THIS DOCUMENT IS PREVIOUSLY TRANSMITTED TO OO IN
200x/xx/xx xx:xx:xx

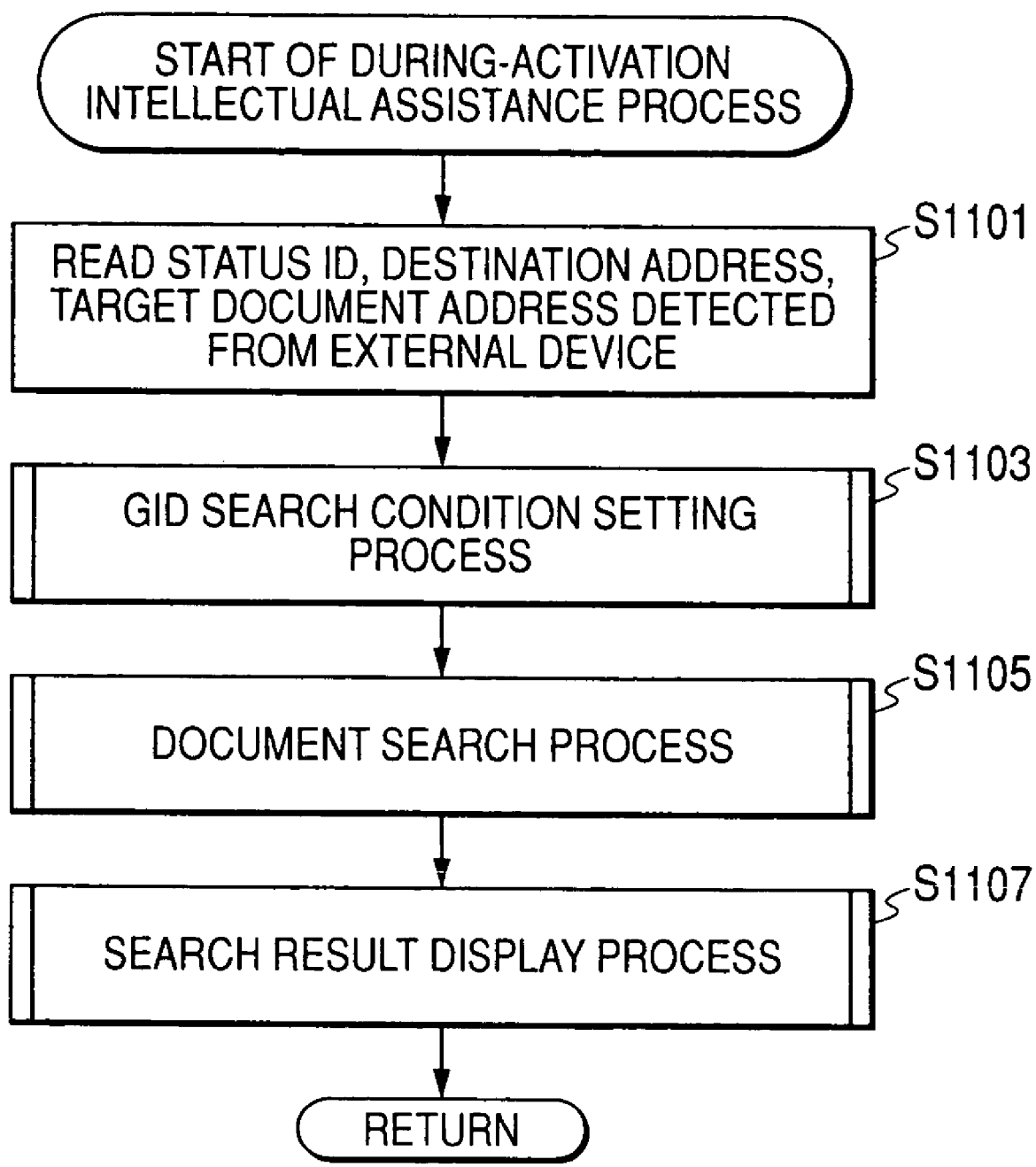

FIG. 20

THIS DOCUMENT WAS PRINTED PREVIOUSLY

| ADDRESS | TIME | REFERENCE NUMBER |
|---|---|---|
| • file://###/###/### | x/x xx:xx:xx | x |
| • file://###/###/### | x/x xx:xx:xx | x |
| • file://###/###/### | x/x xx:xx:xx | x |

FIG. 21

THE FOLLOWING DOCUMENTS ARE OPENED WHEN PRINTING THIS DOCUMENT WAS PREVIOUSLY PRINTED

| ADDRESS | TIME | REFERENCE NUMBER |
|---|---|---|
| • file://###/###/### | x/x xx:xx:xx | x |
| • file://###/###/### | x/x xx:xx:xx | x |
| • file://###/###/### | x/x xx:xx:xx | x |

FIG. 22

TELEPHONE COMMUNICATION WITH THIS PERSON WAS PERFORMED PREVIOUSLY

| ADDRESS | TIME | REFERENCE NUMBER |
|---|---|---|
| • file://###/###/### | x/x xx:xx:xx | x |
| • file://###/###/### | x/x xx:xx:xx | x |
| • file://###/###/### | x/x xx:xx:xx | x |

FIG. 23

THE FOLLOWING DOCUMENTS WERE OPENED WHEN TELEPHONE COMMUNICATION WITH THIS PERSON WAS PREVIOUSLY PERFORMED

| ADDRESS | TIME | REFERENCE NUMBER |
|---|---|---|
| • file://###/###/### | x/x xx:xx:xx | x |
| • file://###/###/### | x/x xx:xx:xx | x |
| • file://###/###/### | x/x xx:xx:xx | x |

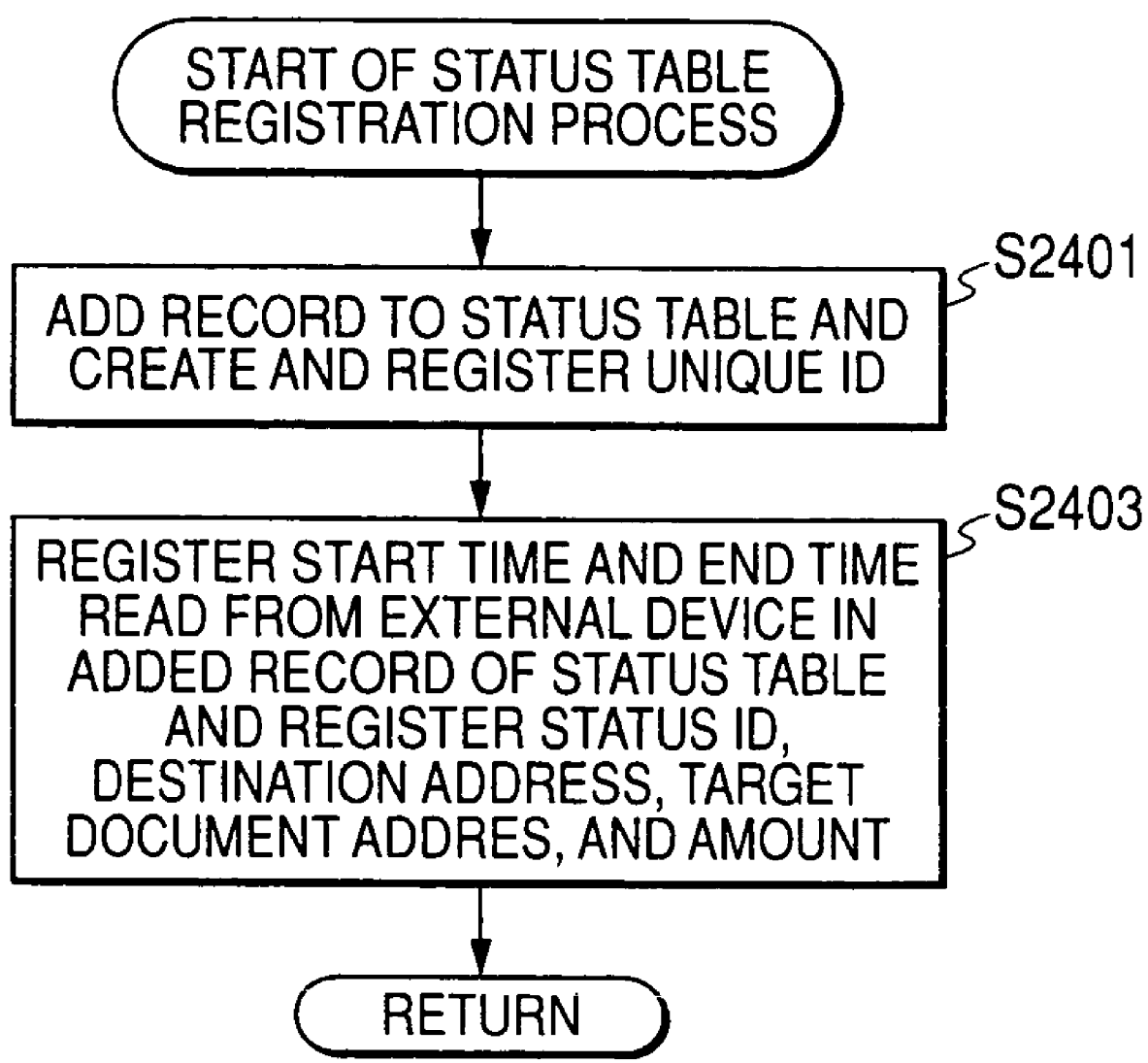

INFORMATION MANAGEMENT SYSTEM, INFORMATION PROCESSING DEVICE, AND PROGRAM

CROSS REFERENCE TO RELATED APPLICATION

This application claims priority from Japanese Patent Applications Nos. 2005-215939, 2005-215940 and 2005-215942, filed Jul. 26, 2005, the contents of which are hereby incorporated by reference into the present application.

TECHNICAL FIELD

Aspects of the present invention relate to an information management system for managing information or data, an information processing device of the information management system, and a program thereof.

BACKGROUND

In recent years, personal computers (hereinafter, referred to as "PC") have been widely used for a personal purpose or on business. For example, a PC is connected to an external device serving as an information input source or an external device for processing based on a command from the PC. Specifically, the PC receives data from the external devices and uses the information for management, while the processes based on the managed information are performed to the external device. When it is difficult to install a plurality of external devices, a multifunction machine comprising a plurality of units that execute a plurality of functions is connected to the PC.

The PC and the external device transmit and receive a large amount of information therebetween depending upon operations of the external device. The PC manages the large amount of information (for example, see JP-A-2004-32085).

In the PC for managing a large amount of data, there have been suggested techniques of correlating data so as to enhance an efficiency for data processing.

For example, there is known an information management system, which displays a message requesting for inputting instruction of correlating conditions, receives an instruction from a user in response to the display and perform the correlating operation, so as to correlate the data to be written with the relevant data at the time of writing data (for example, see JP-A-2000-315203).

An aspect of the present invention provides an information management system, which can classify and manage data correlated with a process of an external device, an information processing device installed in the information management system, and a program for performing a predetermined operation to the information processing device.

SUMMARY

According to an aspect of the present invention, an information management system comprises: an external device having a function performing unit that performs a predetermined process; an information processing device connected to the external device; and a third storage unit that stores utilization data, which is accessed by the external device and the information processing device. The information processing device comprises: a first detection unit that detects a first period in which the function performing unit of the external device performs the process; a first specification unit that specifies status information that specifies the process performed by the function performing unit in the first period detected by the first detection unit; a first storage unit that correlates and stores the first period detected by the first detection unit and the status information specified by the first specification unit; a utilization unit that utilizes the utilization data stored in the third storage unit; a second detection unit that detects a second period in which the utilization data are utilized by the utilization unit; a second specification unit that specifies utilization-data specifying information that specifies the utilization data which are utilized in the second period; a second storage unit that correlates and stores the second period detected by the second detection unit and the utilization-data specifying information specified by the specification unit; and a correlation giving unit that gives a correlation that the utilization data specified by the utilization-data specifying information correlated with the second period is correlated with the process specified by the status information correlated and stored in the first period, in a case where the first period and the second period have an overlapping period. The external device comprises an offer unit that offers the first period and the status information in a state where the information processing device detects the process in a case where the process is performed by the function performing unit.

According to another aspect of the present invention, an information management system comprises: an external device having an interactive communication unit that interactively communicates with an interactive communication device through a public telephone line; an information processing device connected to the external device; and a third storage unit that stores utilization data, which is accessed by the external device and the information processing device. The information processing device comprises: a first detection unit that detects a first period in which an interactive communication is performed by the interactive communication unit; a first storage unit that stores the first period detected by the first detection unit; a utilization unit that utilizes the utilization data stored in the third storage unit; a second detection unit that detects a second period in which the utilization data are utilized by the utilization unit; a specification unit that specifies utilization-data specifying information that specifies the utilization data which are utilized in the second period; a second storage unit that correlates and stores the second period detected by the second detection unit and the utilization-data specifying information specified by the specification unit; and a correlation giving unit that gives a correlation that the utilization data specified by the utilization-data specifying information correlated with the second period is correlated with the interactive communication of the interactive communication unit, in a case where a third period obtained by adding a first predetermined period from an end of the first period to the first period overlaps with the second period. The external device comprises an offer unit that offers the first period in a state where the information processing device detects the interactive communication in a case where the interactive communication is performed by the interactive communication unit.

According to yet another aspect of the present invention, an information management system comprises: an external device having a line communication unit that receives facsimile data transmitted through a public telephone line; an information processing device connected to the external device; and a third storage unit that stores utilization data, which is accessed by the external device and the information processing device. The information processing device comprises: a first detection unit that detects a first period in which the facsimile data received by the line communication unit are output; a first storage unit that stores the first period detected by the first detection unit; a utilization unit that utilizes the utilization data stored in the third storage unit; a second detection unit that detects a second period in which the utilization data are utilized by the utilization unit; a specification unit that specifies utilization-data specifying information that specifies the utilization data which are utilized in the second period; a second storage unit that correlates and stores the second period detected by the second detection unit and the utilization-data specifying information specified by the specification unit; and a correlation giving unit that gives a correlation that the utilization data specified by the utilization-data specifying information correlated with the second period is correlated with the reception by the line communication unit, in a case where the first period and the second period have a period overlapping with each other. The external device comprises: an output unit that outputs the facsimile data; and an offer unit that offers the first period in a state where the information processing device detects a facsimile data output process in a case where the facsimile data output process is performed by the output unit.

BRIEF DESCRIPTION OF THE DRAWINGS

FIG. 2A is a diagram illustrating a status table according to the illustrative aspect of the invention and FIG. 2B is a diagram illustrating definitions of items stored in the status table according to the illustrative aspect of the invention;

FIG. 3 is a diagram illustrating a document table according to the illustrative aspect of the invention;

FIG. 4 is a diagram illustrating a file information table according to the illustrative aspect of the invention;

FIG. 5 is a diagram illustrating a device designating table according to the illustrative aspect of the invention;

FIG. 6 is a diagram illustrating a search result table according to the illustrative aspect of the invention;

FIGS. 10A, 10B, and 10C are diagrams illustrating a display format resulting from the before-activation intellectual assistance process according to the invention;

FIG. 11 is a diagram illustrating a flow of a during-activation intellectual assistance process according to the illustrative aspect of the invention;

FIG. 20 is a diagram illustrating a display format (associated with the status table) of a search result in the during-activation intellectual assistance process according to the illustrative aspect of the invention;

FIG. 21 is a diagram illustrating a display format (associated with the document table) of a search result in the during-activation intellectual assistance process according to the illustrative aspect of the invention;

FIG. 22 is a diagram illustrating a display format (associated with the status table) of a search result in the during-activation intellectual assistance process according to the illustrative aspect of the invention;

FIG. 23 is a diagram illustrating a display format (associated with the document table) of a search result in the during-activation intellectual assistance process according to the illustrative aspect of the invention;

FIG. 24 is a diagram illustrating a flow of a status table registration process according to the illustrative aspect of the invention;

DETAILED DESCRIPTION

General Overview

Figure 1:
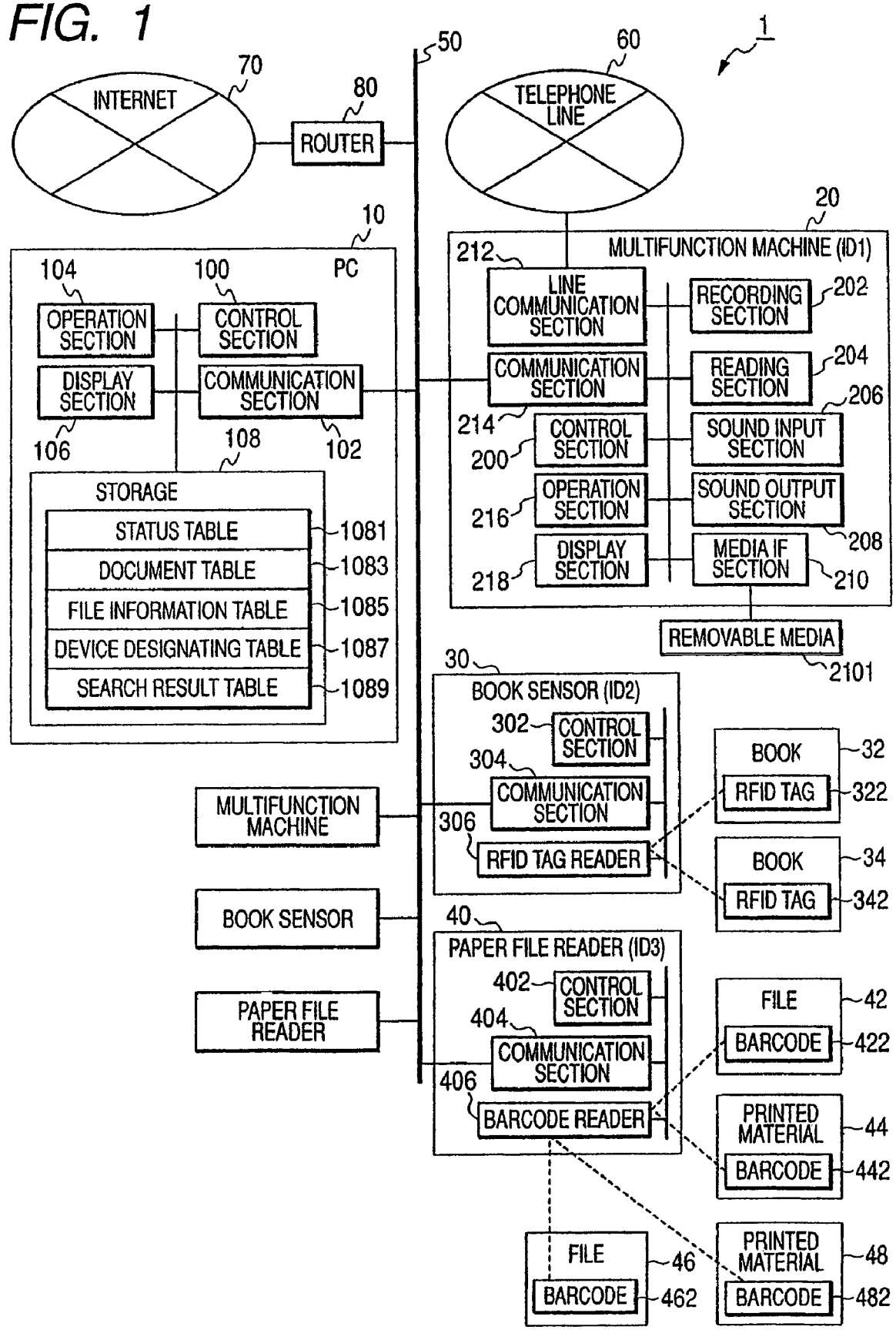
FIG. 1 is a diagram illustrating an information management system according to an illustrative aspect of the invention.

According to the first aspect of the invention, there is provided an information management system comprising: an external device comprising one or more function performing unit for performing a predetermined process; an information processing device connected to the external device in a communication-practicable manner; and third storage unit, which can be accessed by the external device and the information processing device and which stores utilization data, wherein the information processing device comprises: first detection unit for detecting a first period in which the function performing unit of the external device performs the process; first specification unit for specifying status information for specifying the process performed by the function performing unit in the first period detected by the first detection unit; first storage unit for correlating and storing the first period detected by the first detection unit and the status information specified by the first specification unit; one or more utilization unit for utilizing the utilization data stored in the third storage unit; second detection unit for detecting a second period in which the utilization data are utilized by the utilization unit; second specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the process specified by the status information correlated and stored in the first period, when the first period and the second period have an overlapping period, and wherein the external device comprises offer unit for offering the first period and the status information in a state where the information processing device can detect the process when the process is performed by the function performing unit.

Accordingly, it is possible to correlate the utilization data, which were utilized in the second period overlapping with the first period in which a specific process is performed, with the process performed in the first period.

The "period" of the first period and the second period includes a time point.

The first storage unit and the second storage unit need not be two different tables, but may be one storage unit if only items constituting records of the tables can be identified.

The second aspect of the invention provides the information management system according to the first aspect, wherein the utilization unit of the information processing device newly stores data available as the utilization data in the third storage unit, and wherein the second detection unit detects as the second period a period in which the utilization data are utilized by the utilization unit or a period in which the new utilization data are stored in the third storage unit by the utilization unit.

Accordingly, it is possible to correlate the utilization data, which are newly prepared in the second period overlapping with the first period in which the process is performed, with the process performed in the first period.

The third aspect of the invention provides the information management system according to the second aspect, wherein the utilization unit of the information process device stores data transmitted from the external device as the utilization data in the third storage unit, and wherein the external device comprises transmission unit for transmitting data newly prepared as the processing result of the function performing unit as the utilization data stored in the third storage unit Accordingly, it is possible to correlate the utilization data, which are newly prepared by the external device in the second period overlapping with the first period in which the process is performed, with the process performed in the first period.

The fourth aspect of the invention provides the information management system according to any one of the first to third aspects, wherein the information processing device performs the correlating operation of the correlation giving unit to the external device, which is prescribed.

Accordingly, it is possible to prevent the infinite chain of correlating the utilization data with a specific process by restricting the external device as a management target.

The fifth aspect of the invention provides the information management system according to any one of the first to fourth aspects, wherein the information processing device further comprises: output unit for outputting information; and output control unit for outputting the information to the output unit, and wherein the output control unit outputs the process and the utilization-data specifying information for specifying the utilization data to the output unit, which are correlated with each other by the correlation giving unit, to the output unit.

Accordingly, it is possible to notify the utilization data correlated with the process.

The sixth aspect of the invention provides the information management system according to the fifth aspect, wherein when the activation of the function performing unit is detected by the detection unit of the information processing device, the output control unit outputs the process and the utilization-data specifying information to the output unit.

Accordingly, it is possible to notify the utilization data correlated with the process, linking up with the actually performed process.

The seventh aspect of the invention provides the information management system according to the fifth aspect, wherein the utilization-data specifying information is address information indicating a storage position of the utilization data, and wherein the output control unit outputs all the utilization data, to which a correlation is given by the correlation giving unit, to fourth storage unit, which can be accessed by the information processing device from the storage position indicated by the address information.

Accordingly, it is possible to collect all the utilization data correlated with the process, separately from other data having no correlation therewith.

The eighth aspect of the invention provides the information management system according to any one of the first to seventh aspects, wherein the external device further comprises: line communication unit as the function performing unit connected to a public telephone line; and one of reading unit for reading a medium and image forming unit for forming image data on the basis of data input from the information processing device, data input through the line communication unit from the public telephone line, or data input through the reading unit.

Accordingly, it is possible to classify the utilization data comprising a correlation with a process performed by the multifunction machine capable of performing a plurality of functions.

According to the twenty-third aspect of the invention, there is provided an information processing device, which is connected to an external device in a communication-practicable manner and which can access third storage unit for storing available utilization data, the external device comprising one or more function performing unit for performing a predetermined process and offer unit for offering a first period in which the process is performed by the function performing unit and status information for specifying the process, the information processing device comprising: first detection unit for detecting the first period; first specification unit for specifying the status information for specifying the process performed by the function performing unit in the first period detected by the first detection unit; first storage unit for correlating and storing the first period detected by the first detection unit and the status information specified by the first specification unit; one or more utilization unit for utilizing the utilization data stored in the third storage unit; second detection unit for detecting a second period in which the utilization data are utilized by the utilization unit; second specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the process specified by the status information correlated and stored in the first period, when the first period and the second period have an overlapping period.

Accordingly, when a process is performed by the external device, the utilization data can be correlated with the process performed by the external device.

According to the twenty-seventh aspect of the invention, there is provided a computer-readable program, which is connected to an external device in a communication-practicable manner and which can access third storage unit for storing available utilization data, the external device comprising one or more function performing unit for performing a predetermined process and offer unit for offering a first period in which the process is performed by the function performing unit and status information for specifying the process, the program allowing a computer to serve as: first detection unit for detecting the first period; first specification unit for specifying the status information for specifying the process performed by the function performing unit in the first period detected by the first detection unit; first storage unit for correlating and storing the first period detected by the first detection unit and the status information specified by the first specification unit; one or more utilization unit for utilizing the utilization data stored in the third storage unit; second detection unit for detecting a second period in which the utilization data are utilized by the utilization unit; second specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the process specified by the status information correlated and stored in the first period, when the first period and the second period have an overlapping period.

Accordingly, when a process is performed by the external device, the utilization data can be correlated with the process performed by the external device.

According to the ninth aspect of the invention, there is provided an information management system comprising: an external device comprising interactive communication unit, which can interactively communicate with an interactive communication device through a public telephone line; an information processing device connected to the external device in a communication-practicable manner; and third storage unit, which can be accessed by the external device and the information processing device and which stores utilization data, wherein the information processing device comprises: first detection unit for detecting a first period in which an interactive communication is performed by the interactive communication unit; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the interactive communication of the interactive communication unit, when a third period obtained by adding a first prescribed period from the end of the first period to the first period overlaps with the second period, and wherein the external device comprises offer unit for offering the first period in a state where the information processing device can detect the interactive communication when the interactive communication is performed by the interactive communication unit.

Accordingly, by preparing a third period, which is obtained by adding the first prescribed period from the end of the first period to the first period, which is a communication period, the period in which the third period and the second period in which the utilization data are utilized overlap with each other can be used as a correlating target period. That is, it is possible to prepare a period in which the data utilized in a predetermined period after the communication ends can be considered as data correlated with the communication. As a result, it is possible to give a correlation with the communication to the information such as the information or the assigned schedule, which were a topic during communication, necessary for the communication, after the communication as well as during the communication.

The "end of the first period" may be an on-hook time, a predetermined time, or a time when an aphonic communication is maintained, or a time when a predetermined time passes from the start of the first period. That is, the end of the first period may be any time.

The tenth aspect of the invention is the information management system according to the ninth aspect, wherein the correlation giving unit gives a degree of correlation on the basis of at least one of which of in the first period, in the second prescribed period, and before and after the fourth period the second period belongs to, and which kind of process is performed to the utilization data.

Accordingly, it is possible to give a degree of correlation with the communication, on the basis when the utilization data are processed in the communication period and which process is performed.

According to the eleventh aspect of the invention, there is provided an information management system comprising: an external device comprising interactive communication unit, which can interactively communicate with an interactive communication device through a public telephone line; an information processing device connected to the external device in a communication-practicable manner; and third storage unit, which can be accessed by the external device and the information processing device and which stores utilization data, wherein the information processing device comprises: first detection unit for detecting a first period in which an interactive communication is performed by the interactive communication unit; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the utilization data, which are utilized in the second period; second storage unit for correlating and storing the second period detected by the second detection unit and the utilization-data specifying information specified by the specification unit; and correlation giving unit forgiving a correlation that the utilization data specified by the utilization-data specifying information correlated with the second period are correlated with the interactive communication of the interactive communication unit, when a fourth period obtained by adding a period, which retroacts by a second prescribed period from the start of the first period, to the first period overlaps with the second period, and wherein the external device comprises offer unit for offering the first period in a state where the information processing device can detect the interactive communication when the interactive communication is performed by the interactive communication unit.

Accordingly, by preparing the fourth period obtained by adding the period, which retroacts by the first prescribed period from the start of the first period, to the first period, which is a communication period, the period in which the fourth period and the second period in which the utilization data are utilized overlap with each other can be used as a correlating target period. That is, it is possible to prepare a period in which the data utilized in a predetermined period before the communication starts can be considered as the utilization data correlated with the communication. As a result, it is possible to give a correlation with the communication to the information, which is considered as a topic of the communication before the communication starts as well as during the communication.

The "start of the first period" is not limited to the time when the communication is started, but may be a time when a telephone number of a communication destination is input, an off-hook time, or a time when any operation associated with the communication is performed. That is, the start of the first period may be any time.

The twelfth aspect of the invention is the information management system according to the eleventh aspect, wherein the correlation giving unit gives a degree of correlation on the basis of at least one of which of in the first period, in the second prescribed period, and before and after the fourth period the second period belongs to, and which kind of process is performed to the utilization data.

Accordingly, it is possible to give a degree of correlation with the communication, on the basis when the utilization data are processed in the communication period and which process is performed.

According to the thirteenth aspect of the invention, there is provided an information management system comprising: an external device comprising interactive communication unit, which can interactively communicate with an interactive communication device through a public telephone line; an information processing device connected to the external device in a communication-practicable manner; and third storage unit, which can be accessed by the external device and the information processing device and which stores utilization data, wherein the information processing device comprises: first detection unit for detecting a first period in which an interactive communication is performed by the interactive communication unit; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the interactive communication of the interactive communication unit, when a fifth period obtained by adding a period, which retroacts by a second prescribed period from the start of the first period, to a period obtained by adding a first prescribed period from the end of the first period to the first period overlaps with the second period, and wherein the external device comprises offer unit for offering the first period in a state where the information processing device can detect the interactive communication when the interactive communication is performed by the interactive communication unit.

Accordingly, by preparing the fifth period obtained by adding the period, which retroacts by the second prescribed period from the start of the first period, to the period obtained by adding the first prescribed period from the end of the first period to the first period, which is a communication period, the period in which the fifth period and the second period in which the utilization data are utilized overlap with each other can be used as a correlating target period. That is, it is possible to prepare a period in which the data utilized in a predetermined period before and after the communication starts can be considered as the utilization data correlated with the communication.

The "start of the first period" and the "end of the first period" are similar to the "start of the first period" and the "end of the first period" in the first and third aspects.

The fourteenth aspect of the invention is the information management system according to the thirteenth aspect, wherein the correlation giving unit gives a degree of correlation on the basis of at least one of which of in the first period, in the first prescribed period, in the second prescribed period, and before and after the fifth period the second period belongs to, and which kind of process is performed to the utilization data.

Accordingly, it is possible to give a degree of correlation with the communication, on the basis when the utilization data are processed in the communication period and which process is performed.

The fifteenth aspect of the invention is the information management system according to any one of the eleventh to fourteenth aspects, wherein the interactive communication of the interactive communication unit is an interactive communication resulting from emission of a call.

Accordingly, when a calling communication is performed using the utilization data treated before the communication, it is possible to correlate the utilization data with the communication.

The sixteenth aspect of the invention is the information management system according to any one of the ninth to fifteenth aspects, wherein the information processing device further comprises: output unit for outputting information; and output control unit for outputting the information to the output unit, and wherein the output control unit outputs the process and the utilization-data specifying information for specifying the utilization data, which are correlated with each other by the correlation giving unit, to the output unit.

Accordingly, it is possible to notify the utilization data correlated with the process.

According to the twenty-fourth aspect of the invention, there is provided an information processing device, which is connected to an external device in a communication-practicable manner and which can access third storage unit for storing available utilization data, the external device comprising interactive communication unit for interactively communicating with an interactive communication device through a public telephone line and offer unit for offering a first period in which a communication is performed by the interactive communication unit, the information processing device comprising: first detecting unit for detecting the first period; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the interactive communication of the interactive communication unit, when a fifth period obtained by adding a period, which retroacts by a second prescribed period from the start of the first period, to a period obtained by adding a first prescribed period from the end of the first period to the first period overlaps with the second period.

Accordingly, it is possible to give a correlation with the communication to the utilization data utilized during, before, and after the communication.

According to the twenty-eighth aspect of the invention, there is provided a computer-readable program, which is connected to an external device in a communication-practicable manner and which can access third storage unit for storing available utilization data, the external device comprising interactive communication unit for interactively communicating with an interactive communication device through a public telephone line and offer unit for offering a first period in which a communication is performed by the interactive communication unit, the program allowing a computer to serve as: first detecting unit for detecting the first period; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the interactive communication of the interactive communication unit, when a fifth period obtained by adding a period, which retroacts by a second prescribed period from the start of the first period, to a period obtained by adding a first prescribed period from the end of the first period to the first period overlaps with the second period.

Accordingly, it is possible to give a correlation with the communication to the utilization data utilized during, before, and after the communication.

According to the seventeenth aspect of the invention, there is provided an information management system comprising: an external device comprising line communication unit, which can receive facsimile data transmitted through a public telephone line; an information processing device connected to the external device in a communication-practicable manner; and third storage unit, which can be accessed by the external device and the information processing device and which stores utilization data, wherein the information processing device comprises: first detection unit for detecting a first period in which the facsimile data received by the line communication unit are output; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when the first period and the second period have a period overlapping with each other, and wherein the external device comprises: output unit for outputting the facsimile data; and offer unit for offering the first period in a state where the information processing device can detect a facsimile data output process when the facsimile data output process is performed by the line communication unit.

Accordingly, the period in which the first period in which the facsimile data are output and the second period in which the utilization data are utilized have a period overlapping with each other can be used as a correlating target period.

The start of the first period is not limited to the time when the facsimile data are output, but the first period may include a period in which the external device is manipulated until the start of the output.

According to the eighteenth aspect of the invention, there is provided an information management system comprising: an external device comprising line communication unit, which can receive facsimile data transmitted through a public telephone line; an information processing device connected to the external device in a communication-practicable manner; and third storage unit, which can be accessed by the external device and the information processing device and which stores utilization data, wherein the information processing device comprises: first detection unit for detecting a first period in which the facsimile data received by the line communication unit are output; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when a third period obtained by adding a prescribed period to the end of the first period and the second period have a period overlapping with each other, and wherein the external device comprises: output unit for outputting the facsimile data; and offer unit for offering the first period in a state where the information processing device can detect a facsimile data output process when the facsimile data output process is performed by the line communication unit.

Accordingly, by preparing the third period obtained by adding a prescribed period to the end of the first period, the period in which the third period and the second period have a period overlapping with each other can be used as the correlating target period.

That is, as well as the short period in which the facsimile data are output, the period in which the data are opened after the output can be correlated with the utilization data.

The nineteenth aspect of the invention provides the information management system according to the seventeenth or eighteenth aspect, wherein the information processing device further comprises output control unit for outputting the transmitted data to the output unit, and wherein the output control unit outputs the utilization-data specifying information, to which a correlation is given by the correlation giving unit and which specifies the utilization data, to the output unit.

Accordingly, it is possible to notify the utilization data correlated with the processing of the transmitted data.

According to the twentieth aspect of the invention, there is provided an information management system comprising: an external device comprising line communication unit, which can receive PC facsimile data transmitted through a public telephone line; an information processing device connected to the external device in a communication-practicable manner; and third storage unit, which can be accessed by the external device and the information processing device and which stores utilization data, wherein the information processing device comprises: first detection unit for detecting a fourth period in which the PC facsimile data received by the line communication unit are opened by the information processing device; first storage unit for storing the fourth period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit forgiving a correlation that the utilization data specified by the utilization-data specifying information correlated with the second period are correlated with the reception by the line communication unit, when the fourth period and the second period have a period overlapping with each other, and wherein the external device comprises output unit for outputting the PC facsimile data to the information processing device.

Accordingly, the period in which the fourth period in which the PC facsimile data are opened in the information processing device and the second period in which the utilization data are utilized have a period overlapping with each other can be used as the correlating target period.

The start of the fourth period is not limited to the time when the PC facsimile data are opened in the information processing device, but the fourth period may be started from the time when an operation for reading the PC facsimile data into the information processing device is performed.

According to the twenty-first aspect of the invention, there is provided an information management system comprising: an external device comprising line communication unit, which can receive PC facsimile data transmitted through a public telephone line; an information processing device connected to the external device in a communication-practicable manner; and third storage unit, which can be accessed by the external device and the information processing device and which stores utilization data, wherein the information processing device comprises: first detection unit for detecting a fourth period in which the PC facsimile data received by the line communication unit are opened by the information processing device; first storage unit for storing the fourth period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when a fifth period obtained by adding a prescribed period to the end of the fourth period and the second period have a period overlapping with each other, and wherein the external device comprises output unit for outputting the PC facsimile data to the information processing device.

Accordingly, by preparing the fifth period obtained by adding a prescribed period to the end of the fourth period, the period in which the fifth period and the second period have a period overlapping with each other can be used as the correlating target period.

That is, a correlation cannot only be given to the utilization data utilized in the same period as the period in which the PC facsimile data are opened in the information processing device, but also to the utilization data utilized in a prescribed period after the PC facsimile data are closed.

The twenty-second aspect of the invention provides the information management system according to the twentieth or twenty-first aspect, wherein the information processing device further comprises output control unit for outputting the transmitted data to the output unit, and wherein the output control unit outputs the utilization-data specifying information, to which a correlation is given by the correlation giving unit and which specifies the utilization data, to the output unit.

Accordingly, it is possible to notify the utilization data correlated with the processing of the transmitted data.

According to the twenty-fifth aspect of the invention, there is provided an information processing device, which is connected in a communication-practicable manner to an external device comprising line communication unit, which can receive facsimile data transmitted through a public telephone line, offer unit for offering a first period in which the facsimile data received by the line communication unit are output, and output unit for outputting the facsimile data, and which can access third storage unit for storing available utilization data, the information processing device comprising: first detection unit for detecting the first period; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when the first period and the second period have a period overlapping with each other.

Accordingly, at the time of outputting the facsimile data, the utilization data utilized by the information processing device during the output process can be correlated with the target data.

According to the twenty-sixth aspect of the invention, there is provided an information processing device, which is connected in a communication-practicable manner to an external device comprising line communication unit, which can receive facsimile data transmitted through a public telephone line, offer unit for offering a first period in which the facsimile data received by the line communication unit are output, and output unit for outputting the facsimile data, and which can access third storage unit for storing available utilization data, the information processing device comprising: first detection unit for detecting the first period; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when a third period obtained by adding a prescribed period to the end of the first period and the second period have a period overlapping with each other.

Accordingly, at the time of outputting the facsimile data, the utilization data utilized by the information processing device during the output process and in a prescribed period after the output process can be correlated with the target data.

According to the twenty-ninth aspect of the invention, there is provided a computer-readable program, which is connected in a communication-practicable manner to an external device comprising line communication unit, which can receive facsimile data transmitted through a public telephone line, offer unit for offering a first period in which the facsimile data received by the line communication unit are output, and output unit for outputting the facsimile data, and which can access third storage unit for storing available utilization data, the computer-readable program allowing a computer to serve as: first detection unit for detecting the first period; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when the first period and the second period have a period overlapping with each other.

Accordingly, at the time of outputting the facsimile data, the utilization data utilized by the information processing device during the output process can be correlated with the target data.

According to the thirtieth aspect of the invention, there is provided a computer-readable program, which is connected in a communication-practicable manner to an external device comprising line communication unit, which can receive facsimile data transmitted through a public telephone line, offer unit for offering a first period in which the facsimile data received by the line communication unit are output, and output unit for outputting the facsimile data, and which can access third storage unit for storing available utilization data, the computer-readable program allowing a computer to serve as: first detection unit for detecting the first period; first storage unit for storing the first period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when a third period obtained by adding a prescribed period to the end of the first period and the second period have a period overlapping with each other.

Accordingly, at the time of outputting the facsimile data, the utilization data utilized by the information processing device during the output process and in a prescribed period after the output process can be correlated with the target data.

According to the thirty-first aspect of the invention, there is provided an information processing device, which is connected in a communication-practicable manner to an external device comprising line communication unit, which can receive PC facsimile data transmitted through a public telephone line and output unit for outputting the PC facsimile data, and which can access third storage unit for storing available utilization data, the information processing device comprising: first detection unit for detecting a fourth period in which the PC facsimile data received by the line communication unit are opened by the information processing device; first storage unit for storing the fourth period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit forgiving a correlation that the utilization data specified by the utilization-data specifying information correlated with the second period are correlated with the reception by the line communication unit, when the fourth period and the second period have a period overlapping with each other.

Accordingly, the utilization data utilized in the period in which the PC facsimile data are opened in the information processing device can be correlated with the PC facsimile data.

According to the thirty-second aspect of the invention, there is provided an information processing device, which is connected in a communication-practicable manner to an external device comprising line communication unit, which can receive PC facsimile data transmitted through a public telephone line and output unit for outputting the PC facsimile data, and which can access third storage unit for storing available utilization data, the information processing device comprising: first detection unit for detecting a fourth period in which the PC facsimile data received by the line communication unit are opened by the information processing device; first storage unit for storing the fourth period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when a fifth period obtained by adding a prescribed period to the end of the fourth period and the second period have a period overlapping with each other.

Accordingly, the utilization data utilized in the period in which the PC facsimile data are opened in the information processing device and in the prescribed period after the PC facsimile data are closed can be correlated with the PC facsimile data.

According to the thirty-third aspect of the invention, there is provided a computer-readable program, which is connected in a communication-practicable manner to an external device comprising line communication unit, which can receive PC facsimile data transmitted through a public telephone line and output unit for outputting the PC facsimile data, and which can access third storage unit for storing available utilization data, the computer-readable program allowing a computer to serve as: first detection unit for detecting a fourth period in which the PC facsimile data received by the line communication unit are opened by the information processing device; first storage unit for storing the fourth period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when the fourth period and the second period have a period overlapping with each other.

Accordingly, the utilization data utilized in the period in which the PC facsimile data are opened in the information processing device can be correlated with the PC facsimile data.

According to the thirty-fourth aspect of the invention, there is provided a computer-readable program, which is connected in a communication-practicable manner to an external device comprising line communication unit, which can receive PC facsimile data transmitted through a public telephone line and output unit for outputting the PC facsimile data, and which can access third storage unit for storing available utilization data, the computer-readable program allowing a computer to serve as: first detection unit for detecting a fourth period in which the PC facsimile data received by the line communication unit are opened by the information processing device; first storage unit for storing the fourth period detected by the first detection unit; one or more utilization unit for utilizing the utilization data stored in the third storage unit; second detection unit for detecting a second period in which the utilization data are utilized by the utilization unit; specification unit for specifying utilization-data specifying information for specifying the corresponding utilization data, which are utilized in the second period; second storage unit for correlating and storing the second period detected by the second detection unit and the utilization-data specifying information specified by the specification unit; and correlation giving unit for giving a correlation that the utilization data specified by the utilization-data specifying information correlated with the second period are correlated with the reception by the line communication unit, when a fifth period obtained by adding a prescribed period to the end of the fourth period and the second period have a period overlapping with each other.

Accordingly, the utilization data utilized in the period in which the PC facsimile data are opened in the information processing device and in the prescribed period after the PC facsimile data are closed can be correlated with the PC facsimile data.

FIRST EXAMPLE

Hereinafter, a specific information management system according to an illustrative aspect of the invention will be described with reference to the drawings. The invention is not limited to the configuration described below, but may employ a variety of configurations within the same technical spirit.

(Configuration of Information Management System)

FIG. 1 is a diagram illustrating an information management system. As can be seen from the figure, the information management system 1 comprises a PC 10 as an information processing device comprising an information management function, a multifunction machine 20 as an external device for performing a variety of functions, a book sensor 30 as an external device for sensing books 32 and 34 as a management target of the PC 10, and a paper file reading section 40 as an external device for sensing paper files 42 and 46, which are stationery for filing paper as a management target of the PC 10, and printed materials 44 and 48. The devices are all connected to each other through a network line 50.

The PC 10 comprises a CPU, a ROM, and a RAM (not shown), and further comprises a control section 100 for controlling operations of the PC 10 (the entire PC 10) on the basis of programs stored in the ROM, a communication section 102, which is connected to the network line 50 so as to control the network line 50, an operation section 104 for receiving instructions from a user of the PC 10, a display section 106 for displaying a variety of information, and a storage 108 comprising a hard disk or the like. The control section 100, in one implementation, includes a first detection unit, a second detection unit, a first specification unit, and a second specification unit.

The storage 108 (e.g., a third storage unit) comprises a status table 1081 (e.g., a first storage unit), a document table 1083 (e.g., a second storage unit), a file information table 1085, and a device designating table 1087.

The multifunction machine 20 comprises a CPU, a ROM, and a RAM (not shown), and further comprises a control section 200 for controlling operations of the multifunction machine 20 (the entire multifunction machine 20), a recording section 202 as an image forming unit, a reading section 204 as an image reading unit, a sound input section 206 as a microphone, a sound output section 208 as a speaker, and a media IF section 210 fitted with a removable media 2101 (e.g., a fourth storage unit). The multifunction machine further comprises a line communication section, which is connected to a telephone line 60 so as to control the telephone line 60, a communication section 214, which is connected to the network line 50 so as to control the network line 50, an operation section 216 for receiving instructions from a user of the multifunction machine 20, and a display section 218 for displaying a variety of information.

A device ID (multifunction machine ID 1) indicating that it is a device constituting the information management system 1 is given to the multifunction machine 20.

The book sensor 30 comprises a CPU, a ROM, and a RAM (not shown), and further comprises a control section 302 for controlling operations of the book sensor 30 (the entire book sensor 30), a communication section 304, which is connected to the network line 50 so as to control the network line 50, and a radio-frequency (RF) ID tag reading section 306 for reading information of RFID tags 322 and 324 given to books 32 and 34.

The book sensor 30 serves as a device for storing information indicating what book is in a user's hands at what times (is being read or is ready to be read). That is, when the RFID tag read 306 is activated on the basis of the program stored in the ROM of the control section 302 and a response is read from the RFID tag 332 or 342 of the books 32 and 34, the identification information on the RFID tag 332 or 342 and the present time (start time) are temporarily stored in the RAM of the control section 302. Then, when the response read from the RFID tags 332 or 342 ends, the identification information on the RFID tag 332 or 342 and the start time temporarily stored in the RAM of the control section 302 and the present time (end time) are transmitted to the PC 10 through the communication section 304. The PC 10 stores the information in the statue table 1081.

A device ID (book sensor ID 2) indicating that it is a device constituting the information management system 1 is given to the book sensor 30.

The paper file reading section 40 comprises a CPU, a ROM, and a RAM (not shown), and further comprises a control section 402 for controlling operations of the paper file reading section 40 (the entire paper file reading section 40), a communication section 404 connected to the network line 50 so as to control the network line 50, and a barcode reading section 406 for reading barcodes 422, 442, 462, and 482 given to the paper files 42 and 46 or the printed materials 44 and 48. The paper file reading section 40 serves as an input section for forming information, which is used to correspond the paper files 42 and 46 with the printed materials 44 and 48 filed in the paper files, in a file information table 1085. That is, the paper file reading section inputs the barcodes of the paper files through the barcode reading section 406 on the basis of a program stored in a ROM of the control section 402, and then inputs the barcodes of the printed materials, in which the barcodes are temporarily stored in a RAM of the control section 402. The input data temporarily stored are transmitted to the PC 10 through the communication section 404. The PC 10 receives the information and adds the received information to the status table 1081 and the file information table 1085.

A device ID (paper file reading section ID 3) indicating that it is a device constituting the information management system 1 is given to the paper file reading section 40.

Now, information stored in the status table 1081, the document table 1083, the file information table 1085, and the device designating table 1087, which are all stored in the storage 108 of the PC 10, will be described.

As shown in FIG. 2A, the status table 1081 stores a processing operation (status ID) executed by an execution unit of the multifunction machine 20, start and end times of the processing operation, information indicating a location of a document, which is a target of the processing operation (hereinafter, referred to as "target document"), an destination address for specifying a specific designation when the processing operation is performed to the specific designation, and an amount of the target document, which is a target of the processing operation, as one record every when the processing operation is performed. A unique ID for identifying the processing operation is given to each processing operation.

The status ID stored in the status table 1081 is defined as shown in FIG. 2B. For example, when the PC 10 performs a print job using the recording section 202 of the multifunction machine 20 (this case is defined as a status "PC print" in FIG. 2B), the status ID is set to "PRN", the destination address is set to "None", the target document address is set to "Address of printed document", and the amount is set to "Number of copies."

Since the PC print operation is performed between the PC 10 and the multifunction machine 20, the destination address is set to "None." Since the document as a target of the processing operation is stored in the storage 108 of the PC 10, an address of the storage 108 storing the target document or an address of a homepage (hereinafter, referred to as "HP") when the target document is a specific HP is stored as the target document address. The amount is set to the "Number of sheets." For example, when a sheet of target document is printed, the amount is "one copy."

When a facsimile (hereinafter, referred to as "fax") transmission is performed using the reading section 204 and the line communication section 212 of the multifunction machine 20 (this case is defined as a status "fax transmission" in FIG. 2B), the status ID is set to "FAX", the destination address is set to "Destination FAX number", the target document address is set to "Address of transmitted image (copied to PC)", and the amount is set to "None."

Since the fax transmission is performed between the multifunction machine 20 and a different facsimile machine, the destination address is set to "Destination FAX number." In the information management system 1, when the fax transmission is performed, the transmitted image as a target of the fax transmission is stored in the storage 108 of the PC 10. Accordingly, an address in the storage 108 in which the transmitted image is stored (an address of the transmitted image (copied to the PC)) is defined as the "Target document address" (in the process (status) defined as "(copied to the PC)" in the target document address in FIG. 2B, an address in the storage 108 in which an image or sound is stored as a processing target as described above is defined as the target document address.).

In case of a telephone communication using the sound input section 206, the sound output section 208, and the line communication section 212 of the multifunction machine 20, when it results from telephone transmission (this case is defined as a status "Telephone transmission" in FIG. 2B), the status ID is set to "TLT", the destination address is set to "Call destination telephone number", the target document address is set to "Address of communication sound (copied to PC)", and the amount is set to "Communication time." When the communication results from telephone reception (this case is defined as a status "Telephone reception" in FIG. 2B), the status ID is set to "TLR", the destination address is set to "Call source telephone number", the target document address is set to "Address of communication sound (copied to PC)", and the amount is set to "Communication time."

Since the telephone communication is performed between the multifunction machine 20 and a different communication device, the destination address is set to "Call destination telephone number" or "Call source telephone number." In the information management system 1, when the telephone communication is performed, the communication sound is stored in the storage 108 of the PC 10. Accordingly, an address in the storage 108 in which the sound is stored (an address of the sound (copied to the PC)) is defined as the "Target document address". In the process (status) defined as "(copied to PC)" in the target document address in FIG. 2B, an address in the storage 108 in which an image or sound is stored as a processing target as described above is defined as the target document address.

When the books 32 and 34 managed by the PC 10 are used (this case is defined as a status "Book" in FIG. 2B), the status ID is set to "BKX", the destination address is set to "Japanese book code (hereinafter, referred to "ISBN")", the target document address is "Book introducing HP address (searched)", and the amount is set to "time (minute)."

ISBN used as the destination address serves to identify the books 32 and 34 and is stored in RFID tags 322 and 342. The address of the HP introducing the books 32 and 34 is provided for a general purpose and is defined as the address stored as the target document address. The amount is set to the time (minute) for using the books 32 and 34.

In addition to those described above, "PC fax transmission (the pc transmits image data and destination to the multifunction machine 20 through the communication section 102 and the multifunction machine 20 fax transmits received image data through the line communication section 212)", "PC fax reception (the line communication section 212 of the multifunction machine 20 transmits the received image data to the PC 10 through the communication section 214 and the PC 10 stores the received image data", "Scan-to-PC (the multifunction machine 20 transmits the image data scanned by the reading section 204 to the PC 10 through the communication section 214 and the PC stores the received image data)", "Scan-to-media (the image data scanned by the reading section 204 are stored in the removable media 2101 through a media interface (hereinafter, referred to as "media IF") section 210)", "Scan-to-mail (the image data scanned by the reading section 204 are transmitted through the communication section 214)", "Fax transmission (the image data read by the reading section 204 are transmitted through the line communication section 212)", "Fax reception (the image data received by the line communication section 212 are printed by the recording section 202)", "Copy (the image data read by the reading section 204 are printed by the recording section 202)", "Telephone transmission", "Telephone reception", and "Media print (the image data or the document data stored in the removable media 2101 are printed by the recording section 202) are defined respectively.

The paper file ID used as the destination address serves to identify the paper files 42 and 46 or the printed materials 44 and 48 and are given as barcodes to the paper files 42 and 46 or the printed materials 44 and 48. The address stored as the target document address is set to an address in the storage 108 storing the document data constituting the documents or printed materials 44 and 48 filed in the paper files 42 and 46.

"GID (Group ID)" defined in FIG 2B is an individual ID given to respective groups into which the respective processing operations (statuses) are divided. Specifically, GID "2" is given to the processing operation of which the destination address is stored, but "0" and "1" are given to the processing operations of which the destination address is set to "None." GID "1" is given to a processing operation (only "PC print" in the illustrative aspect) using target document data previously stored in the storage 108, and GID "0" is given to a processing operation of which target document data are stored by performing the processing operation.

The document table 1083 stores a work or instruction performed to a document. As shown in FIG. 3, ID is given to a time for performing a work, information indicating a location of the document, a work (event) performed to the document, a device performing the work (operating application), and a user carrying out the work.

Data treated in the document table 1083 comprise the document data, image data, and sound data.

Here, as a work (event) performed to a document, "create", "open", "update", "print", "send", and "close" are defined. More specifically describing the events, when a new document is prepared, for example, when a document is prepared by a manipulation of the operation section 104 of the PC 10, when a document is scanned or copied by the use of the reading section 204 of the multifunction machine 20, the document is received in fax or in PC fax by the use of the line communication section 212, or when a communication sound is stored through telephone transmission or telephone reception using the line communication section 212, "create" is stored as an event in the document table 1083.

When the document data, the image data, or the sound data stored in the storage 108 of the PC are opened by the use of the operation section 104 and when an HP is opened by the use of the operation section 104, "open" is stored as an event in the document table 1083. When the document data or the like are closed, "close" is stored.

When the document data, the image data, or the sound data previously stored in the storage 108 are updated by an editor stored in the PC 10, "update" is stored as an event in the document table 1083.

When the document data or the image data previously stored in the storage 108 are printed by the editor, "print" is stored as an event in the document table 1083.

When the document data, the image data, or the sound data previously stored in the storage 108 are transmitted by a mail transmitting and receiving application stored in the PC 10, or when the document data or the image data previously stored in the storage 108 are transmitted through the PC fax transmission or the fax transmission of the multifunction machine 20, "send" is stored as an event in the document table 1083.

In the document table 1083, one of the above-mentioned items is stored as a record every when a work is performed to a document, like in the status table 1081.

Here, the status table 1081 and the document table 1083 need not be two tables different from each other, but may be one table if only the items constituting the records of the tables can be specified.

As shown in FIG. 4, a unique ID for identifying a record, a time when the record is written, a paper file ID for identifying the paper files 42 and 46, and a document address for specifying the printed materials 44 and 48 filed in the paper files 42 and 46 are stored as a record in the file information table 1085.

The paper file ID serves to identify the paper files 42 and 46 and is written in barcodes 442 and 462. The document address stored as the target document address serves to correlate the paper files 42 and 46 with the printed materials 44 and 48 filed therein and denotes an address of an electronic document resulting in the printed materials 44 and 48. That is, when the electronic document resulting in the printed materials 44 and 48 is stored in the storage 108 of the PC 10, the address in the storage 108 storing the electronic document is stored as the document address, or when the electronic document is an HP, the address of the HP is stored as the document address. The information is written to the barcodes 442 and 448 recorded in the printed materials 44 and 46.

When a plurality of multifunction machines 20, the book sensor 30, and the paper file reading section are connected to the network line 50, the device designating table 1087 is a table, which specifies and stores a target of the information management system 1 among the multifunction machines 20 and the like. The device designating table comprises the structure shown in FIG. 5.

A search result table 1089 is a table, which a degree of correlation (weight) of a document, which is indicated by the information (ID) denoting a location in the document table 1083, with a target document. The search result table is illustrated in FIG. 6.

(Process 1 of Information Management System)

Next, process (1) of the information management system illustrated as above will be described with reference to the figures.

Figure 7:
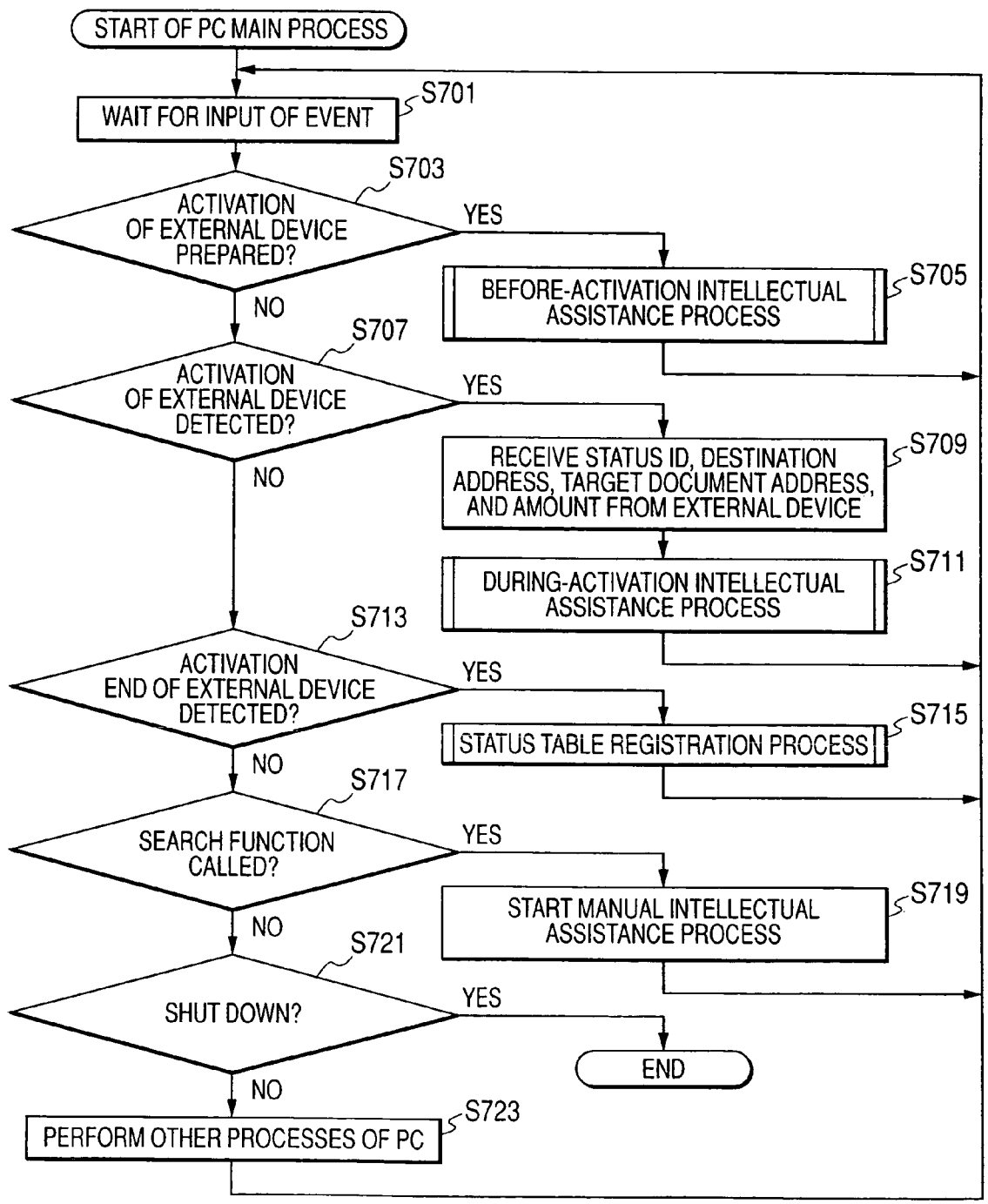
FIG. 7 is a diagram illustrating a flow of a main process performed by a PC according to the illustrative aspect of the invention.

FIG. 7 is a diagram illustrating a flow of a main process performed by the PC 10. The process shown in the flow is performed by the control section 100 of the PC 10, and more specifically, the CPU of the control section 10 performs the process by the use of a program stored in the ROM or the like.

First, the control section 100 waits until an instruction for performing any one process is input through the operation section 104 of the PC 10 or the communication section 102 from a designated external device shown in FIG. 5, such as the multifunction machine 20, the book sensor 30, and the paper file reading section 40 (step 701).

Thereafter, when it is detected in step 701 that an instruction is given, the process is specified. That is, when an instruction is input to the control section 100 first determines whether the instruction is an instruction for activating a printer driver controlling the recording section 202 of the multifunction machine 20 or an instruction for preparing for activation of the external device such as activation of a multifunction machine utility for using the reading section 204 of the multifunction machine 20 (step 703).

When it is determined in step 703 that the input instruction is to prepare for the activation of the external device (step 703: YES), the control section 100 of the PC 10 performs a before-activation intellectual assistance process to be described later and waits until an instruction for performing a process is input (step 701).

The before-activation intellectual assistance process means a process of alarming a user having given the instruction so as to prevent the redundant printing when an instruction for printing the specified document data is given to the recording section 202 of the multifunction machine 20 from the PC 10 but the process of printing the document is previously performed within a predetermined time. The before-activation intellectual assistance process comprises a process of alarming a user having given a fax transmission instruction so as to prevent the redundant fax transmission when the fax transmission instruction for transmitting specific document data to a specific counter party is given to the line communication section 212 of the multifunction machine 20 from the PC 10 but the document data are previously transmitted to the counter party.

On the other hand, when the input instruction is not to prepare for the activation of the external device (step 703: NO), it is determined whether the instruction detected in step 701 is an instruction from one of the multifunction machine 20, the book sensor 30, and the paper file reading section 40 designated in FIG. 5 and an instruction for detecting the activation of the external device (step 707).

When it is determined in step 707 that the instruction is an instruction for detecting the activation of the external device (step 707: YES), the control section 100 receives the information defined in FIG. 2B, that is, the status ID, the destination address, the target document address, and the amount, from the external device (step 709). The status ID and the like are stored in the RAM of the control section 100.

Then, the control section performs a during-activation intellectual assistance process (step 711) and then waits until an instruction for performing another process is input when the process is finished (step 701).

The during-activation intellectual assistance process means a process for providing the information used until that time as information associated with a present work when a process corresponding to the same instruction as the instruction from the external device was performed in the past.

When the input instruction is not to prepare for the activation of the external device (step 707: NO), it is determined whether the instruction detected in step 701 is to detect the end of the detected activation of the external device (step 713).

When it is determined in step 707 that the instruction is to detect the end of the activation of the external device (step 713: YES), the control section 100 performs a status-table registration process to be described later (step 715) and then waits until an instruction for performing another process is input when the status-table registration process is finished (step 701).

When the input instruction is not to end the activation of the external device (step 713: NO), it is determined whether the instruction detected in step 701 is to call a search function (step 717).

When it is determined in step 717 that the input instruction is to call a search function (step 717: YES), the control section performs a manual intellectual assistance process to be described later (step 719) and then waits until an instruction for performing another process is input when the manual intellectual assistance process is finished (step S701).

The manual intellectual assistance process is to provide a user with information associated with a user' present work in response to a condition designated by the user.

When the input instruction is not the manual intellectual assistance process (step 717: NO), it is determined whether the instruction detected in step 701 is to shut down the PC 10 (step 721). When the instruction is to shut down the PC 10 (step 721: YES), the PC 10 is shut off. When the instruction is not to shut down the PC (step 721: NO), a process corresponding to the instruction is performed (step 723). After performing the process, the control section waits until an instruction for performing another process is input (step 701).

(Before-Activation Intellectual Assistance Process)

Figure 8:
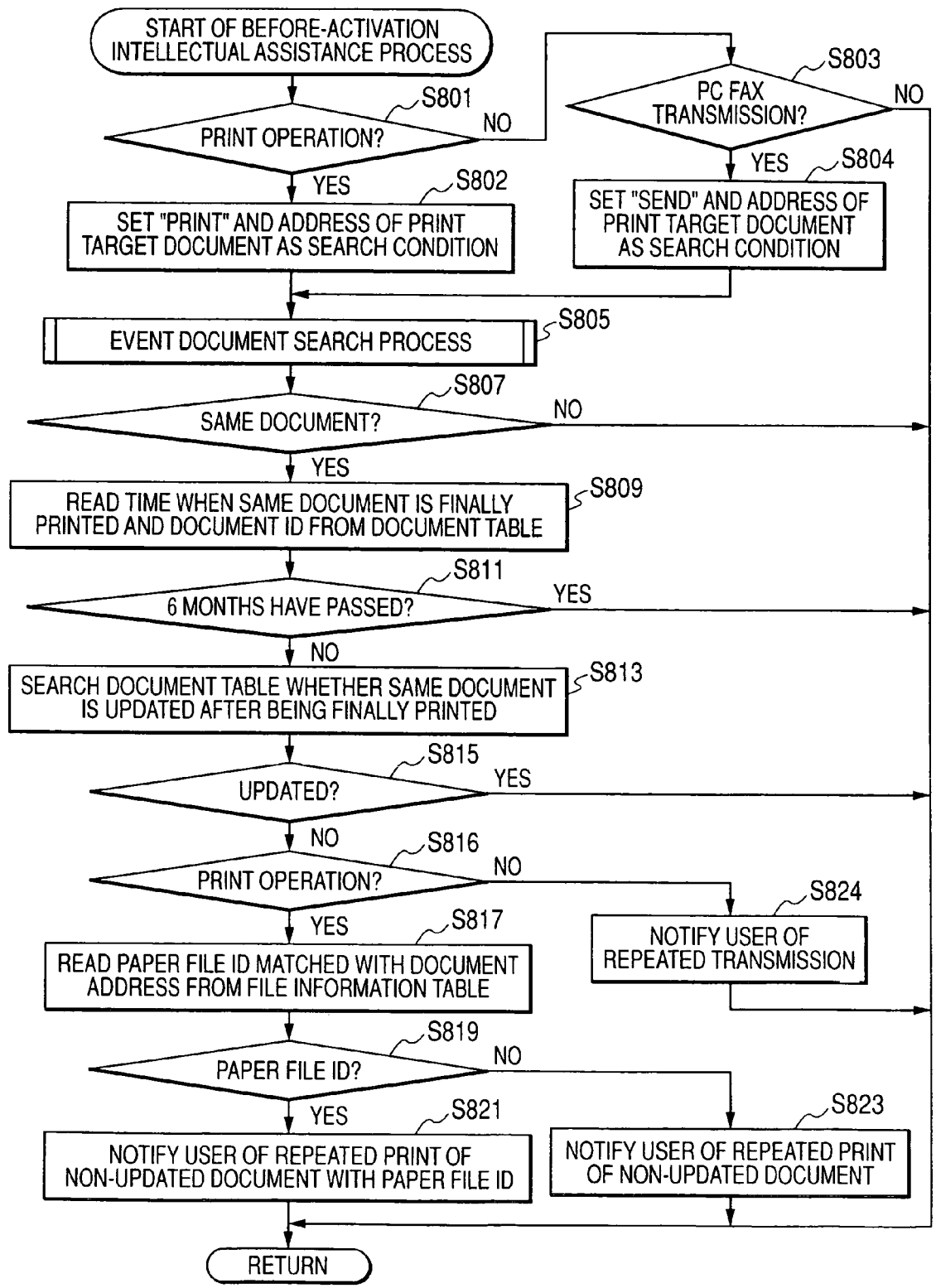
FIG. 8 is a diagram illustrating a flow of a before-activation intellectual assistance process according to the illustrative aspect of the invention.

FIG. 8 is a diagram illustrating a flow of a before-activation intellectual assistance process.

When the before-activation intellectual assistance process is performed in step 705, it is first determined whether the input instruction for preparing for the activation of the external device is a printing instruction to the recording section 202 (step 801). When the input instruction is the printing instruction (step 801: YES), step 802 is performed. On the other hand, when the input instruction is not the printing instruction (step 801: NO), it is determined whether the input instruction for preparing for the activation of the external device is a PC fax transmission instruction to the line transmission section 212 (step 803). When the input illustration is the fax transmission instruction (step 803: YES), the process proceeds to step 804. When the input instruction is not the PC fax transmission instruction (step 803: NO), the control section ends the before-activation intellectual assistance process and waits again in step 701 until an instruction for performing another process is input.

In step 802, in order to confirm whether the same document data as the document data to be printed exist in the previously printed documents, that is, in the documents of which the event is stored as "print" in the document table shown in FIG. 3, the event "print" and the address of the document data to be printed are set as search conditions and an event document search process is performed on the basis of the two search conditions (step 805).

In step 804, in order to confirm whether the same document data as the document data to be transmitted in a PC fax manner and a record of transmission to the same designation exist in the previously transmitted documents, that is, in the documents of which the event is stored as "send" in the document table shown in FIG. 3, the event "send", the destination address (fax number) of the PC fax transmission, and the address of the document data to be transmitted are set as search conditions and the event document search process is performed on the basis of the two search conditions (step 805).

Figure 9:
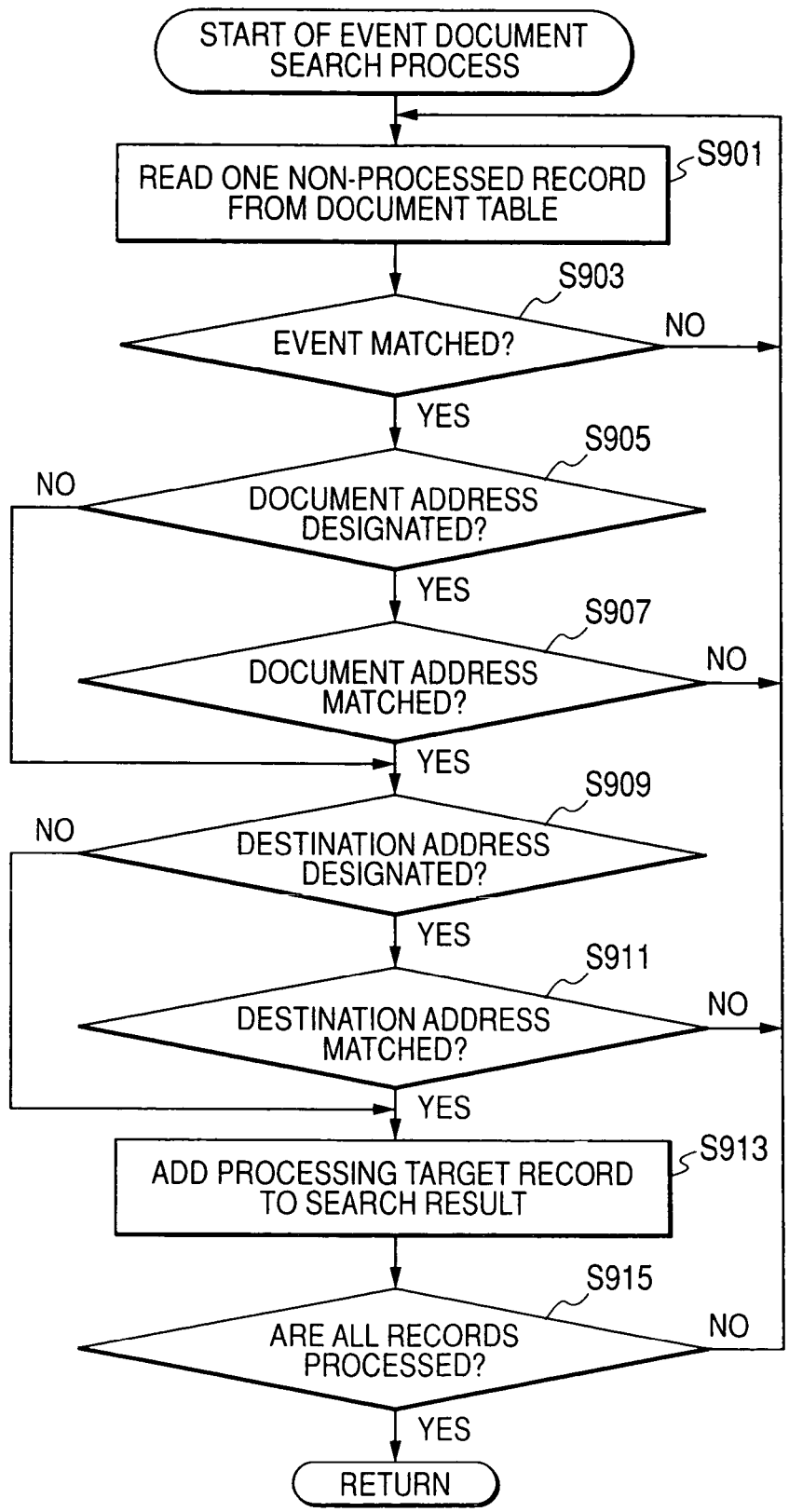
FIG. 9 is a diagram illustrating a flow of an event document search process according to the illustrative aspect of the invention.

FIG. 9 is a diagram illustrating a flow of the event document search process. When the process starts, the control section 100 first reads one record, to which the process is not performed yet, from a document database 1083 (step 901). Then, the control section determines whether an event of the record to be processed is matched with the event "print" ("send") set as the search condition in step 802 (or step 804) (step 903). Here, when the event of the record to be processed is not "print" ("send") (step 903: NO), the record is excluded from the processing target and the process of step 901 is performed again.

On the other hand, when the event of the record to be processed is "print" ("send") (step 903: YES), the control section determines whether the document address is set as the search condition of step 802 (or step 804) (step 905).

When it is determined in step 905 that the document address is set as the search condition of step 802 (or step 804) (step 905: YES), it is determined whether the document address of the record to be processed is matched with the document address designated as the search condition (step 907). When it is determined that the document addresses are matched with each other (step 907: YES), the process of step 909 is performed. When it is determined that the document addresses are not matched with each other (step 907: NO), the process of step 901 is performed again.

When it is determined in step 905 that the document address is not set as the search condition (step 905: NO), the process of step 907 is not performed, but the process of step 909 is performed.

When it is determined in step 909 that the destination address is set as the search condition of step 802 (or step 804) (that is, step 909: YES, when step 804 is performed), it is determined whether the destination address of the record to be processed is matched with the destination address designated as the search condition (step 911). When it is determined that the destination addresses are matched with each other (step 911: YES), the process of step 913 is performed. When it is determined that the destination addresses are not matched with each other (step 911: NO), the process of step 901 is performed.

When it is determined in step 909 that the destination address is not set as the search condition (that is, step 909: NO, when step 802 is performed), the process of step 911 is not performed, but the process of step 913 is performed.

When it is not determined in step 911 whether the destination addresses are matched with each other (step 905: NO or step 907: YES and step 909: NO), or when it is determined in step 911 that the destination addresses are matched with each other (step 905: NO or step 907: YES, step 909: YES, and step 911: YES), it is considered that the document data set as the search condition are previously printed or the document data set as the search condition are previously transmitted to the same designation, and thus the record to be processed is added to the search result (step 913).

Thereafter, it is determined in step 915 whether the event document search process has been performed to all the records of the document table. When the process has not been performed to all the records (step 915: NO), the process of step 901 is performed again. When the process has been performed to all the records (step 915: YES), the event document search process is finished and the process of step 807 is performed.

In step 807, it is determined whether the same document exists through the event document search process of step 805. Here, when it is determined that the same document does not exist (step 807: NO), the document data to be processed are not printed or transmitted to the same designation. Accordingly, the control section does not perform the subsequent processes (that is, performs the print or transmission process), but waits until the next input is performed.

On the contrary, when the same document exists (step 807: YES), the ID and time associated with the latest record (finally printed or transmitted) are read from the records, which determined to be identical (step 809) and it is then determined whether the time passes 6 months from the present time (step 811).

When it is determined that the time passes 6 months (step 811: YES), the document data to be processed are redundantly printed or transmitted to the same designation. However, since a considerable time has passed from the final print or transmission, the control section does not perform the subsequent processes (that is, performs the print or transmission process), but waits again in step 701 until the next input is performed.

On the contrary, when it is determined that the time does not pass 6 months (step 811: NO), it is determined from the document table (see FIG. 3) whether the same document is updated (event "update") after finally printed (event "print") or transmitted (event "send") (step 813).

When it is determined in step 815 that the same document is updated (step 815: YES), the control section performs the print or transmission process and then waits in step 701 until the next input is performed. On the other hand, when it is determined that the same document is not updated (step 815: NO), the type of manipulation is determined. When the manipulation indicates a print process (step 816: YES), the paper file ID corresponding to the document address is read from the file information table 1085 (step 817) so as to determine whether the previously printed document is managed in the file information table 1085 (see FIG. 4) along with the paper file ID thereof.

When it is determined in step 817 that the corresponding paper file ID exists in the file information table 1085, it is notified to the user in the manner shown in FIG. 10A that this print job is to redundantly print the non-updated document with the paper file ID (step 821).

On the other hand, when the corresponding paper file ID does not exist in the file information table 1085, it is notified to the user in the manner shown in FIG. 10B that the non-updated document is redundantly printed (step 823).

When the manipulation indicates a PC fax transmission (step 816: NO), it is notified to the user in the manner shown in FIG. 10C that the same document is transmitted to the same designation (step 824).

(During-Activation Intellectual Assistance Process)

FIG. 11 is a diagram illustrating a flow of a during-activation intellectual assistance process.

In step 711, when the during-activation intellectual assistance process is performed, the control section 100 of the PC 10 first reads the status ID, the destination address, and the target document address input (detected) from the external device in step 709 (step 1101) and performs a GID search condition setting process (step 1103).

Figure 12:
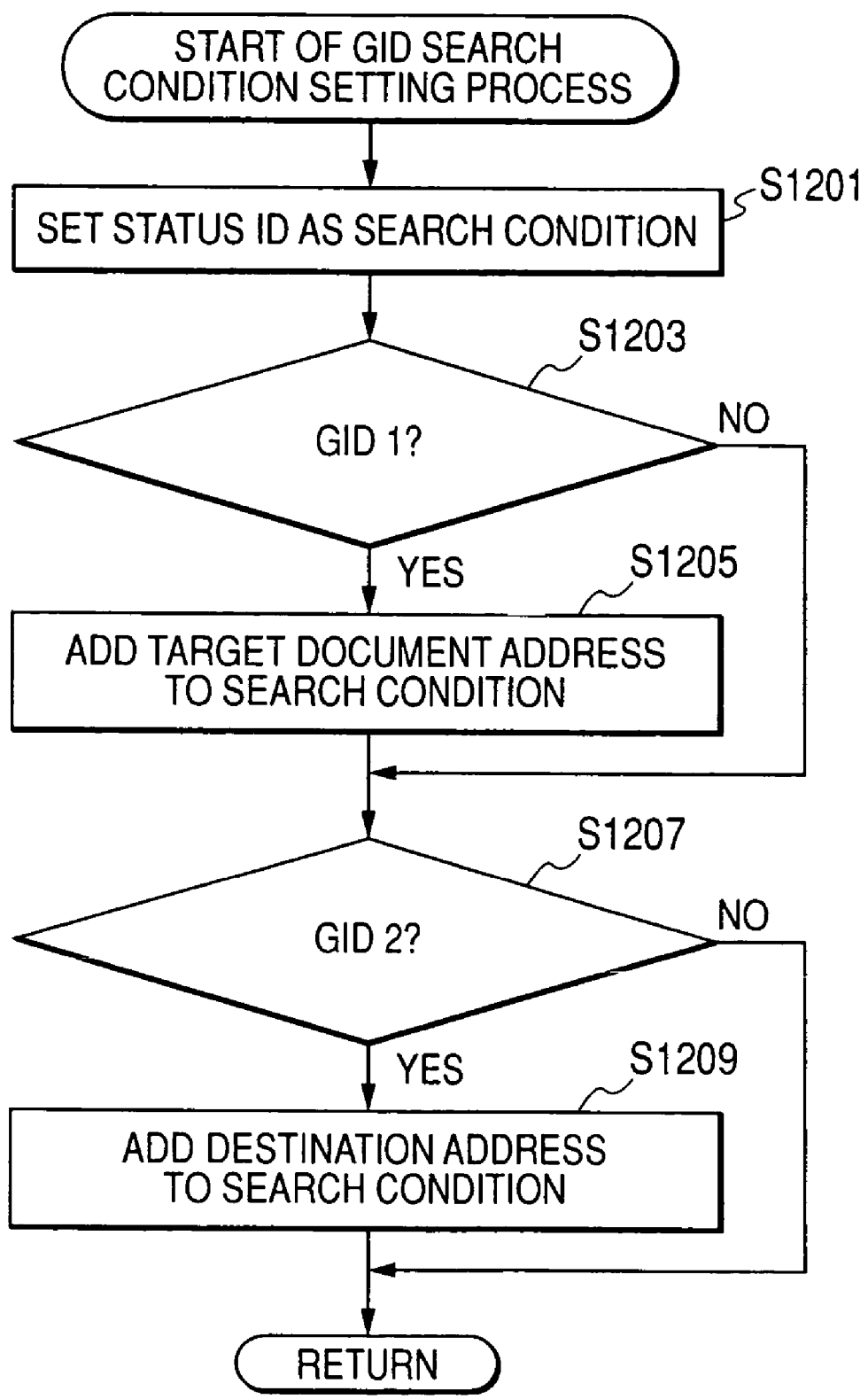
FIG. 12 is a diagram illustrating a flow of a GID search condition setting process according to the illustrative aspect of the invention.

FIG. 12 is a diagram illustrating a flow of a GID search condition setting process. First, the status ID (see FIGS. 2A and 2B) is set as the search condition (step 1201). Next, in order to specify a search condition for performing the search in a so-called "AND condition" with the status ID set in step 1201 when the document search process of step 1105 is performed, the format of a GID is determined to extract a search condition specific to the respective processing operations. That is, it is first determined whether the GID of the status ID set in step 1201 is "1" (see FIG. 2B) (step 1203).

When it is determined in step 1203 that the GID is "1" (step 1203: YES), the target document address is added as the search condition (step 1205) and the process of step 1207 is performed. When it is determined in step 1203 that the GID is not "1", the process of step 1205 is not performed, but the process of step 1207 is performed.

In step 1207, it is determined whether the GID of the status ID set in step 1201 is "2" (see FIG. 2B) (step 1207).

When it is determined in step 1207 that the GID is "2" (step 1207: YES), the destination address is added as the search condition (step 1209). The GID search condition setting process is finished and then the document search process (step 1105) is performed using the search conditions specified through the GID search condition setting process.

On the other hand, when it is determined in step 1207 that the GID is not "2", the GID search condition setting process is finished. Then, the document search process (step 1105) is performed using the search conditions specified through the GID search condition setting process.

When "NO" is determined together in steps 1203 and 1207, it is the case in which the GID corresponding to the status ID is "0."

Figure 13:
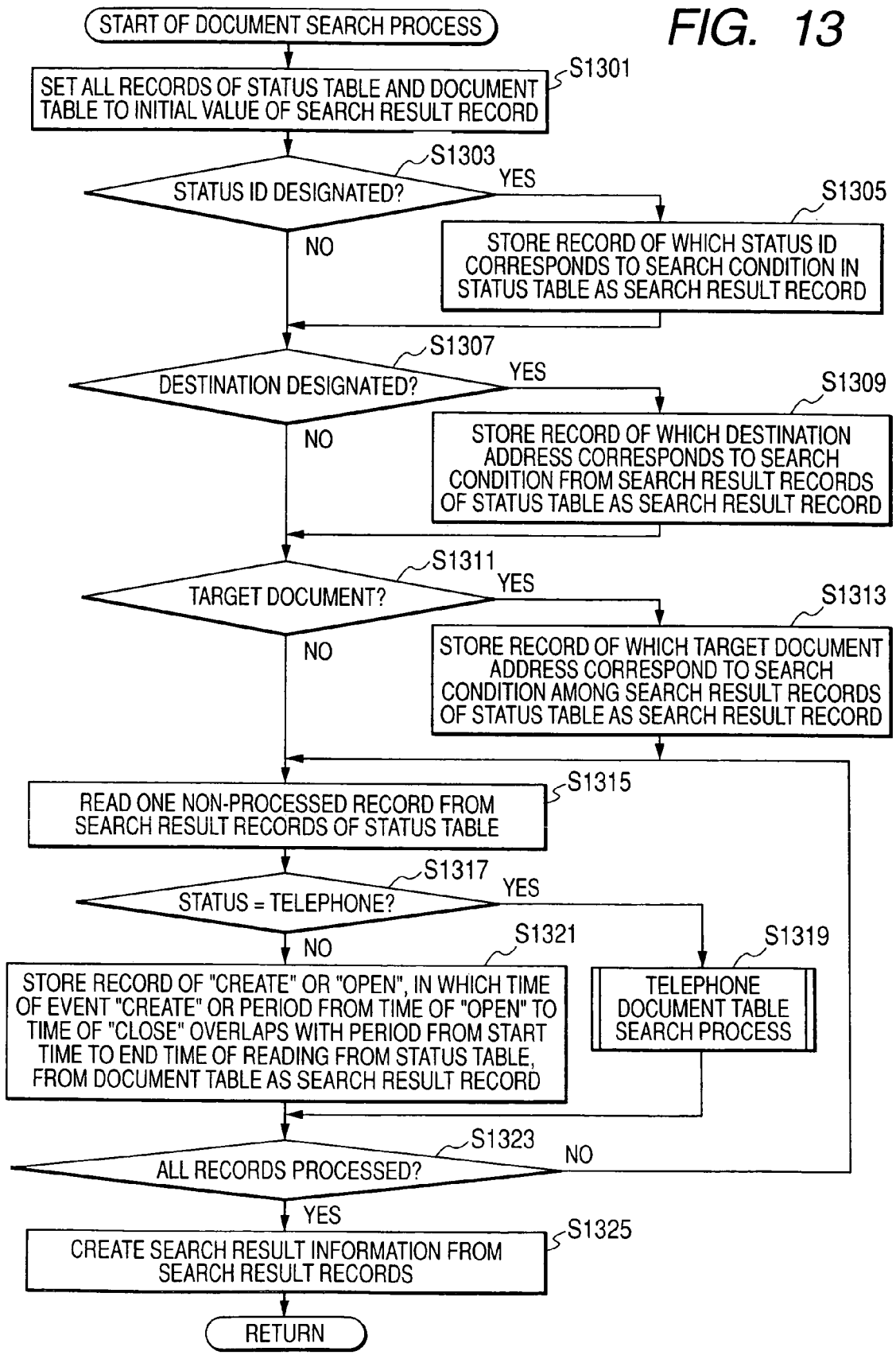
FIG. 13 is a diagram illustrating a flow of a document search process according to the illustrative aspect of the invention.

FIG. 13 is a diagram illustrating a flow of the document search process (step 1105). First, all the records of the status table 1081 and the document table 1083 are set to the initial value of a search result record (step 1301).

Next, in order to specify a target document associated with a specific record from the status table 1081, a search process is performed with the search conditions set in the GID search condition setting process (step 1103) previously performed.

That is, first, it is determined in step 1303 whether the status ID is designated as the search condition (step 1303). In the during-activation intellectual assistance process (step 711), the status ID is generally set as the search condition in step 1201. Accordingly, the determination of step 1303 is "YES", a record corresponding to the status ID set as the search condition from the status table 1081 is stored as a new search result record (step 1305), and then the process of step 1307 is performed.

In step 1307, it is determined whether the destination address is set as the search condition, that is, whether the determination of step 1207 is "YES" and the destination address is added as the search condition in step 1209. When it is determined that the destination address is set (step 1307: YES), a record corresponding to the destination address designated as the search condition from the search result records stored in step 1305 is stored as a new search result record (step 1309), and then the process of step 1311 is performed. When it is determined in step 1307 that the destination address is not set as the search condition (step 1307: NO), the process of step 1309 is not performed, but the process of step 1311 is performed.

It is determined in step 1311 whether the target document address is set as the search condition, that is, whether the determination of step 1203 is "YES" and the target document address is set as the search condition in step 1205. When it is determined that the target document address is set (step 1311: YES), a record corresponding to the target document address designated as the search condition from the search result records stored in step 1305 is stored as a new search result record (step 1313), and then the process of step 1315 is performed. When it is determined in step 1311 that the target document address is not set as the search condition (step 1311: NO), the process of step 1313 is not performed, but the process of step 1315 is performed.

In steps 1309 and 1313, a new search result record corresponding to the respective search conditions is stored on the basis of the search result record specified in step 1305. This is because only one GID corresponding to the respective status ID is set (see FIG. 2B).

In step 1315, in order to perform the processes subsequent to the process of step 1317, one non-processed search result record (substantially one record in the status table 1081) is read from the search result records specified in steps 1303 to 1313 and the process of step 1317 is performed.

In step 1317, it is determined whether the status ID of the record read in step 1315 indicates a telephone communication (for example, "TLT" or TLR"). When it is determined that the record indicates the telephone communication (step 1317: YES), a telephone document table search process is performed in step 1319.

Figure 14:
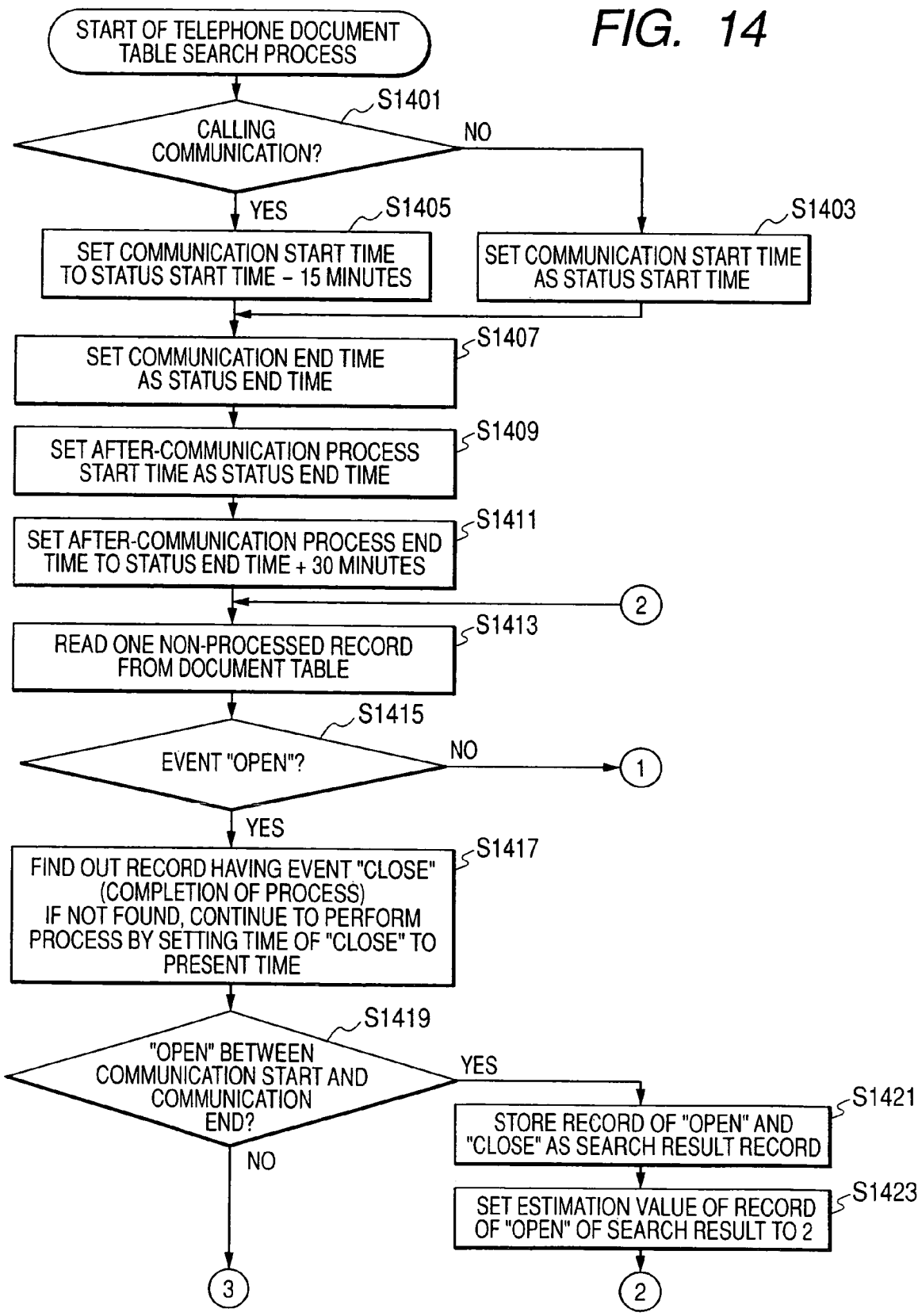
FIG. 14 is a diagram illustrating a flow of the document search process according to the illustrative aspect of the invention.

FIG. 14 is a diagram illustrating a flow of a telephone document table search process (step 1319).

In the telephone document table search process, it is first determined whether the status ID of the record read in step 1315 indicates a communication resulting from telephone transmission (step 1401). When it is determined that the status ID does not indicate the communication resulting from telephone transmission (the status ID is "TLR") (step 1401: NO), a communication start time is set to the start time of the record (step 1403) and then the process of step 1407 is performed.

When the status ID of the record read in step 1315 indicates the communication resulting from telephone transmission (the status ID is "TLT") (step 1401: YES), the communication start time is set to a time (hereinafter, also referred to as before-calling process start time), which retroacts by 15 minutes from the start time of the record (step 1405).

Accordingly, even when the communication uses the information treated by the PC 10 before the communication resulting from telephone transmission, it can be considered that the communication operation, the recorded communication details, and the information treated before the communication resulting from telephone transmission are correlated with each other.

Thereafter, in step 1407, a communication end time is set to the end time of the record. Then, an after-communication process start time is set to the end time of the record (step 1409) and an after-communication process end time is set to a time elapsing 30 minutes after the end time of the record (step 1411), thereby correlating after-communication treatment of the information such as information, which is a topic during the communication or an established schedule necessary for the communication with the communication.

A non-processed record, which is not processed yet is read from the document table 1083 in step 1413 and it is determined whether the event of the record is "open." When it is determined that the event is "open" (step 1415: YES), a record closest to the time registered in the record to be searched is searched as "close" corresponding to "open" out of the records in which a time later than that of the record to be searched as a record comprising the same document address as the document address of the record is set, an event of the time closest to the time registered in the record to be searched among the records and in which the event is "close." The record is set to a completion of process so as not to process the record again in step 1413. When no record of "close" corresponding to "open" exists, the time of "close" is set to the present time and then the process is continued (step 1417).

It is determined whether the event of the record processed in step 1413 is "open" between the predetermined communication start time and the after-communication process end time. When it is determined that the event is "open" (step 1419: YES), the record of which the event is "open" and "close" corresponding thereto is stored as the search result record in the search result table 1089 (step 1421).

The document file indicated by the records is a document file, which is opened and used from the communication start time to the after-communication process end time, that is, on the basis of the communication, and is considered as having a high correlation with the communication details. Accordingly, an estimation value of the record comprising the event "open" of the search result is set to "2" and is set in the weight field of the search result table 1089 (step 1423). Then, the process of step 1413 is performed.

In the illustrative aspect, the estimation value can be set to "2" and "1", and the larger value has the larger correlation. The estimation value is not limited to the above-mentioned numerals, but may be set to "5" or "10" and may not be expressed by numerals. The estimation values may be set by the user, or may be set in advance in the device.

Figure 15:
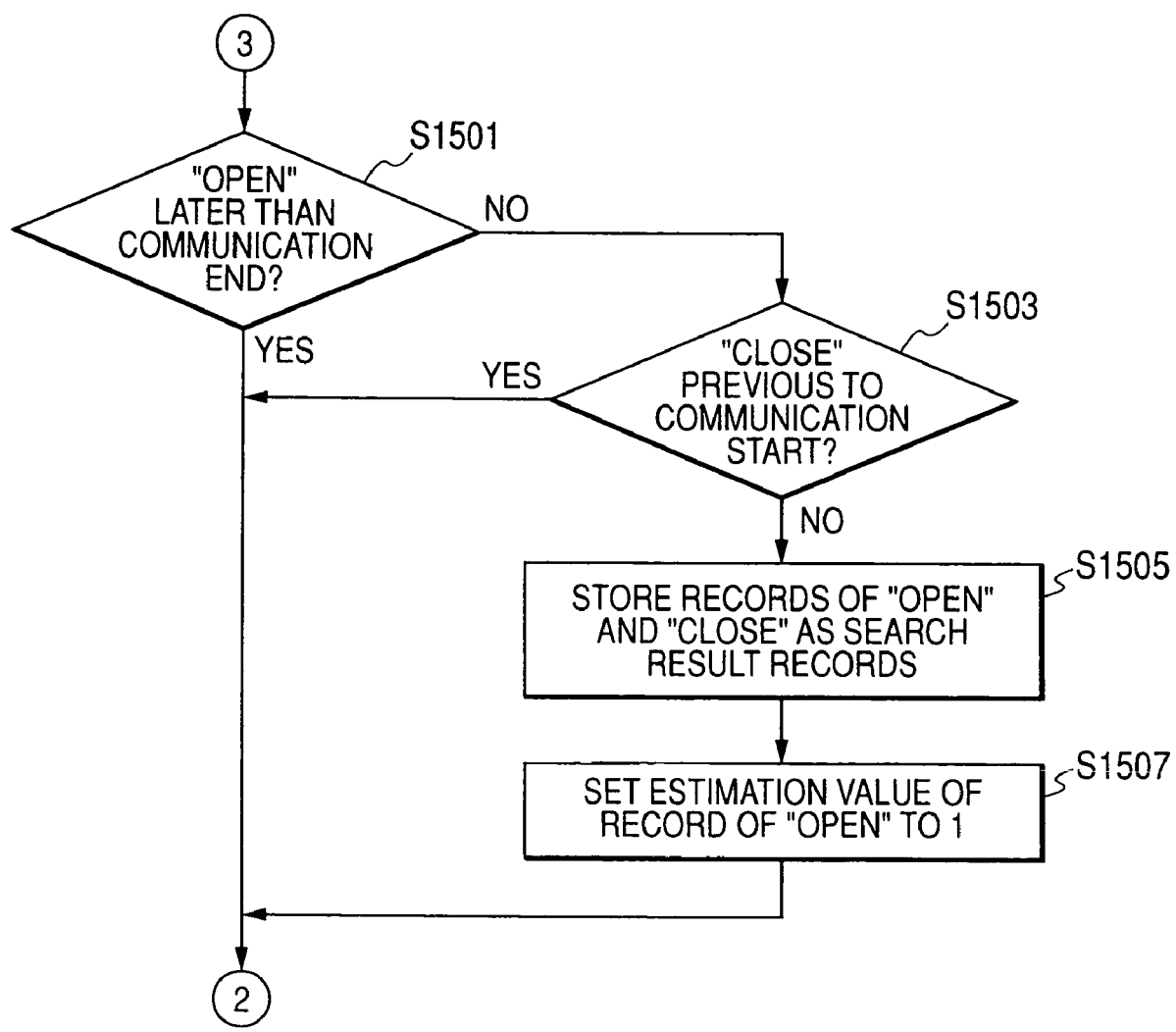
FIG. 15 is a diagram illustrating a flow of the document search process according to the illustrative aspect of the invention.

When it is determined in step 1419 that the even is not "open" from the communication start time to the after-communication process end time (step 1419: NO), step 1501 of FIG. 15 is performed, in which it is determined whether the event "open" of the record is later than the communication end time. When the event is not later than the communication end time (step 1501: NO), it is determined whether the time of the corresponding "close" obtained in step 1417 is previous to the communication start time (step 1503).

When it is determined that the time of the corresponding "close" is not previous to the communication start time (step 1503: NO), the record of the event of "open" and "close" corresponding thereto is stored as the search result record in the search result table 1089 (step 1505).

Since the document is opened before the communication and is used during the communication, the document is correlated with the communication details but the correlation is not as strong as a document opened during the communication. Accordingly, the estimation value of the record of "open" is set to "1" and is stored in the weight field of the search result table 1089 (step 1507). Then, the process of step 1413 is performed.

When it is determined in step 1501 that the time written to the record with the event "open" is later than the communication end time, the process of step 1413 is performed.

Figure 16:
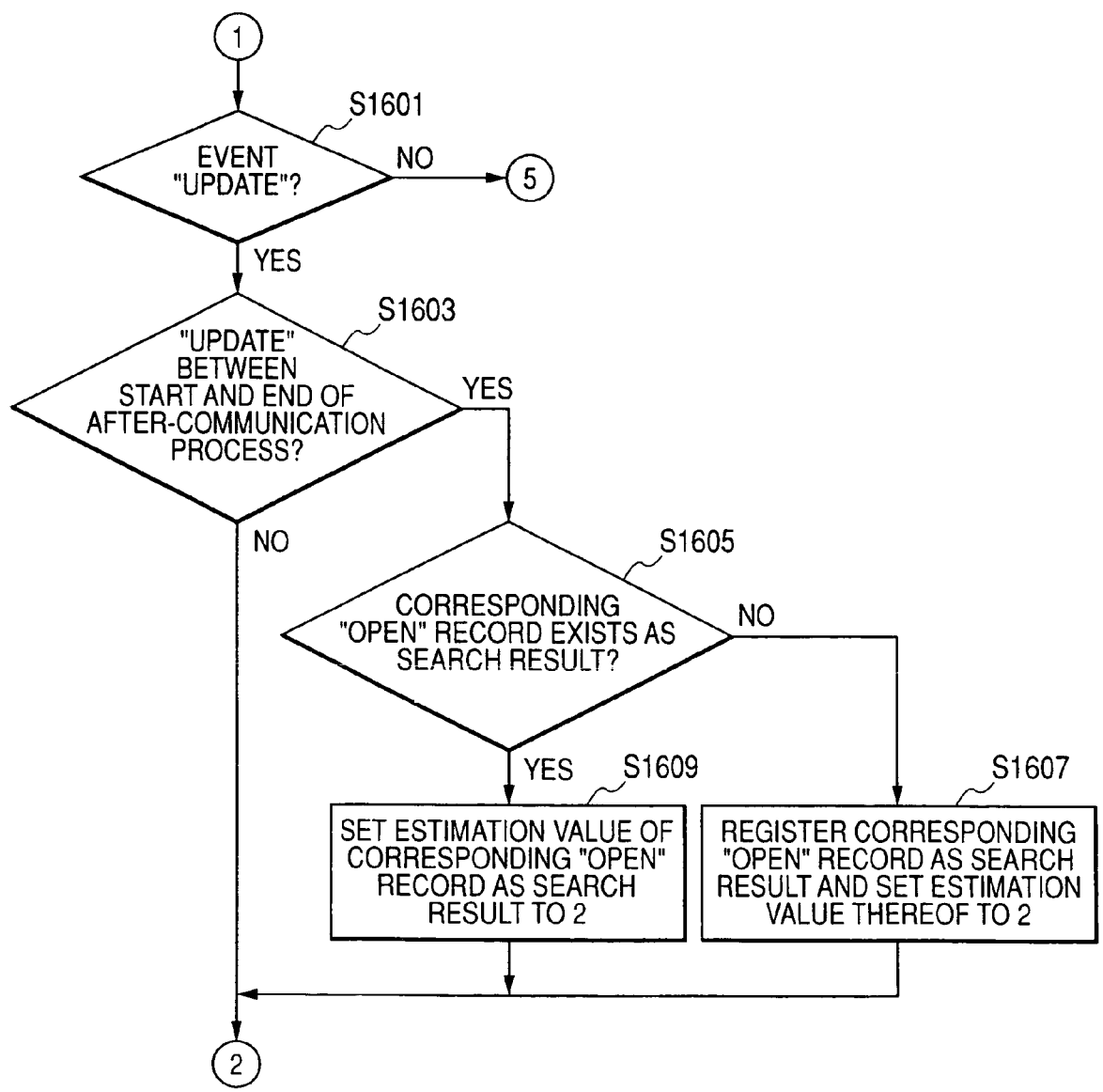
FIG. 16 is a diagram illustrating a flow of the document search process according to the illustrative aspect of the invention.

On the other hand, when it is determined step 1415 that the event of the record read from the document table is not "open" (step 1415: NO), the process of step 1601 in FIG. 16 is performed.

In step 1601, the control section 100 determines whether the event of the record read from the document table 1083 in step 1413 is "update." When it is determined that the event of the record is "update" (step 1601: YES), it is then determined whether the event "update" is set between the after-communication process start time and the after-communication process end time (step 1603). When it is determined that the event "update" is set during the period (step 1603: YES), in step 1605, a record comprising the shortest period is searched as the corresponding "open" record out of the records comprising the event "open", the same document address as the document address of the record comprising the event "update", and the time previous to that of the record to be searched, and it is determined whether the corresponding "open" record exists as a search result record in the search result table 1089.

When the corresponding "open" record does not exist as a search result record in the search result table 1089 (step 1605: NO), the corresponding "open" record is registered as a search result record in the search result table 1089. The document specified by the record is processed and then overwritten after the communication, information correlated with the communication details can be highly added to the document. Accordingly, the document is considered to have a correlation with the communication details, the estimation value is set to "2" (step 1607), the estimation value is stored in the weight field in the search result table 1089, and then the process of step 1413 is performed.

When it is determined in step 1605 that the corresponding "open" record exists as a search result record in the search result table 1089 (step 1605: YES), the estimation value of the search result record comprising the corresponding event "open" is set to "2" (step 1609), and is overwritten to and stored in the weight field of the corresponding record in the search result table 1089. Thereafter, the process of step 1413 is performed. Since the document of the record is processed, overwritten, and stored, the information associated with the communication details can be highly added to the document. Accordingly, the document is considered to have a high correlation with the communication details and the estimation value thereof is set to "2."

When it is determined in step 1603 that the event "update" is not set between the after-communication process start time and the after-communication process end time (step 1603: NO), the record is considered to have no correlation with the communication, a step of giving an estimation value is skipped, and the process of step 1413 is performed.

Figure 17:
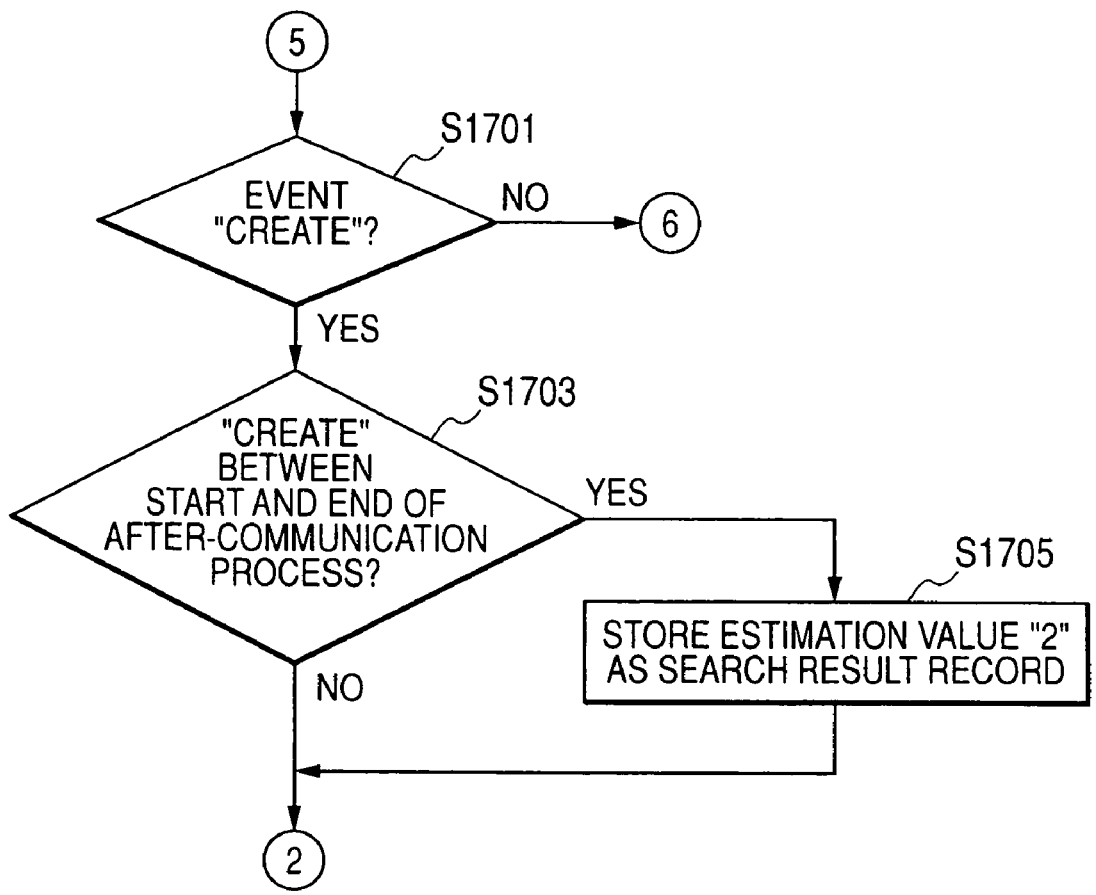
FIG. 17 is a diagram illustrating a flow of the document search process according to the illustrative aspect of the invention.

When it is determined in step 1601 that the event of the record read from the document table in step 1413 is not "open" and not "update" (step 1601: NO), the process of step 1701 in FIG. 17 is performed.

In step 1701, the control section 100 determines whether the event of the record read from the document table 1083 in step 1413 is "create." When it is determined that the event of the record is "create" (step 1701: YES), it is determined in step 1703 whether the record comprising the event "create" is set between the after-communication process start time and the after-communication process end time. When it is determined that the record comprising the event "create" is created in the above-mentioned period (step 1703: YES), the document file specified by the record needs be prepared through the communication. Accordingly, the document file is considered to have a high correlation with the communication, the record is registered as a search result record in the search result table 1089, and the estimation value "2" is stored in the field of the registered record (step 1705). Thereafter, the same processes repeat from step 1413.

When the record comprising the event "create" is not created in the period between the after-communication process start time and the after-communication process end time (step 1703: NO), the record is considered to have no correlation with the communication, no estimation value is not given to the record, and the same processes repeat from step 1413.

Figure 18:
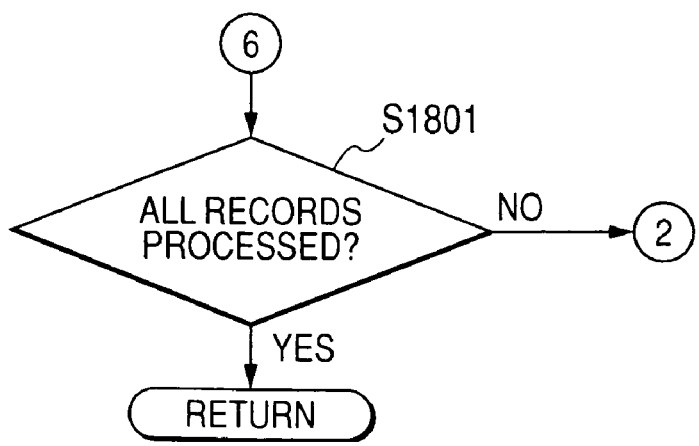
FIG. 18 is a diagram illustrating a flow of the document search process according to the illustrative aspect of the invention.

On the other hand, when it is determined in step 1701 that the event of the record read from the document table in step 1413 is not "create" (step 1701: NO), the process of step 1801 in FIG. 18 is performed.

In step 1801, the control section 100 determines from the document table 1083 whether all the non-processed documents in the document table 1083, which is not a search target are processed. When it is determined that all the documents are is not processed (step 1801: NO), the same processes repeat from step 1413. When it is determined that all the documents are processed (step 1801: YES), the telephone document table search process ends and the document search process of step 1323 is performed.

In the illustrative aspect, on the basis of a fact that the document file designated by the document address has been processed in any one of before the communication start time or the before-calling process start time, in the period specified by the communication start time or the before-calling process start time and the after-communication process end time, and in a period from the communication end time to the after-communication process end time, and the kinds of the event of the document file, a correlation is given, but the correlation may be given on the basis of only any one.

The communication start time has been set to the time retroacting by 15 minutes, but the retroacting time is not limited. For example, the retroacting time may be 10 minutes or 20 minutes, and no retroacting time may be provided. The retroacting time may be set by a user, or may be set in advance in the device. This is true of the case in which the after-communication process end time is set.

The communication start time is not limited to the time when the communication starts, but may be a time when a destination telephone number is input, an off-hook time, or a time when an operation associated with the communication is performed. Similarly, the communication end time is not limited to the time when the communication ends, but may be an on-hook time, or a time when an aphonic communication is lasted for a predetermined time.

On the other hand, it is determined in step 1317 whether the status ID of the read non-processed record indicates a telephone communication. When it is determined that the status ID does not indicate the telephone communication (step 1317: NO), the process of step 1321 is performed.

In step 1321, in the records stored in the document table 1083 and set to the initial value of the search result record in step 1301, when a period from the time registered in the record comprising the event "create" or "open" to the time registered in the record comprising the event "close" and the same document address as the document address of the record comprising the event "create" (that is, a period when it can be determined that the same document is "opened" or "treated" by the PC 10) overlaps with the period from the start time to the end time of the record read from the status table 1081 in step 1315, the record to be processed in the document table 1083 is set to comprise a weight of "1" and is stored as the search result record in the search result table 1089 (step 1321).

That is, in the process (step 1321), the document, which, it is determined, opened or treated at the same time as the external device suitable for the instructed search condition is extracted. In the information management system 1 according to the first illustrative aspect, the document data comprising the above-mentioned correlation are considered as having a high correlation with each other. Therefore, as described above, the records comprising the event "create" or "open" of which the processing times overlap with each other are stored as the search result records.

When the period from the time registered in the record comprising the event "create" or "open" to the time registered in the record comprising the event "close" and comprising the same document address as the document address of the record comprising the event "create" is determined, the identity of the user (operator in FIG. 3) is considered.

In step 1323, it is determined whether the process of step 1321 is performed to all the records stored as the search result records in the status table 1081. When it is determined that the process is performed to all the records (step 1323: YES), search result information is prepared from the search result table 1089 and the search result record of the status table 1081 based on the above-mentioned process (step 1325), and then the document search process (step 1105) ends. When it is determined that the process is not performed to all the records (step 1323: NO), the processes repeat from step 1315.

In the information management system 1 according to the illustrative aspect, since the records stored in the status table 1081 are stored as records in the document table at the time of performing the processing operation (see "Document Table Updating Process" to be described later), the records in both tables satisfy the search conditions in step 1321 and are stored as the search result records.

Accordingly, since the search result records stored based on the records stored through the same process is excluded, the start time or the end time of the search result record specified from the status table 1081 is preferably equal to the time of the document table 1083. In addition, even when the condition of step 1321 is satisfied, the search result records in which the target document address and the document address are identical are preferably not stored in step 1321.

When the document search process (step 1105) is finished, the control section 100 performs a process of displaying the search result based on the document search process (step 1105) (step 1107).

In the document search process, the determination using the overlapping of two periods has been performed. However, when the time registered in the record comprising the event "create", "open", or "close" is comprised in the period from the start time to the end time of the records in the status table 1081, both periods necessarily overlap with each other. Accordingly, except for the case in which the period from the start time to the end time of the record in the status table 1081 is all comprised in the period from the time registered in the record comprising the event "create" or "open" to the time registered in the record comprising the event "close" and comprising the same document address as the document address of the record comprising the event "create" or the like, it is preferable in view of rapid determination to employ this simple determination along with the determination of step 1321.

Similarly, when one of the start time and the end time of the record of the status table 1081 is comprised in the period from the start time of the record comprising the event "create" or "open" to the time registered in the record comprising the event "close" and comprising the same document address as the document address of the record comprising the event "create" or the like, both periods necessarily overlap with each other. Accordingly, as described above, it is preferable in view of rapid determination to employ this simple determination along with the determination of step 1321.

When the time registered in the record comprising the event "create", "open", or "close" overlaps with one of the start time or the end time of the record in the status table 1081, both periods necessarily overlap with each other. Accordingly, as described above, it is preferable in view of rapid determination to employ this simple determination along with the determination of step 1321.

Figure 19:
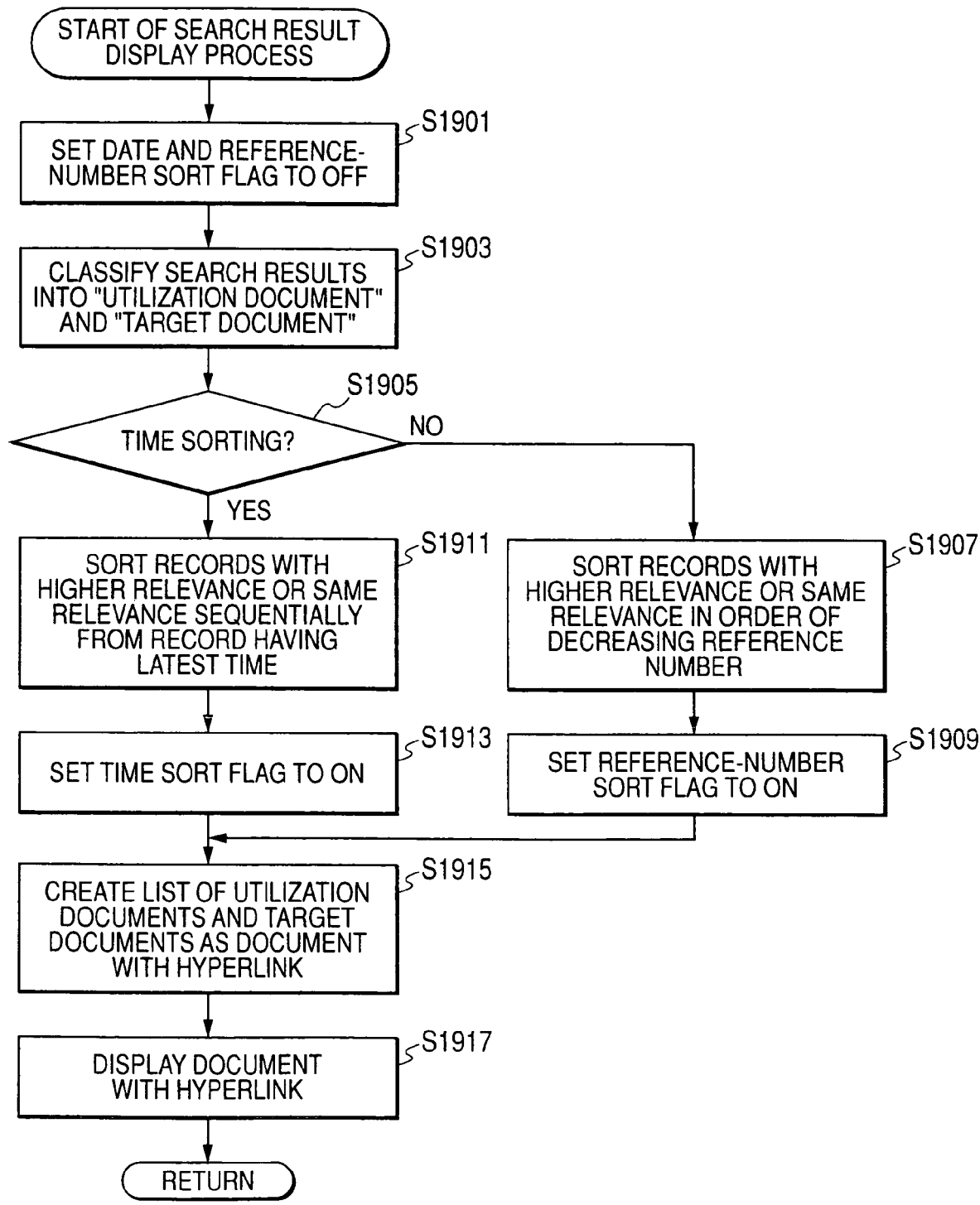
FIG. 19 is a diagram illustrating a flow of a search result display process according to the illustrative aspect of the invention.

FIG. 19 is a diagram illustrating a flow of a search result display process (step 1107). First, at the time of starting the process, the date and the reference sort flag are set to OFF (step 1901).

Next, the search result records specified as the search result information prepared in step 1325 are classified into search result records specified from the status table 1081 (specified through steps 1303 to 1313) and search result records (the search result table 1089) specified from the document table 1083 (specified through steps 1315 to 1323). The former is a search result associated with a target document and the latter is a search result associated with a utilization document. The search result records are classified into both search results (step 1903).

When the process of step 1903 is finished and then the search result information for classification into the utilization documents and the target documents in step 1903 is displayed, a process of determining in what order the utilization documents and the target documents are displayed is performed.

First, it is determined in step 1905 whether a time sorting method is selected for the display order (step 1905).

When the time sorting method is not selected (step 1905: NO), the search results comprising the same weight in the order of estimation values (weights) set in the document search process of step 1319 or comprising no weight (target documents) are sequentially sorted from the search result record comprising the largest weight and reference number on the basis of both search results classified into the utilization documents and the target documents in step 1903 (step 1907), and then the reference number sort flag is set to ON (step 1909). Thereafter, the process of step 1915 is performed.

On the other hand, when the time sorting method is selected (step 1905: YES), the control section 100 sequentially sorts the search results comprising the same weight in the order of weights set in step 1319 or having no weight (target documents) from the search result record comprising the latest time on the basis of both search results classified into the utilization documents and the target documents in step 1903 (step 1911), and then the time sort flag is set to ON (step 1913). Thereafter, the process of step 1915 is performed as described above.

In the information management system according to the illustrative aspect, the search result records can be sorted in the order of weights of the records and the search results comprising the same weight can be sorted using two items of time and reference number at the time of displaying the search results. Accordingly, it can be determined as follows in which of the time and the reference number the search results are sorted. That is, by determining whether the search results are sorted in one item, specifically, by determining whether the time sorting method is selected, it can be determined by the use of which of the time and the reference number a user intends to sort the search results (when the search results comprise the same weight and the time sorting method is not selected, it is considered that the reference number sorting method is selected).

When the search results are sorted in the order of weights, the time or the reference number, which is used to sort the search results may be selected by the user through the operation section 104, for example, after performing the process of step 1901 and before performing the process of step 1905.

In step 1915, lists of the utilization documents and the target documents are prepared so as to access the documents on the basis of the search result records sorted in accordance with the condition selected in step 1907 or 1911. The lists are displayed in step 1917.

In the information management system 1 according to the first illustrative aspect, when the activation of the external device is detected in step 707, the during-activation intellectual assistance process (step 711) is performed in response to the detection. Accordingly, since the documents, which are considered as being opened or treated at the same time in the past can be notified to the user with the detecting operation. As a result, when a process is necessary for the documents associated with this process, the necessary process can be performed at the same time.

For example, in case of fax transmission, it is possible to determine whether the documents opened at the time of the previous fax transmission should be transmitted by opening the documents.

FIGS. 20 to 23 are diagrams illustrating the process results of the during-activation intellectual assistance process displayed on the display section 106 of the PC 10 by performing step 1917.

Specifically, FIG. 20 shows a search result associated with the target document specified by performing the during-activation intellectual assistance process (step 711) when an instruction of printing documents data stored in the storage section 108 is given to the recording section 202 of the multifunctional machine 20 from the PC 10 (a PC print operation is performed as the processing operation: see FIG. 2B).

That is, when the PC print operation is performed, the document search process (step 1105) is performed on the basis of the target document address as a processing target of the PC print operation. As a result, the time when the target document data as a print target of the print operation were printed is displayed in the format shown in FIG. 20. In this case, the addresses and the reference numbers in FIG. 20 are displayed to be identical.

FIG. 21 shows a utilization document opened in the period in which the target document data as the present print target was being printed.

For example, when the ID in FIG. 2A is "sid1" (the start time of the record is "11:59:00 on Aug. 11, 2005" and the end time is "12:02:00 on Aug. 11, 2005") and the document addresses of the utilization documents associated with the target document of sid1 are "file://*/*/d2" and "file://*/*/d3" (in FIG. 3, the time registered in the ID utilizing the document address of the utilization document is "11:50:00 on Aug. 11, 2005" for did2, "12:00:00 on Aug. 11, 2005" for did6, and "12:01:00 on Aug. 11, 2005" for did8), the documents associated with "file://*/*/d2" and "file://*/*/d3" are opened in the period when the PC print operation associated with sid1 was being performed. Accordingly, predetermined details associated with the two utilization documents are displayed in the format shown in FIG. 21.

FIGS. 22 and 23 show display examples when the communication results from the telephone transmission (event "TLT" in FIG. 2B) or the telephone reception (event "TLR" in FIG. 2B) through the line communication section 2112 of the multifunction machine 20 in step 707) (the course to the display is the same as described above and thus is omitted).

In FIG. 20, since the processing operation is a PC print operation, the GID is "1" (see FIG. 2B), and the document search process (step 1105) is performed using the document address as the search condition, the addresses and the reference numbers are identical and only the times are different from each other. However, in case of the telephone transmission or the telephone reception, the GID is "2" (see FIG. 2B) and the document search process (step 1105) is performed without using the document address as the search condition. Accordingly, the target document addresses shown in "Address" of FIG. 22 are different from each other.

In the information management system 1 according to the first illustrative aspect, the addresses in FIGS. 20 to 23 are displayed in the hyperlink format (step 1917), and when the hyperlinks are selected using the operation section 104, the document data associated with the address are read from the storage section 108 and are displayed on the display section 106.

(Status Table Registering Process)

FIG. 24 is a diagram illustrating a flow of a registering process in the status table 1081 shown in FIG. 2A.

When the status table registering process is performed in step 715, the control section 100 of the PC 10 additionally creates a unique ID of a record to be registered in the status table 1081. Then, the control section registers the unique ID as an ID of the new record (step 2401) and then performs the process of step 2403.

In step 2403, the time when the activation of the external device is detected in step 707 and the time when the activation end of the external device of which the activation has been detected in step 707 is detected in step 713 are registered as the start time and the end time of the new record in step 2401, respectively, and the status ID, the destination address, the target document address, and the amount, which are input from the external device of which the activation has been detected and stored in the RAM or the like of the control section 100 in step 709 before the during-activation intellectual assistance process (step 711), are similarly registered in the new record in step 2401.

(Manual Intellectual Assistance Process)

Figure 25:
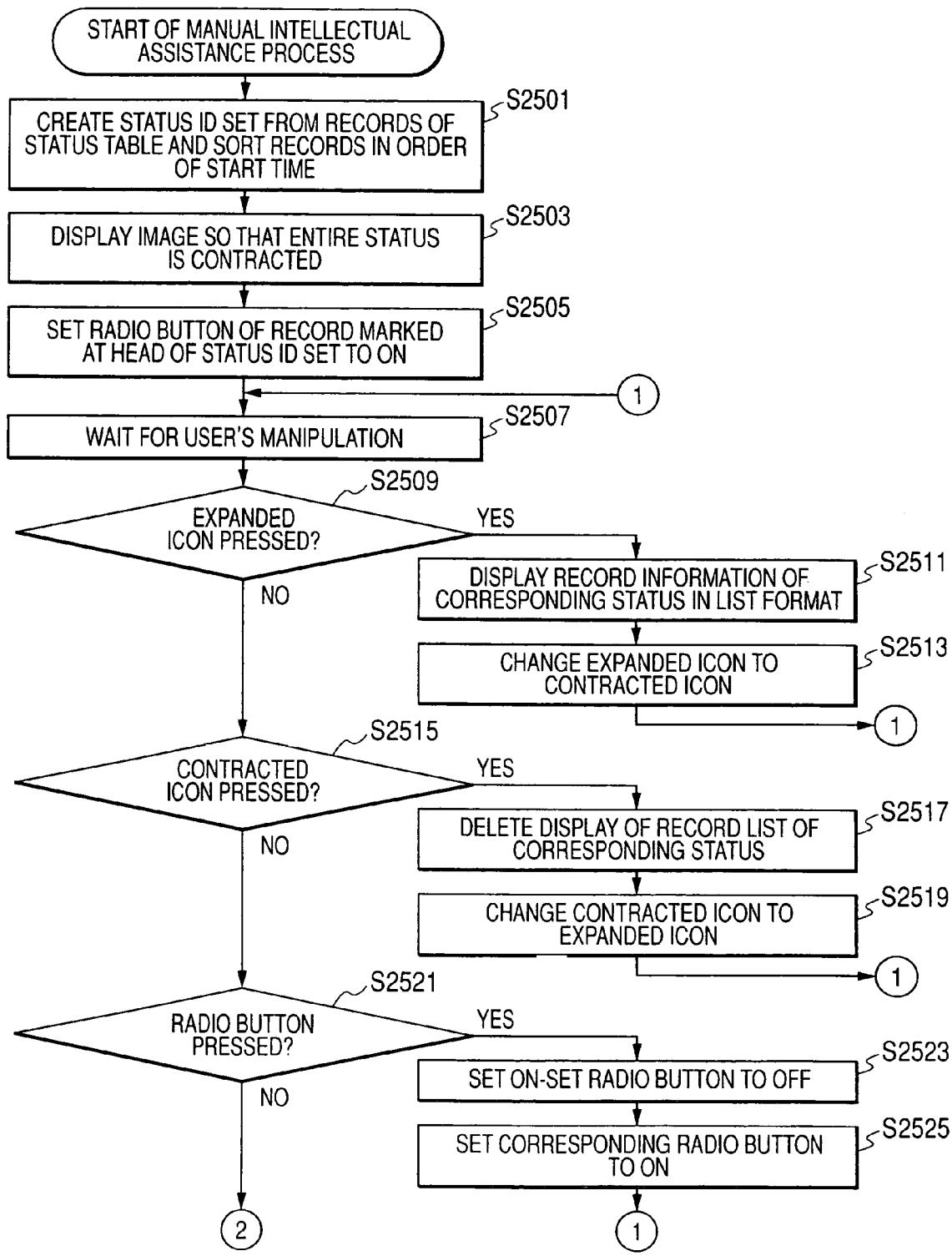
FIG. 25 is a diagram illustrating a flow of a manual intellectual assistance process according to the illustrative aspect of the invention.
Figure 26:
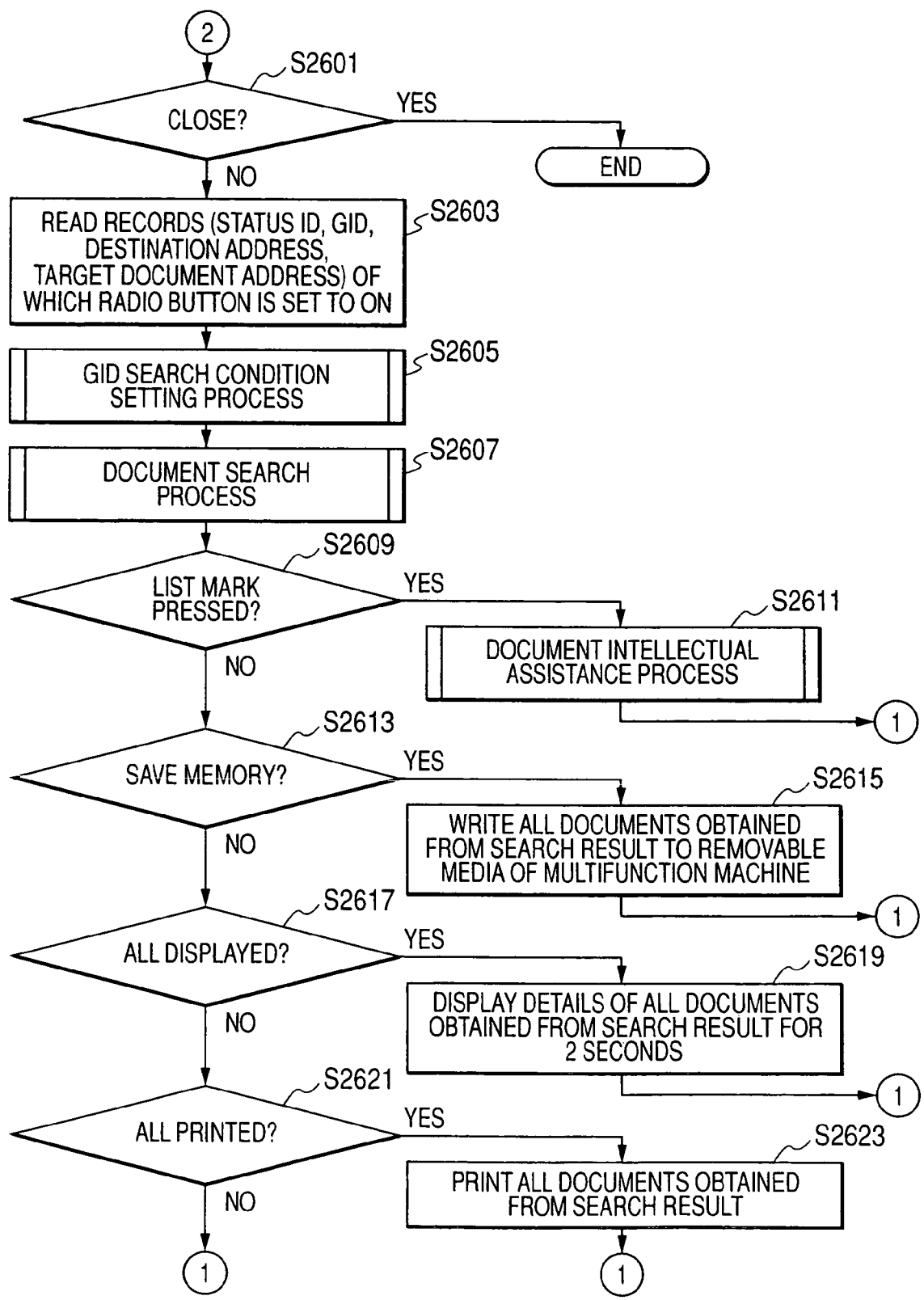
FIG. 26 is a diagram illustrating a flow of the manual intellectual assistance process according to the illustrative aspect of the invention.
Figure 28:
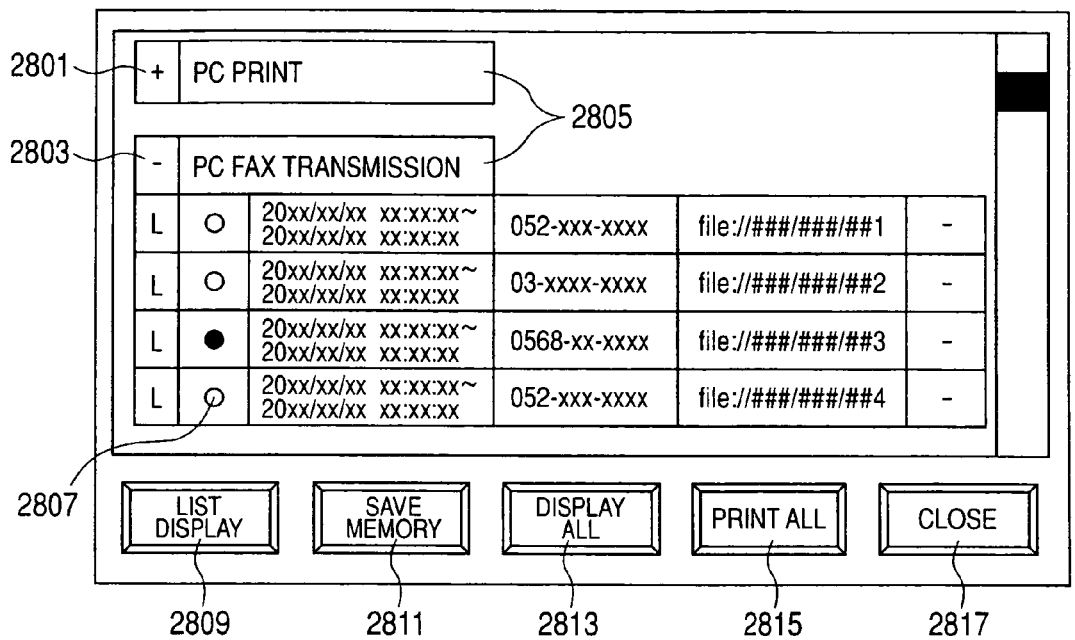
FIG. 28 is a diagram illustrating a display format (associated with the status table) of a search result in the manual intellectual assistance process according to the illustrative aspect of the invention.

FIGS. 25 and 26 are diagrams illustrating a flow of the manual intellectual assistance process. FIG. 28 is a diagram illustrating a display format of information displayed on the display section 106 of the PC with the performing of the manual intellectual assistance process.

In step 719, with the start of the manual intellectual assistance process, this process starts. This process operates in parallel to the PC main process shown in FIG. 7. That is, the process of step 719 proceeds to the process of step 701 without waiting for the end of the manual intellectual assistance process after the manual intellectual assistance process starts.

The control section 100 of the PC 10 creates a set of status IDs from the records of the status table 1081, performs a process of sorting the records of the set of status IDs in the order of start times (step 2501), and displays the result of the process on the display section 106 of the PC 10 (step 2503).

Here, in step 2503, the entire statuses 2805 are displayed in a contracted format, and specifically, only the titles of the processing operations indicated by the status IDs are displayed (see the display format of the PC print operation in FIG. 28).

In step 2505, in the display format displayed through the process of step 2503, a radio button 2807 (see FIG. 28) of the head record (the record sorted in the head in step 2501) of the status 2805 displayed at the uppermost position (PC print in FIG. 28) is set to ON with the initial setting (step 2505).

In the state in which the processes up to step 2505 are performed after the manual intellectual assistance process starts (step 719), the control section 100 waits until a user manipulates by the use of the operation section 104 (step 2507).

In the wait state (step 2507), when the user input an instruction by the use of the operation section 104, the control section 100 determines whether the instruction is to press an expanded icon 2801 (see FIG. 28) (step 2509).

Here, when the input instruction is to press the expanded icon 2801 (step 2509: YES), the record information of the status 2805 corresponding to the pressed expanded icon 2801 is displayed in a list format in response to the sorting process of step 2501 (step 2511) and the expanded icon 2801 of the expanded status 2805 is changed to a contracted icon 2803 (step 2513).

The processes of steps 2511 and 2513 are specifically described with reference to FIG. 28. In case of the PC fax transmission operation, the status 2805 is displayed along with the expanded icon 2801, similarly to the PC print operation, before the expanded icon 2801 is pressed (step 2509) (in other words, the list (records) is not displayed).

In this state, when the process of step 2509 is performed to the expanded icon 2801 for the PC fax transmission (step 2509: YES), the records of which the status IDs are marked "FPT" in the status table 1081 are displayed in the format shown in FIG. 28 in the sorting order of step 2501 (step 2511), and the expanded icon 2801 associated with the PC fax transmission is changed to the contracted icon 2803 (step 2513: the display is changed from "+" to "−"). At the time of first ending the process of step 2513, the process of step 2505 is valid, and all the radio buttons 2807 are set to OFF in the records displayed associated with the PC fax transmission.

On the other hand, in the wait state of step 2507, when the input instruction is not to press the expanded icon 2801 (step 2509: NO), but to press the contracted icon 2803 (step 2515: YES), the display in the PC fax transmission format shown in FIG. 28 is changed to the PC print format. That is, the display of the record list of the corresponding status 2305 is erased (step 2517) and the contracted icon 2803 is changed to the expanded icon 2801 (step 2519).

In the wait state of step 2507, when the input instruction is not to press the contracted icon 2803 (step 2515: NO), but to press the radio button 2807 (step 2521: YES), the radio button 2807 set to ON for a predetermined record (the head record of the uppermost status 2805 in the initial state) is changed to OFF (step 2523) and the radio button 2807 corresponding to the user's manipulation is set to ON (step 2525).

After the processes of step 2513, 2519, and 2525 are performed, the control section waits in step 2507 until the user's manipulation is performed.

Here, in the wait state of step 2507, when the instruction input by the user's manipulation is not to press any one of the expanded icon 2801, the contracted icon 2803, and the radio button 2807 (steps 2509, 2515, and 2521: NO), the process shown in FIG. 26 is performed.

That is, the control section 100 of the PC 10 determines whether the instruction input by the user's manipulation is the end of the manual intellectual assistance process, specifically, whether a closing button 2817 is pressed (step 2601). When it is YES (step 2601: YES), the process ends.

On the contrary, when the instruction is not to press the closing button 2817 (step 2601: NO), the instruction is to press a list display button 2809, a memory storage button 2811, an all display button 2813, or an all print button 2815. Accordingly, in order to perform the processes corresponding to the buttons, the records of which the radio button is set to ON (status ID, GID, destination address, target document) are read (step 2603).

The GID search condition setting process (step 2605) and the document search process (step 2607) are performed on the basis of the read information, and then the process of step 2609 is performed. Both processes performed in steps 2605 and 2607 are similar to the GID search condition setting process (step 1103) and the document search process (step 1105) performed in the during-activation intellectual assistance process (step 711), and thus description thereof is omitted.

In step 2609, it is determined whether the instruction, which is input through the user's manipulation of the operation section 104 and which results in the performing of the process of step 2603 is to press the list display button 2809.

When the instruction is to press the list display button 2309 (step 2609: YES), the document intellectual assistance process is activated by the use of the result of the document search process of step 2607 (step 2611). The details of the document intellectual assistance process are described later with reference to FIG. 27.

On the contrary, when the instruction is not to press the list display button 2809 (step 2609: NO), it is determined whether the instruction is to press the memory storage button 2811 (step 2613). When it is YES (step 2613: YES), the control section 100 instructs the multifunction machine 20 to write the document data of the document address described in the search result record obtained through the document search process (step 2607) to a removable media 2101, and transmits the corresponding document data from the storage section 108 to the multifunction machine 20 through the communication section 102. On the other hand, the control section 200 of the multifunction machine 20 writes the corresponding document data received through the communication section 214 in response to the instruction to the removable media 2101 (step 2615).

When the instruction is not to press the memory storage button 2811 (step 2613: NO), it is determined whether the instruction is to press the all display button 2813 (step 2617). When it is YES (step 2617: YES), the control section 100 opens the document data of the document address described in the search result record obtained through the document search process (step 2607), and sequentially displays the contents on the display section 106 with a predetermined interval of time, for example, 2 seconds (step 2619).

When the instruction is not to press the all display button 2813 (step 2617: NO), it is determined whether the instruction is to press the all print button 2815 (step 2617). When it is YES (step 2617: YES), the control section 100 transits the document data of the document address described in the search result record obtained through the document search process (step 2607) to the multifunction machine 20 through the communication section 102, and allows the recording section 202 of the multifunction machine 20 to print the document data (step 2623).

When the instruction is not to press the all print button 2815 (step 2621: NO), a process corresponding to the press is performed or it is determined that the press is erroneous. Then, the control section waits until the user's manipulation is performed (step 2507).

When the processes of steps 2611, 2615, 2619, and 2623 are finished, the control section waits in step 2507 until the user's input is performed.

Figure 27:
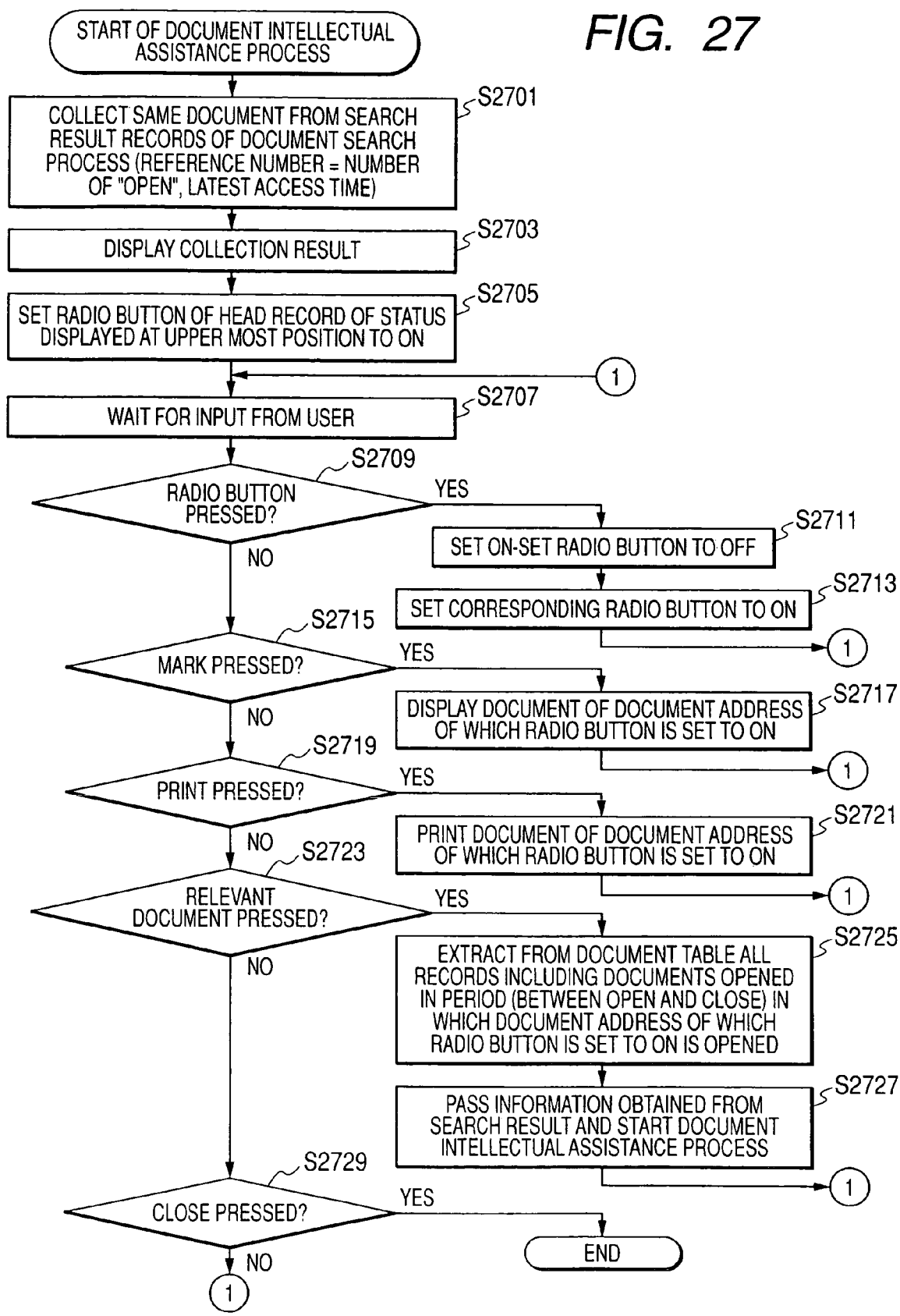
FIG. 27 is a diagram illustrating a flow of a document intellectual assistance process according to the illustrative aspect of the invention.
Figure 29:
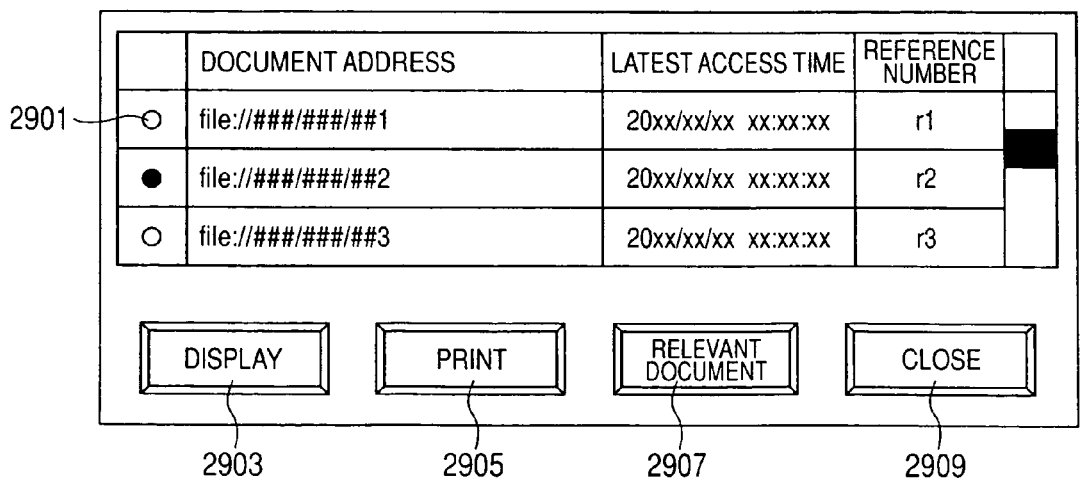
FIG. 29 is a diagram illustrating a display format (associated with the document table) of a search result in the manual intellectual assistance process according to the illustrative aspect of the invention.

FIG. 27 is a diagram illustrating a flow of the document intellectual assistance process started in step 2611. FIG. 29 is a diagram illustrating a display format of information displayed on the display section 106 of the PC 10 at the time of performing the document intellectual assistance process.

First, in step 2701, the control section 100 of the PC 10 collects the number of reference to the document data (the number of records of which the event is "open") of the same document address and the final access time (time described in the latest record) from the search result records obtained through the document search process (step 2607) by the use of the records comprising the same document address (step 2701), and then performs the process of step 2703.

In step 2703, the collection result is displayed in the format shown in FIG. 29 on the display section 106. At this time, the radio button of the head record among the displayed records is set to ON (step 2705).

Here, in the state in which the processes up to step 2705 are performed after the document intellectual assistance process starts (step 2611), the control section 100 waits until the user manipulates the operation section 104 (step 2707).

In the wait state (step 2707), when the user input an instruction through the operation section 104, the control section 100 determines whether the input instruction is to press the radio button 2901 (see FIG. 29) (step 2709). When it is YES (step 2709: YES), the process of step 2701 is performed.

In step 2707, the radio button 2901 set to ON in a predetermined record (the head record in the initial state) is set to OFF (step 2711) and the radio button 2901 corresponding to the user's manipulation is set to ON (step 2713).

On the other hand, when it is determined in step 2709 that the input instruction is not to press the radio button 2901, it is determined whether the input instruction is to press the display button 2903 (step 2715). When it is YES (step 2715: YES), the process of step 2717 is performed.

In step 2717, the document data of the document address in which the radio button is set to ON is opened and displayed on the display section 106.

When it is determined in step 2715 that the input instruction is not to press the display button 2903, it is determined whether the input instruction is to press the print button 2905 (step 2719). When it is YES (step 2719: YES), the process of step 2721 is performed.

In step 2721, the control section 100 reads the document data of the document address, in which the radio button is set to ON, from the storage section 108 and transmits the document data to the multifunction machine 20 through the communication section 102, and the recording section 202 of the multifunction machine 20 prints the document data.

When it is determined in step 2719 that the input instruction is not to press the print button 2905, it is determined whether the input instruction is to press a relevant document button 2907 (step 2723). When it is YES (step 2723: YES), the process of step 2725 is performed.

In step 2725, all the records of which the event is "open" in the period (between open and close) when the document data of the document address in which the radio button 2901 is set to ON are opened are extracted from the document table 1081 (step 2725).

Specifically describing the process with reference to FIG. 29, since the document data stored at the document address "file:/###/###/###2" comprises the number of reference of r2, the document data are opened r2 times. Accordingly, the extraction is performed to all the r2 periods.

When the period when the document data of the document address in which the radio button 2901 is set to ON is determined, the identity of the user (operator in FIG. 3) is considered.

The document intellectual assistance process starts again with respect to the search result records obtained through the extraction process of step 2725 (step 2727).

That is, the user can sequentially see documents associated with a document by performing the document intellectual assistance process.

When it is determined in step 2723 that the input instruction is not to press the relevant document button 2907, the control section 100 determines whether the input instruction is to press the closing button 2909 (step 2729). When it is YES (step 2729: YES), the control section ends the document intellectual assistance process (step 2611) and waits in step 2507 until the user's manipulation is performed.

On the other hand, when it is determined that the input instruction is not to press the closing button 2909 (step 2729: NO), the control section performs a process corresponding to the press or determines that the press is erroneous, and waits until the user's manipulation is performed (step 2707).

After performing the processes of steps 2713, 2717, 2721, and 2727, the control section waits again in step 2707 until the user's input is performed.

(Process 2 of Information Management System)

Next, a process (2) of the information management system 1083 comprising the above-mentioned configuration is described with reference to the drawings. The process (2) starts in parallel to the process (1).

Figure 30:
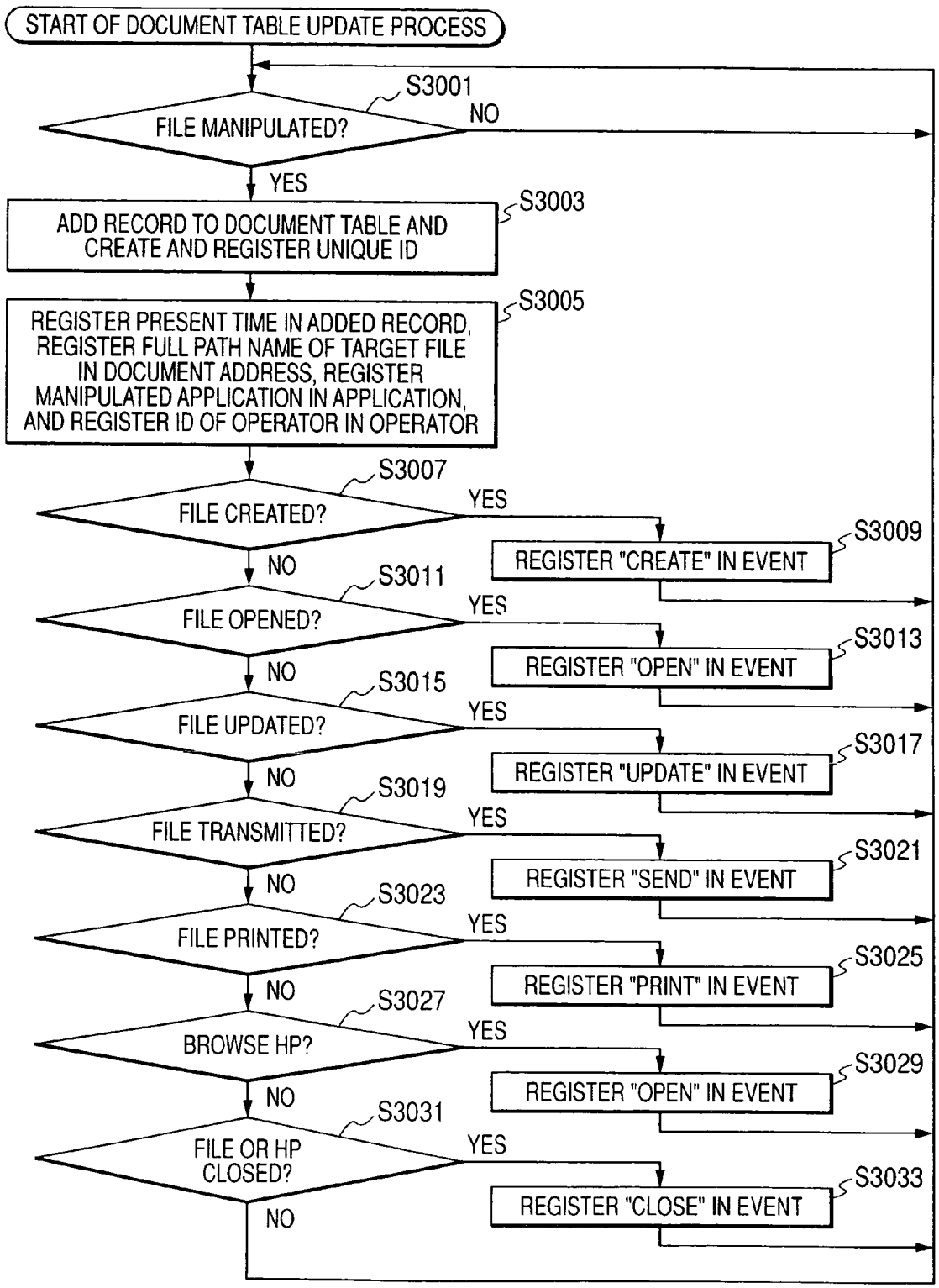
FIG. 30 is a diagram illustrating a flow of a document table updating process according to the illustrative aspect of the invention.

FIG. 30 is a diagram illustrating a flow of a process of updating the document table 1083 performed by the PC 10. The process (2) shown in the flow is performed by the control section 100 of the PC 10, and more specifically, is performed by the CPU of the control section 10 by the use of the program stored in the ROM or the like.

First, when the document data stored in the storage section 108 are manipulated by the use of the operation section 104 or the operation of the multifunction 20 is carried out, that is, when the target document data are transmitted to the PC 10 from the multifunction machine 20 by starting the processing operation (status) described as "(copied to PC)" among the items of the "target document address" of FIG. 2B, the target document data are newly stored in the storage section 108, the RFID tags 322 and 324 of the books 32 and 34 are read by the RFID tag reading section 306 of the book sensor 30, and the information is transmitted to the PC 10 through the communication section 34, the control section 100 determines whether a home page (hereinafter, referred to as "HP") on Internet 70, which introduces the book 32 or the like associated with the transmission from the book sensor 30, is opened (hereinafter, the manipulations or processes are referred to as "file manipulation") (step 3001).

When it is determined in step 3001 that the file manipulation is performed (step 3001: YES), the control section 100 adds a record to the document table 1083, creates an ID unique to the record, registers the unique ID (step 3003), and then performs the process of step 3005.

When it is determined in step 3001 that the condition is not satisfied (step 3001: NO), the control section waits until the file manipulation is performed.

In step 3005, the present time is registered to the record added in step 3003, registers an application obtained by preparing a full pass name of the target file with a application to the document address, and registers the type of the operator to the operator.

Thereafter, a process of determining information to be registered to the "event" not yet registered is performed (steps 3007 to 3033).

First, the control section 100 determines whether the file manipulation performed in step 3001 is to store a new document file in the storage section 108 (hereinafter, referred to as "file creation" (step 3007). The control section registers "create" as an event, when the file manipulation is the file creation (step 3007: YES).

On the other hand, when the file manipulation is not the file creation (step 3007: NO), the control section determines whether the file manipulation is to open the document file stored in the storage section 108 (hereinafter, referred to as "file opening") (step 3011). When it is YES (step 3011: YES), the control section registers "open" as an event (step 3013).

When it is not YES in step 3011 (step 3011: NO), it is determined whether the document data stored in the storage section 108 is updated (overwritten) (step 3015). When it is YES (step 3015: YES), "update" is registered as an event (step 3013).

When it is not YES in step 3015 (step 3015: NO), it is determined whether the document data stored in the storage section 108 is transmitted (the PC fax transmission is comprised) (step 3019). When it is YES (step 3019: YES), "send" is registered as an event (step 3021).

When it is not YES in step 3019 (step 3019: NO), it is determined whether the document data stored in the storage section 108 is printed (which corresponds to the status "PC fax transmission" in FIG. 2B) (step 3019). When it is YES (step 3021: YES), "send" is registered as an event (step 3021).

When it is not YES in step 3015 (step 3015: NO), it is determined whether the document data stored in the storage section 108 is printed (the recording section 202 of the multifunction machine 20 is used) (step 3023). When it is YES (step 3023: YES), "print" is registered as an event (step 3025).

When it is not YES in step 3023 (step 3023: NO), it is determined whether the HP is opened (step 3027). When it is YES (step 3027: YES), "open" is registered as an event (step 3029).

When it is not YES in step 3027 (step 3027: NO), it is determined whether the file or HP is closed, which corresponds to the file opening (step 3011) or the HP opening (step 3027) (step 3031). When it is YES (step 3031: YES), "close" is registered as an event (step 3029).

When it is not YES in step 3031 (step 3031: NO), the control section 100 waits until a file manipulation is performed again, after finishing the process of step 3009, 3013, 3017, 3021, 3025, 3029, or 3033.

Hitherto, the "document data" have been mainly exemplified in the description according to the first illustrative aspect. however, the data as a target of the information management system 1 are not limited to the "document data", but the same details (processes) may be performed to, for example, "image data", "sound data", other data, or mixtures of the data.

SECOND EXAMPLE

Hereinafter, an information management system different from the first illustrative aspect will be described specifically.

A second illustrative aspect of the invention is different from the first illustrative aspect, in that the "GID" used in the first illustrative aspect is not provided, that is, the "GID" is not defined in FIG. 2B and the "GID search condition setting process" is not performed in the during-activation intellectual assistance process and the manual intellectual assistance process. Therefore, the details of the same configuration and process order are omitted but only differences are described in the following description (since the process order in the manual intellectual assistance process is similar to the during-activation intellectual assistance process, the during-activation intellectual assistance process is substantially described in the second illustrative aspect).

(During-Activation Intellectual Assistance Process)

Figure 31:
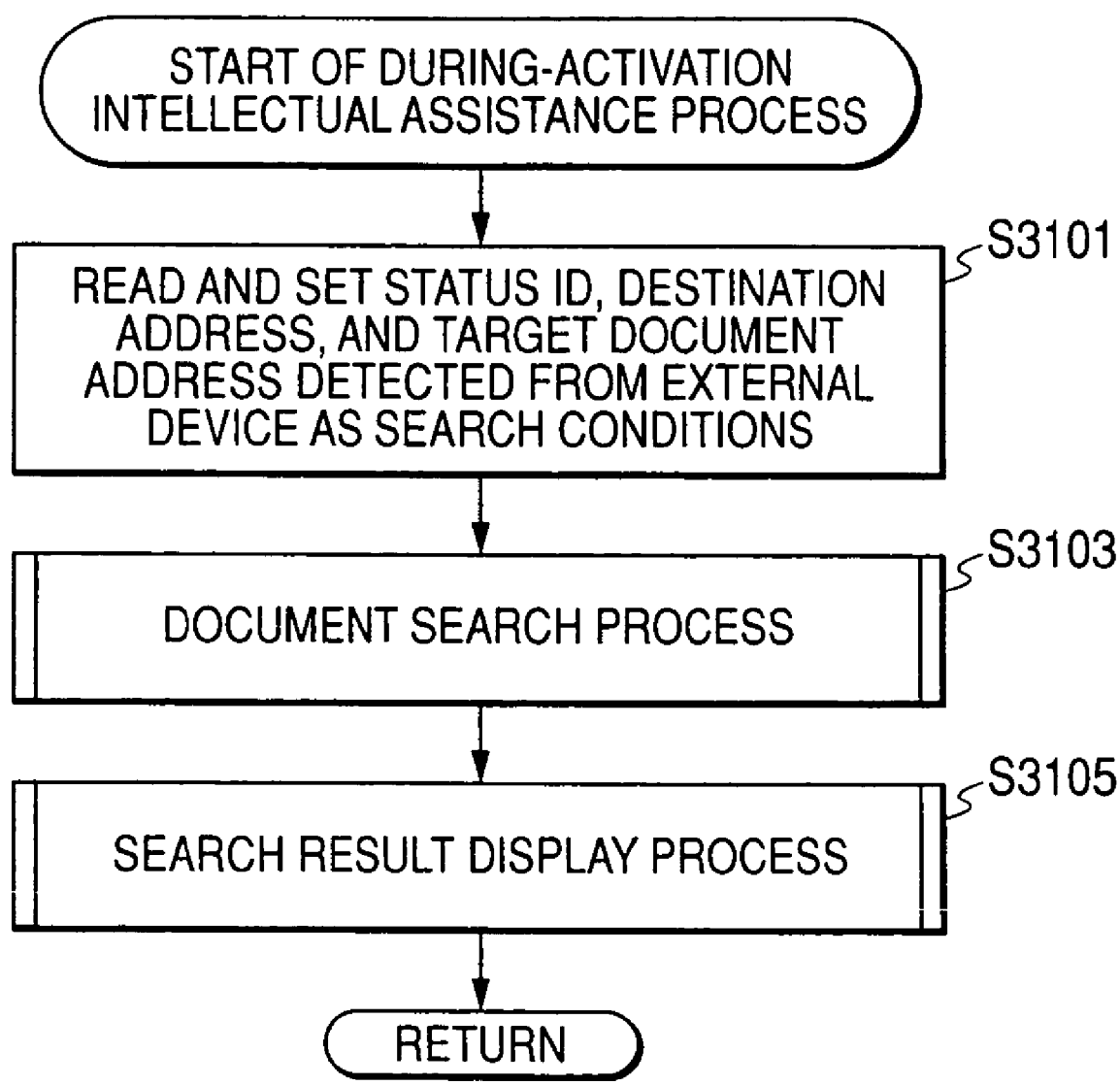
FIG. 31 is a diagram illustrating a flow of the during-activation intellectual assistance process according to the illustrative aspect of the invention.

FIG. 31 is a diagram illustrating a flow of the during-activation intellectual assistance process.

When the during-activation intellectual assistance process is performed in step 711 of FIG. 7, the control section 100 of the PC 10 first reads the status ID, the destination address, and the target document address input (detected) by the external device from the RAM in step 709. The control section sets the data selected by the user through the operation section 104 as a search condition (step 3101), and performs the document search process (step 3103).

FIG. 13 is a diagram illustrating a flow of the document search process (step 3103). First, all the records in the status table 1081 and the document table 1083 are set to the initial values of the search result records (step 1301).

Next, in order to specify the target document associated with a specific record from the status table 1081, a search process is performed on the basis of the search condition selected in step 3103.

That is, in step 1303, it is determined whether the status ID is set as the search condition (step 1303). When it is YES (step 1303: YES), the record corresponding to the status ID set as the search condition in the status table 1081 is stored as the search result record (step 1305) and the process of step 1307 is performed. When the status ID is not set as the search condition (step 1303: NO), the process of step 1307 is performed without performing the process of step 1305.

In step 1307, it is determined whether the destination address is added as the search condition. When it is YES (step 1307: YES), the record corresponding to the destination address designated as the search condition among the search result records stored in step 1305 is stored as the search result record (step 1309) and then the process of step 1311 is performed. In step 1307, when the destination address is not added as the search condition (step 1307: NO), the process of step 1311 is performed without performing the process of step 1309.

In step 1311, it is determined whether the target document address is added as the search condition. When it is determined that the target document address is set (step 1311: YES), the record corresponding to the target document address designated as the search condition among the search result records stored in step 1305 and the like is stored as the search result record (step 1313) and then the process of step 1315 is performed. When it is determined in step 1311 that the target document address is not added as the search condition (step 1311: NO), the process of step 1315 is performed without performing the process of step 1313.

Here, the search result records obtained through the processes of steps 1303 to 1313 will be described in more detail.

When it is YES in steps 1303, 1307, and 1311, the search result records comprise the records in the same status table 1081 as being stored in step 1313.

When it is YES in steps 1303 and 1307 and it is NO in step 1311, the search result records comprise the records in the same status table 1081 as being stored in step 1309.

When it is YES in steps 1303 and 1311 and it is NO in step 1307, the search result records comprise the records in the same status table 1081 as being stored in step 1313.

When it is YES in step 1303 and it is NO in steps 1307 and 1311, the search result records comprise the records in the same status table 1081 as being stored in step 1305.

When it is NO in step 1303 and it is YES in steps 1307 and 1311, the search result records comprise the records in the same status table 1081 as being stored in step 1313.

When it is NO in steps 1303 and 1311 and it is YES in step 1307, the search result records comprise the records in the same status table 1081 as being stored in step 1309.

When it is NO in steps 1303 and 1307 and it is YES in step 1311, the search result records comprise the records in the same status table 1081 as being stored in step 1313.

When it is NO in steps 1303, 1307 and 1311, the search result records comprise the records in the same status table 1081 as the status table 1081 set as an initial value in step 1301.

In step 1315, in order to perform the processes subsequent to step 1317, a non-processed search result record is read from the search result records specified in steps 1303 to 1313 and then the process of step 1317 is performed.

The processes after step 1317 are similar to those of the first illustrative aspect, and thus details thereof are not described.

Figure 32:
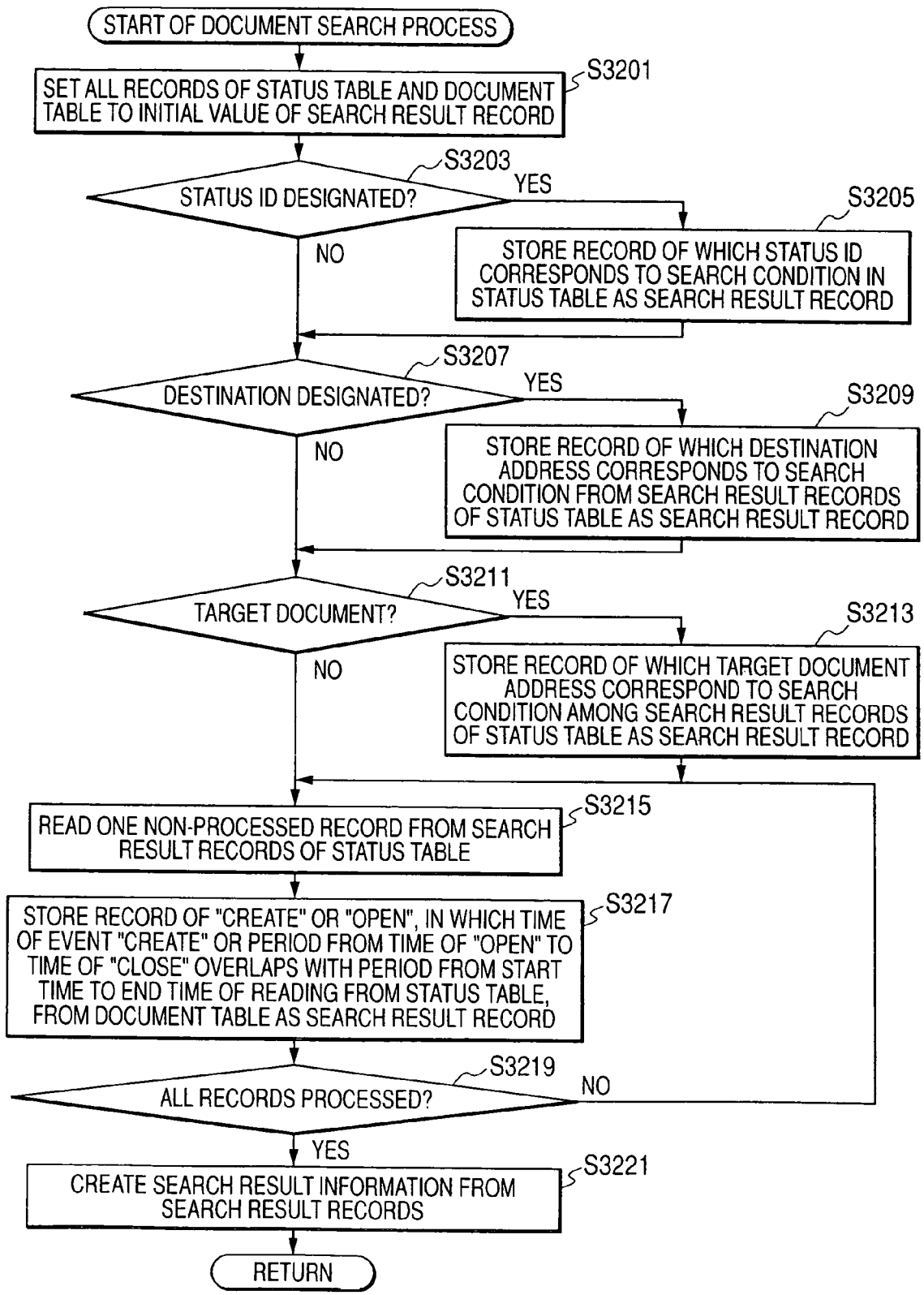
FIG. 32 is a diagram illustrating a flow of a document search process according to the illustrative aspect of the invention.

FIG. 32 is a diagram illustrating a flow of the document search process (step 1105). First, all the records of the status table 1081 and the document table 1083 are set to the initial values of the search result records (step 3201).

Next, in order to specify a target document associated with a specific record from the status table 1081, a search process is performed with the search conditions set in the GID search condition setting process (step 1103) previously performed.

That is, it is first determined in step 3203 whether the status ID is designated as the search condition (step 3203). In the during-activation intellectual assistance process (step 711), the status ID is generally set as the search condition in step 1201. Accordingly, the determination of step 3203 is "YES", a record corresponding to the status ID set as the search condition from the status table 1081 is stored as a new search result record (step 3205), and then the process of step 3207 is performed.

In step 3207, it is determined whether the destination address is set as the search condition, that is, whether the determination of step 1207 is "YES" and the destination address is added as the search condition in step 1209. When it is determined that the destination address is set (step 3207: YES), a record corresponding to the destination address set as the search condition from the search result records stored in step 3205 is stored as a new search result record (step 3209), and then the process of step 3211 is performed. When it is determined in step 3207 that the destination address is not set as the search condition (step 3207: NO), the process of step 3209 is not performed, but the process of step 3211 is performed.

It is determined in step 3211 whether the target document address is set as the search condition, that is, whether the determination of step 1203 is "YES" and the target document address is set as the search condition in step 1205. When it is determined that the target document address is set (step 3211: YES), a record corresponding to the target document address set as the search condition from the search result records stored in step 3205 is stored as a new search result record (step 3213), and then the process of step 3215 is performed. When it is determined in step 3211 that the target document address is not set as the search condition (step 3211: NO), the process of step 3213 is not performed, but the process of step 3215 is performed.

In steps 3209 and 3213, new search result records corresponding to the respective search conditions are stored on the basis of the search result records specified in step 3205. This is because only one GID corresponding to the respective status ID is set (see FIG. 2B).

In step 3215, in order to perform the processes subsequent to step 3217, one non-processed search result record (in fact, one record in the status table 1081) is read from the search result records specified in steps 3203 to 3213, and then the process of step 3217 is performed.

In step 3217, in the records stored in the document table 1083 and set to the initial values of the search result records in step 3201, when a period from the time registered in the record comprising the event "create" or "open" to the time registered in the record comprising the event "close" and the same document address as the document address of the record comprising the event "create" (that is, a period in which it can be determined that the same document is "opened" or "treated" by the PC 10) overlaps with the period from the start time to the end time of the record read from the status table 1081 from which one record is read in step 3215, the record to be processed in the document table 1083 is stored as a search result record (step 3217).

That is, in the process (step 3217), the document, which, it is determined, opened or treated at the same time as the external device suitable for the instructed search condition is extracted.

In the information management system according to the first embodiment, when it is intended to utilize the data used at that time again by using an operator's behavior as a key, the processing operation of the multifunction machine 20 connected to the PC 10 is used as information indirectly indicating the operator's behavior, and the document data utilized at the same time as the processing operation are considered as having a correlation therewith. The document data are utilized at the same time as the target document (address) as a target of the processing operation and thus can be considered as having a correlation with each other. Therefore, as described above, the records comprising the event "create" or "open" of which the processing times overlap with each other are stored as the search result records.

When the period from the time registered in the record comprising the event "create" or "open" to the time registered in the record comprising the event "close" and comprising the same document address as the document address of the record comprising the event "create" is determined, the identity of the user (operator in FIG. 3) is considered.

In step 3219, it is determined whether the process of step 3217 is performed to all the records stored as the search result records in the status table 1081. When it is determined that the process is performed to all the records (step 3219: YES), search result information is prepared from the search result records based on the process (step 1321), and then the document search process (step 1105) ends. When it is determined in step 3219 that the process is not performed to all the records (step 3219: NO), the processes are repeated from step 3215.

In the information management system 1 according to the embodiment, since the records stored in the status table 1081 are stored as records in the document table at the time of performing the processing operation, the records in both tables satisfy the search conditions in step 3217 and are stored as the search result records.

Accordingly, since the search result records stored based on the records stored through the same process is excluded, the start time or the end time of the search result record specified from the status table 1081 is preferably equal to the time of the document table 1083. In addition, even when the condition of step 3217 is satisfied, the search result records in which the target document address and the document address are equal to each other are preferably not stored in step 3217.

When the document search process (step 1105) is finished, the control section 100 performs a process of displaying the search result based on the document search process (step 1105) (step 1107).

In step 3217 of the document search process, the determination using the overlapping of two periods has been performed. However, when the time registered in the record comprising the event "create", "open", or "close" is included in the period from the start time to the end time of the records in the status table 1081, both periods necessarily overlap with each other. Accordingly, except for the case in which the period from the start time to the end time of the record in the status table 1081 is all included in the period from the time registered in the record comprising the event "create" or "open" to the time registered in the record comprising the event "close" and comprising the same document address as the document address of the record comprising the event "create" or the like, it is preferable in view of rapid determination to employ this simple determination along with the determination of step 3217.

Similarly, when one of the start time and the end time of the record of the status table 1081 is included in the period from the start time of the record comprising the event "create" or "open" to the time registered in the record comprising the event "close" and comprising the same document address as the document address of the record comprising the event "create" or the like, both periods necessarily overlap with each other. Accordingly, as described above, it is preferable in view of rapid determination to employ this simple determination along with the determination of step 3217.

When the time registered in the record comprising the event "create", "open", or "close" overlaps with one of the start time or the end time of the record in the status table 1081, both periods necessarily overlap with each other. Accordingly, as described above, it is preferable in view of rapid determination to employ this simple determination along with the determination of step 3217.

Figure 33:
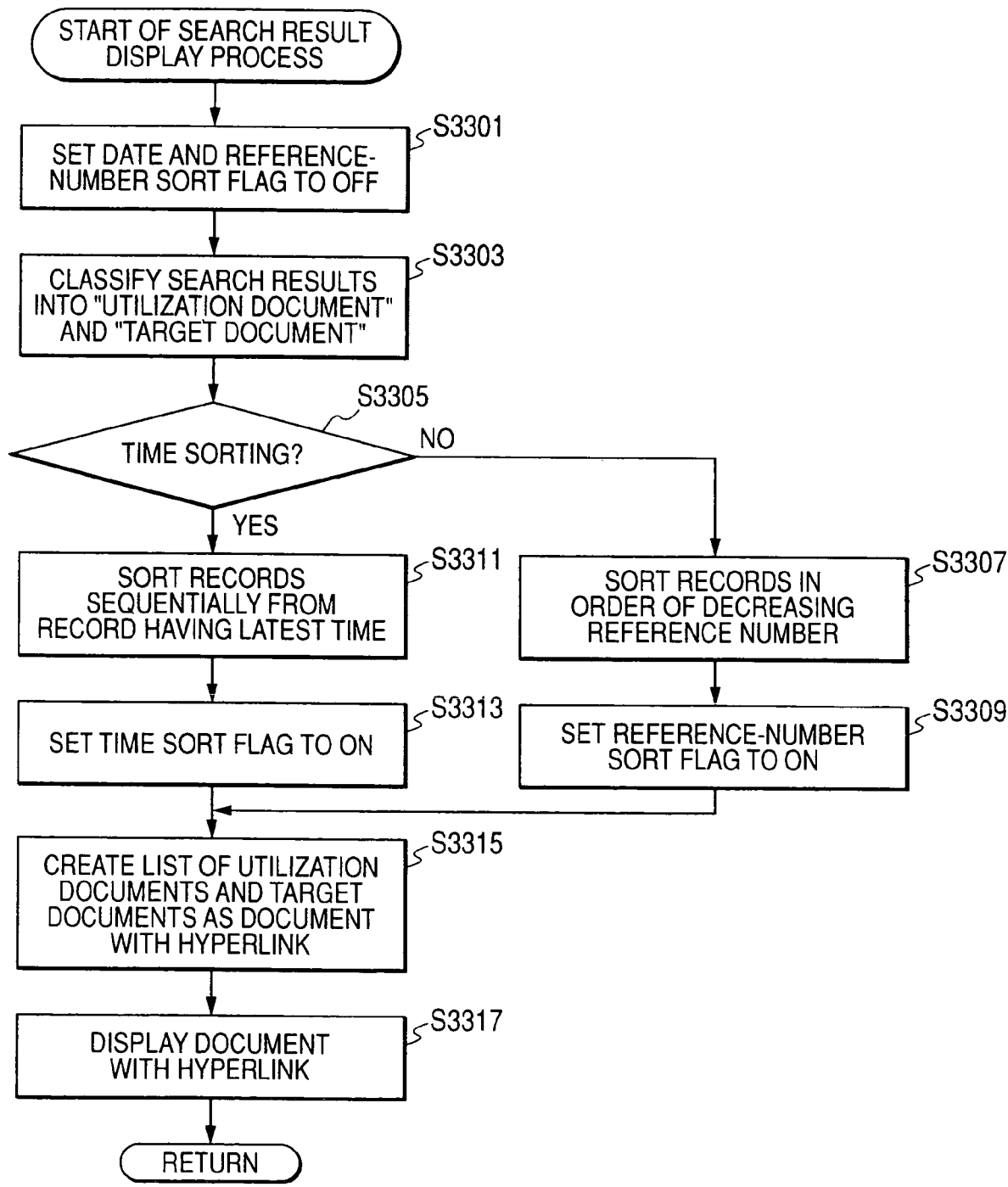
FIG. 33 is a diagram illustrating a flow of a search result display process according to the illustrative aspect of the invention.

FIG. 33 is a diagram illustrating a flow of a search result display process (step 1107). First, at the time of starting the process, the date and the reference sort flag are set to OFF (step 3301).

Next, the search result records specified as the search result information prepared in step 1321 are classified into search result records specified from the status table 1081 (specified through steps 3203 to 3213) and search result records specified from the document table 1083 (specified through steps 3215 to 3219). That is, the former is a search result associated with a target document and the latter is a search result associated with a utilization document. The search result records are classified into both search results (step 3303).

When the process of step 3303 is finished and then the search result information classified into the utilization documents and the target documents in step 3303 is displayed, a process of determining in what order the utilization documents and the target documents are displayed is performed.

First, it is determined in step 3305 whether a time sorting method is selected for the display order (step 3305).

Now, when the reference-number sorting method is selected, that is, when the time sorting method is not selected (step 3305: NO), the search result records having classified into the utilization documents and the target documents in the order of decreasing the reference number in step 3303 are sequentially sorted from the search result record comprising the largest reference number (step 3311), and then the time sort flag is set to ON (step 3313). Thereafter, the process of step 3315 is performed.

On the other hand, when the time sorting method is selected (step 3305: YES), the control section 100 sequentially sorts the search results obtained in step 3303 from the search result record comprising the latest time (step 3311), and then the time sort flag is set to ON (step 3313). Thereafter, the process of step 3315 is performed as described above.

In the information management system according to the embodiment, the search results can be sorted by the use of two items of the time and the reference number at the time of displaying the search results. Accordingly, it can be determined as follows by the use of which of the time and the reference number the search results are sorted. Only by determining whether the search results are sorted in one item, specifically, by determining whether the time sorting method is selected, it can be determined whether a user intends to sort the search results in which of the time and the reference number (when the time sorting method is not selected, it is considered that the reference number sorting method is selected).

The time or the reference number, which is used to sort the search results may be selected by the user through the operation section 104, for example, after performing the process of step 3301 and before performing the process of step 3305.

In step 3315, lists of the utilization documents and the target documents are prepared so as to access the documents on the basis of the search result records sorted in accordance with the condition selected in step 3307 or 3311. The lists are displayed in step 3317.

In the information management system 1 according to the first embodiment, when the activation of the external device is detected in step 707, the during-activation intellectual assistance process (step 711) is performed in response to the detection. Accordingly, since the documents, which are considered as being opened or treated at the same time in the past can be notified to the user with the detecting operation. As a result, when a process is necessary for the documents associated with this process, the necessary process can be performed at the same time.

For example, in case of fax transmission, it is possible to determine whether the documents opened at the time of the previous fax transmission should be transmitted by opening the documents.

Figure 34:
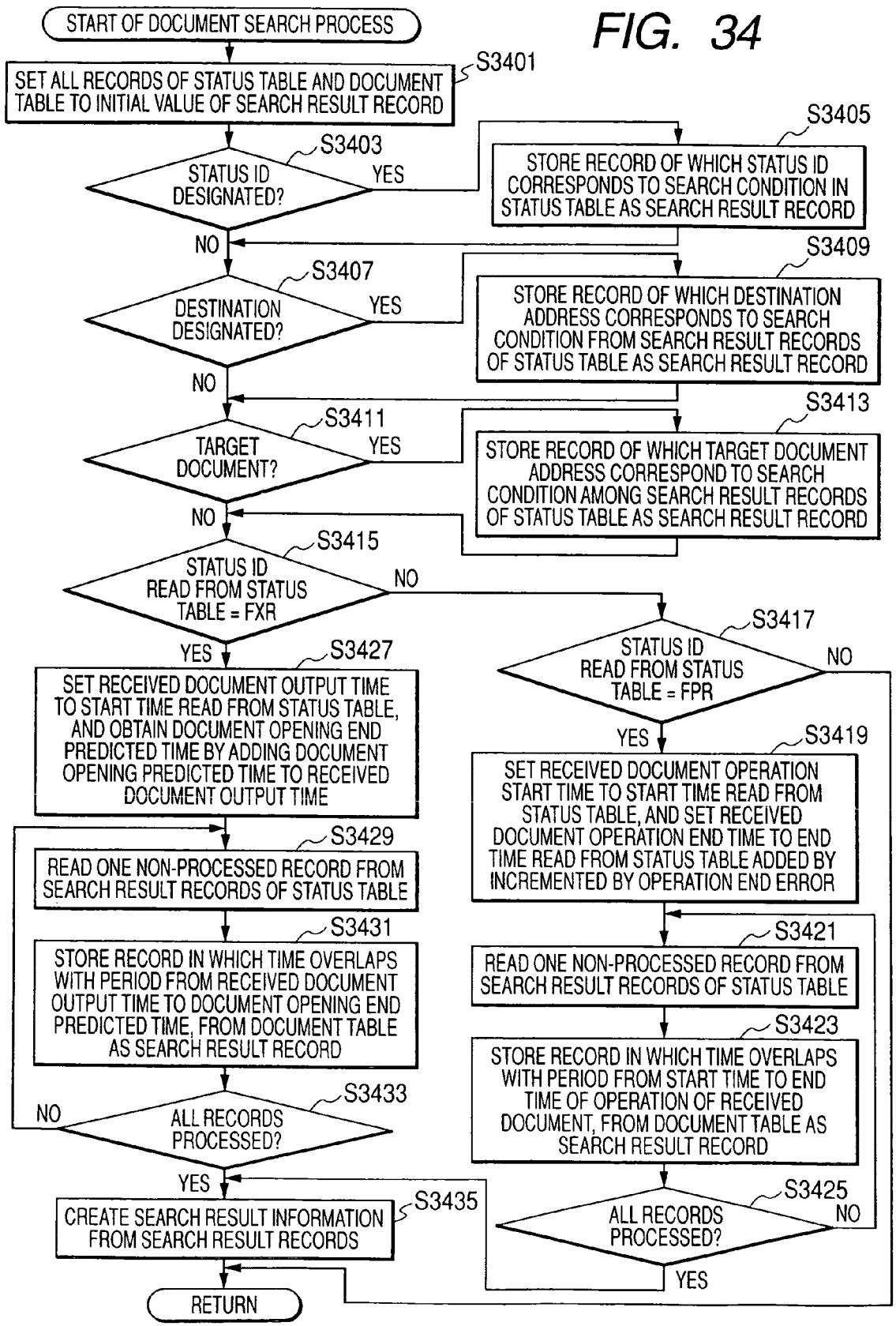
FIG. 34 is a diagram illustrating a flow of a document search process according to the illustrative aspect of the invention.

FIG. 34 is a diagram illustrating a flow of the document search process (step 1105). First, all the records in the status table 1081 and the document table 1083 are set to the initial values of the search result records (step 3401).

Next, in order to specify a target document associated with a specific record from the status table 1081, a search process is performed with the search conditions set in the GID search condition setting process (step 1103) previously performed.

That is, it is first determined in step 3403 whether the status ID is designated as the search condition. In the during-activation intellectual assistance process (step 711), the status ID is generally set as the search condition in step 1201. Accordingly, the determination of step 3403 is "YES", a record corresponding to the status ID set as the search condition from the status table 1081 is stored as a new search result record (step 3405), and then the process of step 3407 is performed.

In step 3407, it is determined whether the destination address is set as the search condition, that is, whether the determination of step 1207 is "YES" and the destination address is added as the search condition in step 1209. When it is determined that the destination address is set (step 3407: YES), a record corresponding to the destination address set as the search condition from the search result records stored in step 3405 is stored as a new search result record (step 3409), and then the process of step 3411 is performed. When it is determined in step 3407 that the destination address is not set as the search condition (step 3407: NO), the process of step 3409 is not performed, but the process of step 3411 is performed.

It is determined in step 3411 whether the target document address is set as the search condition, that is, whether the determination of step 1203 is "YES" and the target document address is designated as the search condition in step 1205. When it is determined that the target document address is set (step 3411: YES), a record corresponding to the target document address set as the search condition from the search result records stored in step 3405 (step 3407: NO) and step 3409 (step 3407: YES) is stored as a new search result record (step 3413), and then the process of step 3415 is performed. When it is determined in step 3411 that the target document address is not set as the search condition (step 3411: NO), the process of step 3413 is not performed, but the process of step 3415 is performed.

In steps 3409 and 3413, new search result records corresponding to the search conditions are stored on the basis of the search result records specified in step 3405. This is because only one GID corresponding to each status ID is set (see FIG. 2B).

In step 3415, it is determined whether the status IDs of the search result records in the status table specified through the processes of steps 3403 to 3413 are "FXR", that is, "fax reception." When it is determined that the status IDs are not "FXR" (step 3415: NO), the process of step 3417 is performed.

In step 3417, it is determined whether the status IDs are "FPR", that is, "PC fax reception." When it is determined that the status IDs are not "FPR" (step 3417: NO), the document search process ends.

When it is determined in step 3417 that the status IDs are "FPR" (step 3417: YES), the process of step 3419 is performed. Here, the start time of reading the search result records from the status table, that is, the time when the information processing device opens the PC facsimile document stored in the external device, is set as a received document operation start time. The time obtained by adding a operation end error time (for example, 15 minutes) to the end time of reading the search result records from the status table, that is, the time when the operation of the PC facsimile data in the information processing device is stopped and the document is closed, is set as a received document operation end time.

By setting the received document operation end time to which the operation end error time is added, documents, information, schedules, and the like necessary to be opened or prepared by the operation of the PC facsimile data can be recognized as being correlated with the PC facsimile data in the operation end error time after the PC facsimile data are closed.

The operation end error time is set to 15 minutes in the embodiment, but is not limited to the time. For example, the operation end error time may be 5 minutes, 30 minutes, or zero minute. This time may be set by a user, or may be previously set in the device.

Subsequently, a record not used for searching the document table, that is, a non-processed record, is read from the search results of the status table (step 1321).

The period, which is set in step 3419 and registered in the non-processed record, from the received document operation start time and the received document operation end time is compared with the time registered in the records stored in the document table as a search target.

Records in which the period from the received document operation start time to the received document operation end time overlaps with the time registered in the records stored in the document table are associated with documents, which are subjected to preparing, opening, and sending processes in the period in which the PC facsimile data are utilized (the period from the received document operation start time to the received document operation end time). Accordingly, the records are considered as being correlated with the PC facsimile data and are stored as the search result records (step 1323).

Then, it is determined whether all the non-processed records resulting from the search result of the status table are processed. When all the records are not processed (step 1325: NO), the process of 1321 is performed again. When all the records are processed (step 1325: YES), search result information is created from the search result records (step 1335) and then the document search process ends.

On the other hand, when the status IDs of the search result records in the status table specified through the processes of steps 3403 to 3413 are "FXR" (step 3415: YES), the process of step 1327 is performed.

The control section 100 sets the start time of the search result records of the status table as a received document output time and sets the time, which is obtained by adding a document opening predicted time (for example, 1 hour) to the received document output time, as a document opening end predicted time (step 1327).

The document opening predicted time is set to 1 hour in the embodiment, but is not limited to the time. For example, the document opening predicted time may be 30 minutes, 2 hours, or zero. This time may be set by a user, or may be previously set in the device.

Like in the above-mentioned PC facsimile, the period in which the facsimile data are utilized in the information processing device can be determined. However, when the facsimile data are utilized outside the information processing device, for example, when the facsimile data are printed out on a sheet by an external device, the information processing device cannot recognize when the utilization of the facsimile data ends. However, since the time (document opening predicted time) in which the facsimile data are opened is set through the process of step 1327, the document utilized by the information processing device in the period can be considered as being correlated with the details of the facsimile data.

Subsequently, a record not used for searching the document table, that is, a non-processed record, is read from the search results of the status table (step 1329).

The period, which is set in step 1327 and registered in the non-processed record, from the received document output time and the document opening end predicted time is compared with the time registered in the records stored in the document table as a search target.

Records in which the period from the received document output time to the document opening end predicted time overlaps with the time registered in the records stored in the document table are associated with documents, which are subjected to preparing, opening, and sending processes in the period in which the facsimile data are utilized (the period from the received document output time to the document opening end predicted time). Accordingly, the records are considered as being correlated with the PC facsimile data and are stored as the search result records (step 1331).

Then, it is determined whether all the non-processed records from the search result of the status table are processed. When all the records are not processed (step 1333: NO), the process of 1329 is performed again. When all the records are processed (step 1333: YES), search result information is created from the search result records (step 1335) and then the document search process ends.

When the document search process (step 1105) ends, the control section 100 performs a search result display process based on the document search process (step 1105) (step 1107).

Not shown in the embodiment, when it is determined in step 3417 of FIG. 13 that the status IDs are not "FPR" (step 3417: NO), the following process may be performed.

Among the records stored in the document table 1083 and set to the initial values of the search result records in step 3401, when a period from the time registered in the record comprising the event "create" or "open" to the time registered in the record comprising the event "close" and the same document address as the document address of the record comprising the event "create" (that is, a period when it can be determined that the same document is "opened" or "treated" by the PC 10) overlaps with the period from the start time to the end time of the record read from the status table 1081 in step 3415, the record to be processed in the document table 1083 is stored as the search result record to create the search result information.

That is, in the process, the document, which, it is determined, opened or treated at the same time as the external device suitable for the instructed search condition is extracted.

In the information management system 1 according to the first embodiment, the document data comprising the above-mentioned correlation are considered as having a high correlation with each other. Therefore, as described above, the records comprising the event "create" or "open" of which the processing times overlap with each other are stored as the search result records.

When the period from the time registered in the record comprising the event "create" or "open" to the time registered in the record comprising the event "close" and comprising the same document address as the document address of the record comprising the event "create" is determined, the identity of the user (operator in FIG. 3) is considered.

In the document search process (step 1105), the determination using the overlapping of two periods has been performed. However, when the time registered in the records comprising the event "create", "open", or "close" is included in the period from the start time to the end time of the records in the status table 1081, both periods necessarily overlap with each other. Accordingly, except for the case in which the period from the start time to the end time of the records in the status table 1081 is entirely included in the period from the time registered in the records comprising the event "create" or "open" to the time registered in the records comprising the event "close" and comprising the same document address as the document address of the record comprising the event "create" or the like, it is preferable in view of rapid determination.

Similarly, when one of the start time and the end time registered in the record of the status table 1081 is included in the period from the time registered in the records comprising the event "create" or "open" to the time registered in the record comprising the event "close" and comprising the same document address as the document address of the record comprising the event "create" or the like, both periods necessarily overlap with each other. Accordingly, as described above, it is preferable in view of rapid determination.

When the time registered in the record comprising the event "create", "open", or "close" overlaps with one of the start time and the end time registered in the record in the status table 1081, both periods necessarily overlap with each other. Accordingly, as described above, it is preferable in view of rapid determination.

What is claimed is:

1. An information management system comprising:
   an external device having a function performing unit that performs a predetermined process;
   an information processing device connected to the external device; and
   a third storage unit that stores utilization data, which is accessed by the external device and the information processing device,
   wherein the information processing device comprises:
      a first detection unit that detects a first period in which the function performing unit of the external device performs the process;
      a first specification unit that specifies status information that specifies the process performed by the function performing unit in the first period detected by the first detection unit;
      a first storage unit that correlates and stores the first period detected by the first detection unit and the status information specified by the first specification unit;
      a utilization unit that utilizes the utilization data stored in the third storage unit;
      a second detection unit that detects a second period in which the utilization data are utilized by the utilization unit;
      a second specification unit that specifies utilization-data specifying information that specifies the utilization data which are utilized in the second period;
      a second storage unit that correlates and stores the second period detected by the second detection unit and the utilization-data specifying information specified by the second specification unit;
      an overlap determination unit that determines that the first period and the second period have an overlapping period;
      a correlation giving unit that gives a correlation that the utilization data specified by the utilization-data specifying information correlated with the second period is correlated with the process specified by the status information correlated and stored in the first period, in response to the determination that the first period and the second period have the overlapping period; and
      an output control unit which, when the function performing unit of the external device newly performs the process, outputs the process with which the correlation is given by the correlation giving unit and the utilization data to an output unit, and
   wherein the external device comprises an offer unit that offers the first period and the status information in a state where the information processing device detects the process in a case where the process is performed by the function performing unit.

2. The information management system according to claim 1, wherein
   the utilization unit of the information processing device newly stores data available as the utilization data in the third storage unit, and
   wherein the second detection unit detects as the second period a period in which the utilization data are utilized by the utilization unit or a period in which the new utilization data are stored in the third storage unit by the utilization unit.

3. The information management system according to claim 2, wherein
   the utilization unit of the information process device stores data transmitted from the external device as the utilization data in the third storage unit, and
   wherein the external device comprises a transmission unit that transmits data newly prepared as the processing result of the function performing unit as the utilization data stored in the third storage unit to the information processing device.

4. The information management system according to claim 1, wherein
   the information processing device performs a correlating operation of the correlation giving unit to the predetermined external device.

5. The information management system according to claim 1, wherein
   the information processing device further comprises:
      an output unit that outputs information; and
      an output control unit that outputs the information to the output unit, and
   wherein the output control unit outputs the process and the utilization-data specifying information that specifies the utilization data to which the correlation giving unit gives a correlation, to the output unit.

6. The information management system according to claim 5, wherein
   in a case where an activation of the function performing unit is detected by the first detection unit of the information processing device, the output control unit outputs the process and the utilization-data specifying information to the output unit.

7. The information management system according to claim 5, wherein
   the utilization-data specifying information is address information indicating a storage position of the utilization data, and
   wherein the output control unit outputs all the utilization data to which the correlation giving unit gives a correlation, to a fourth storage unit that is accessed by the information processing device from the storage position indicated by the address information.

8. The information management system according to claim 1, wherein
the external device further comprises:
a line communication unit connected to a public telephone line as the function performing unit; and
one of a reading unit that reads a medium and an image forming unit that forms image data on a basis of data input from the information processing device, data input through the line communication unit from the public telephone line or data input through the reading unit.

9. An information management system comprising:
an external device having an interactive communication unit that interactively communicates with an interactive communication device through a public telephone line;
an information processing device connected to the external device; and
a third storage unit that stores utilization data, which is accessed by the external device and the information processing device,
wherein the information processing device comprises:
a first detection unit that detects a first period in which an interactive communication is performed by the interactive communication unit;
a first storage unit that stores the first period detected by the first detection unit;
a utilization unit that utilizes the utilization data stored in the third storage unit;
a second detection unit that detects a second period in which the utilization data are utilized by the utilization unit;
a specification unit that specifies utilization-data specifying information that specifies the utilization data which are utilized in the second period;
a second storage unit that correlates and stores the second period detected by the second detection unit and the utilization-data specifying information specified by the specification unit;
an overlap determination unit that determines that a third period obtained by adding a first predetermined period from an end of the first period to the first period overlaps with the second period; and
a correlation giving unit that gives a correlation that the utilization data specified by the utilization-data specifying information correlated with the second period is correlated with the interactive communication of the interactive communication unit, in response to the determination that the third period overlaps with the second period, and
wherein the external device comprises an offer unit that offers the first period in a state where the information processing device detects the interactive communication in a case where the interactive communication is performed by the interactive communication unit.

10. The information management system according to claim 9, wherein
the correlation giving unit gives a degree of correlation on a basis of at least one of which of in the first period, in the first predetermined period, and before and after the third period the second period belongs to, and which kind of process is performed to the utilization data.

11. An information management system comprising:
an external device having an interactive communication unit that interactively communicates with an interactive communication device through a public telephone line;
an information processing device connected to the external device; and
a third storage unit that stores utilization data, which is accessed by the external device and the information processing device,
wherein the information processing device comprises:
a first detection unit that detects a first period in which an interactive communication is performed by the interactive communication unit;
a first storage unit that stores the first period detected by the first detection unit;
a utilization unit that utilizes the utilization data stored in the third storage unit;
a second detection unit that detects a second period in which the utilization data are utilized by the utilization unit;
a specification unit that specifies utilization-data specifying information that specifies the utilization data which are utilized in the second period;
a second storage unit that correlates and stores the second period detected by the second detection unit and the utilization-data specifying information specified by the specification unit;
an overlap determination unit that determines that a fourth period obtained by adding a period, which retroacts by a second predetermined period from a start of the first period, to the first period overlaps with the second period; and
a correlation giving unit that gives a correlation that the utilization data specified by the utilization-data specifying information correlated with the second period is correlated with the interactive communication of the interactive communication unit, in response to the determination that the fourth period overlaps with the second period, and
wherein the external device comprises an offer unit that offers the first period in a state where the information processing device detects the interactive communication in a case where the interactive communication is performed by the interactive communication unit.

12. The information management system according to claim 11, wherein
the correlation giving unit gives a degree of correlation on a basis of at least one of which of in the first period, in the second predetermined period, and before and after the fourth period the second period belongs to, and which kind of process is performed to the utilization data.

13. An information management system comprising:
an external device having an interactive communication unit that interactively communicates with an interactive communication device through a public telephone line;
an information processing device connected to the external device; and
a third storage unit that stores utilization data, which is accessed by the external device and the information processing device,
wherein the information processing device comprises:
a first detection unit that detects a first period in which an interactive communication is performed by the interactive communication unit;
a first storage unit that stores the first period detected by the first detection unit;
a utilization unit that utilizes the utilization data stored in the third storage unit;
a second detection unit that detects a second period in which the utilization data are utilized by the utilization unit;

a specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that a fifth period obtained by adding a period, which retroacts by a second predetermined period from a start of the first period, to a period obtained by adding a first predetermined period from an end of the first period to the first period overlaps with the second period; and a correlation giving unit that gives a correlation that the utilization data specified by the utilization-data specifying information correlated with the second period is correlated with the interactive communication of the interactive communication unit, in response to the determination that the fifth period overlaps with the second period, and wherein the external device comprises an offer unit that offers the first period in a state where the information processing device detects the interactive communication in a case where the interactive communication is performed by the interactive communication unit.

14. The information management system according to claim 13, wherein the correlation giving unit gives a degree of correlation on a basis of at least one of which of in the first period, in the first predetermined period, in the second predetermined period, and before and after the fifth period the second period belongs to, and which kind of process is performed to the utilization data.

15. The information management system according to claim 11, wherein the interactive communication of the interactive communication unit is an interactive communication resulting from a telephone transmission.

16. The information management system according to claim 9, wherein the information processing device further comprises:
an output unit that outputs information; and
an output control unit that outputs the information to the output unit, and wherein the output control unit outputs the utilization-data specifying information that specifies the utilization data to which the correlation giving unit gives a correlation, to the output unit.

17. An information management system comprising:

an external device having a line communication unit that receives facsimile data transmitted through a public telephone line;

an information processing device connected to the external device; and a third storage unit that stores utilization data, which is accessed by the external device and the information processing device, wherein the information processing device comprises:
a first detection unit that detects a first period in which the facsimile data received by the line communication unit are output;

a first storage unit that stores the first period detected by the first detection unit;

a utilization unit that utilizes the utilization data stored in the third storage unit;

a second detection unit that detects a second period in which the utilization data are utilized by the utilization unit;

a specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that the first period and the second period have a period overlapping with each other; and a correlation giving unit that gives a correlation that the utilization data specified by the utilization-data specifying information correlated with the second period is correlated with the reception by the line communication unit, in response to the determination that the first period and the second period have the period overlapping with each other, and wherein the external device comprises:
an output unit that outputs the facsimile data; and
an offer unit that offers the first period in a state where the information processing device detects a facsimile data output process in a case where the facsimile data output process is performed by the output unit.

18. An information management system comprising:

an external device having a line communication unit that receives facsimile data transmitted through a public telephone line;

an information processing device connected to the external device; and a third storage unit that stores utilization data, which is accessed by the external device and the information processing device, wherein the information processing device comprises:
a first detection unit that detects a first period in which the facsimile data received by the line communication unit are output;

a first storage unit that stores the first period detected by the first detection unit;

a utilization unit that utilizes the utilization data stored in the third storage unit;

a second detection unit that detects a second period in which the utilization data are utilized by the utilization unit;

a specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that a third period obtained by adding a predetermined period to the end of the first period and the second period have a period overlapping with each other; and a correlation giving unit that gives a correlation that the utilization data specified by the utilization-data specifying information correlated with the second period is correlated with the reception by the line communication unit, in response to the determination that the third period and the second period have the period overlapping with each other, and wherein the external device comprises:
an output unit that outputs the facsimile data; and
an offer unit that offers the first period in a state where the information processing device detects a facsimile data output process in a case where the facsimile data output process is performed by the output unit.

19. The information management system according to claim 17, wherein
the information processing device further comprises:
an information processing device side output unit that outputs information; and
an output control unit that makes the information processing device side output unit output the information, and
wherein the output control unit outputs the utilization-data specifying information to which a correlation is given by the correlation giving unit and which specifies the utilization data, to the output unit.

20. An information management system comprising:
an external device having a line communication unit that receives PC facsimile data transmitted through a public telephone line;
an information processing device connected to the external device; and
a third storage unit that stores utilization data, which is accessed by the external device and the information processing device,
wherein the information processing device comprises:
a first detection unit that detects a fourth period in which the PC facsimile data received by the line communication unit are opened by the information processing device;
a first storage unit that stores the fourth period detected by the first detection unit;
a utilization unit that utilizes the utilization data stored in the third storage unit;
a second detection unit that detects a second period in which the utilization data are utilized by the utilization unit;
a specification unit that specifies utilization-data specifying information that specifies the utilization data which are utilized in the second period;
a second storage unit that correlates and stores the second period detected by the second detection unit and the utilization-data specifying information specified by the specification unit;
an overlap determination unit that determines that the fourth period and the second period have a period overlapping with each other; and
a correlation giving unit that gives a correlation that the utilization data specified by the utilization-data specifying information correlated with the second period is correlated with the reception by the line communication unit, in response to the determination that the fourth period and the second period have the period overlapping with each other, and
wherein the external device comprises an output unit that outputs the PC facsimile data to the information processing device.

21. An information management system comprising:
an external device having a line communication unit that receives PC facsimile data transmitted through a public telephone line;
an information processing device connected to the external device; and
a third storage unit that stores utilization data, which is accessed by the external device and the information processing device,
wherein the information processing device comprises:
a first detection unit that detects a fourth period in which the PC facsimile data received by the line communication unit are opened by the information processing device;
a first storage unit that stores the fourth period detected by the first detection unit;
a utilization unit that utilizes the utilization data stored in the third storage unit;
a second detection unit that detects a second period in which the utilization data are utilized by the utilization unit;
a specification unit that specifies utilization-data specifying information that specifies the utilization data which are utilized in the second period;
a second storage unit that correlates and stores the second period detected by the second detection unit and the utilization-data specifying information specified by the specification unit;
an overlap determination unit that determines that a fifth period obtained by adding a predetermined period to the end of the fourth period and the second period have a period overlapping with each other; and
a correlation giving unit that gives a correlation that the utilization data specified by the utilization-data specifying information correlated with the second period is correlated with the reception by the line communication unit, in response to the determination that the fifth period and the second period have the period overlapping with each other, and
wherein the external device comprises an output unit that outputs the PC facsimile data to the information processing device.

22. The information management system according to claim 20, wherein
the information processing device further comprises:
an information processing device side output unit that outputs information; and
an output control unit that makes the information processing device side output unit output the information, and
wherein the output control unit outputs the utilization-data specifying information, to which a correlation is given by the correlation giving unit and which specifies the utilization data, to the output unit.

23. An information processing device which is connected to an external device and which can access a third storage unit that stores available utilization data, the external device comprising a function performing unit that performs a predetermined process and an offer unit that offers a first period in which the process is performed by the function performing unit and status information that specifies the process, the information processing device comprising:
a first detection unit that detects the first period;
a first specification unit that specifies the status information that specifies the process performed by the function performing unit in the first period detected by the first detection unit;
a first storage unit that correlates and stores the first period detected by the first detection unit and the status information specified by the first specification unit;
a utilization unit that utilizes the utilization data stored in the third storage unit;

a second detection unit that detects a second period in which the utilization data are utilized by the utilization unit;

a second specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that the first period and the second period have an overlapping period;

a correlation giving unit that gives a correlation that the utilization data specified by the utilization-data specifying information correlated with the second period is correlated with the process specified by the status information correlated and stored in the first period, in response to the determination that the first period and the second period have the overlapping period; and an output control unit which, when the function performing unit of the external device newly performs the process, outputs the process with which the correlation is given by the correlation giving unit and the utilization data to an output unit.

24. An information processing device which is connected to an external device and which can access a third storage unit that stores available utilization data, the external device comprising an interactive communication unit that interactively communicates with an interactive communication device through a public telephone line and an offer unit that offers a first period in which a communication is performed by the interactive communication unit, the information processing device comprising:

the first detecting unit that detects the first period;

a first storage unit that stores the first period detected by the first detection unit;

a utilization unit that utilizes the utilization data stored in the third storage unit;

a second detection unit that detects a second period in which the utilization data are utilized by the utilization unit;

a specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that a fifth period obtained by adding a period, which retroacts by a second predetermined period from a start of the first period, to a period obtained by adding a first predetermined period from an end of the first period to the first period overlaps with the second period; and a correlation giving unit that gives a correlation that the utilization data specified by the utilization-data specifying information correlated with the second period is correlated with the interactive communication of the interactive communication unit, in response to the determination that the fifth period overlaps with the second period.

25. An information processing device which is connected to an external device having a line communication unit that receives facsimile data transmitted through a public telephone line, an offer unit that offers a first period in which the facsimile data received by the line communication unit are output, and an output unit that outputs the facsimile data, and which can access a third storage unit that stores available utilization data, the information processing device comprising:

a first detection unit that detects the first period;

a first storage unit that stores the first period detected by the first detection unit;

a utilization unit that utilizes the utilization data stored in the third storage unit;

a second detection unit that detects a second period in which the utilization data are utilized by the utilization unit;

a specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that the first period and the second period have a period overlapping with each other; and a correlation giving unit that gives a correlation that the utilization data specified by the utilization-data specifying information correlated with the second period is correlated with the reception by the line communication unit, in response to the determination that the first period and the second period have the period overlapping with each other.

26. An information processing device which is connected to an external device having a line communication unit that receives facsimile data transmitted through a public telephone line, an offer unit that offers a first period in which the facsimile data received by the line communication unit are output, and an output unit that outputs the facsimile data, and which can access a third storage unit that stores available utilization data, the information processing device comprising:

a first detection unit that detects the first period;

a first storage unit that stores the first period detected by the first detection unit;

a utilization unit that utilizes the utilization data stored in the third storage unit;

a second detection unit that detects a second period in which the utilization data are utilized by the utilization unit;

a specification unit that specifies utilization-data specifying information that specifies the utilization data which are utilized in the second period;

a second storage unit that correlates and stores the second period detected by the second detection unit and the utilization-data specifying information specified by the specification unit;

an overlap determination unit that determines that a third period obtained by adding a predetermined period to the end of the first period and the second period have a period overlapping with each other; and a correlation giving unit that gives a correlation that the utilization data specified by the utilization-data specifying information correlated with the second period is correlated with the reception by the line communication unit, in response to the determination that the third period and the second period have the period overlapping with each other.

27. A tangible computer storage medium that stores a program of instructions executable by a computer to perform a function for processing information, the computer being connected to an external device and accessing a third storage unit that stores available utilization data, the external device comprising a function performing unit that performs a predetermined process and an offer unit that offers a first period in which the process is performed by the function performing unit and status information that specifies the process, the function comprising the steps of:

detecting the first period;

specifying the status information that specifies the process performed by the function performing unit in the first period detected;

correlating and storing the first period and the status information;

utilizing the utilization data stored in the third storage unit;

detecting a second period in which the utilization data are utilized;

specifying utilization-data specifying information that specifies the utilization data which are utilized in the second period;

correlating and storing the second period and the utilization-data specifying information;

determining that the first period and the second period have an overlapping period;

giving a correlation that the utilization data specified by the utilization-data specifying information correlated with the second period is correlated with the process specified by the status information correlated and stored in the first period, in response to the determination that the first period and the second period have the overlapping period; and outputting, when the function performing unit of the external device newly performs the process, the process with which the correlation is given and the utilization data.

28. A tangible computer storage medium that stores a program of instructions executable by a computer to perform a function for processing information, the computer being connected to an external device and accessing a third storage unit that stores available utilization data, the external device comprising an interactive communication unit that interactively communicates with an interactive communication device through a public telephone line and an offer unit that offers a first period in which a communication is performed by the interactive communication unit, the function comprising the steps of:

detecting the first period;

storing the first period detected;

utilizing the utilization data stored in the third storage unit;

detecting a second period in which the utilization data are utilized;

specifying utilization-data specifying information that specifies the utilization data which are utilized in the second period;

correlating and storing the second period and the utilization-data specifying information;

determining that a fifth period obtained by adding a period, which retroacts by a second predetermined period from a start of the first period, to a period obtained by adding a first predetermined period from an end of the first period to the first period overlaps with the second period; and giving a correlation that the utilization data specified by the utilization-data specifying information correlated with the second period is correlated with the interactive communication of the interactive communication unit, in response to the determination that the fifth period overlaps with the second period.

29. A tangible computer storage medium that stores a program of instructions executable by a computer to perform a function for processing information, the computer being connected to an external device having a line communication unit that receives facsimile data transmitted through a public telephone line, an offer unit that offers a first period in which the facsimile data received by the line communication unit are output, and an output unit that outputs the facsimile data, and accessing a third storage unit that stores available utilization data, the function comprising the steps of:

detecting the first period;

storing the first period detected;

utilizing the utilization data stored in the third storage unit;

detecting a second period in which the utilization data are utilized;

specifying utilization-data specifying information that specifies the utilization data which are utilized in the second period;

correlating and storing the second period and the utilization-data specifying information;

determining that the first period and the second period have a period overlapping with each other; and giving a correlation that the utilization data specified by the utilization-data specifying information correlated with the second period is correlated with the reception by the line communication unit, in response to the determination that the first period and the second period have the period overlapping with each other.

30. A tangible computer storage medium that stores a program of instructions executable by a computer to perform a function for processing information, the computer being connected to an external device having a line communication unit that receives facsimile data transmitted through a public telephone line, an offer unit that offers a first period in which the facsimile data received by the line communication unit are output, and an output unit that outputs the facsimile data, and accessing a third storage unit that stores available utilization data, the function comprising the steps of:

detecting the first period;

storing the first period detected;

utilizing the utilization data stored in the third storage unit;

detecting a second period in which the utilization data are utilized;

specifying utilization-data specifying information that specifies the utilization data which are utilized in the second period;

correlating and storing the second period and the utilization-data specifying information;

determining that a third period obtained by adding a predetermined period to the end of the first period and the second period have a period overlapping with each other; and giving a correlation that the utilization data specified by the utilization-data specifying information correlated with the second period is correlated with the reception by the line communication unit, in response to the determination that the third period and the second period have the period overlapping with each other.

31. A tangible computer storage medium that stores a program of instructions executable by a computer to perform a function for processing information, the computer being connected to an external device having a line communication unit that receives PC facsimile data transmitted through a public telephone line and an output unit that outputs the PC facsimile data, and accessing a third storage unit that stores available utilization data, the function comprising the steps of:

the information processing device comprising:
  detecting a fourth period in which the PC facsimile data received by the line communication unit are opened by the information processing device;
  storing the fourth period detected;
  utilizing the utilization data stored in the third storage unit;
  detecting a second period in which the utilization data are utilized;
  specifying utilization-data specifying information that specifies the utilization data which are utilized in the second period;
  correlating and storing the second period and the utilization-data specifying information;
  determining that the fourth period and the second period have a period overlapping with each other; and
  giving a correlation that the utilization data specified by the utilization-data specifying information correlated with the second period is correlated with the reception by the line communication unit, in response to the determination that the fourth period and the second period have the period overlapping with each other.

32. A tangible computer storage medium that stores a program of instructions executable by a computer to perform a function for processing information, the computer being connected to an external device having a line communication unit that receives PC facsimile data transmitted through a public telephone line and an output unit that outputs the PC facsimile data, and accessing a third storage unit that stores available utilization data, the function comprising the steps of:
  the information processing device comprising:
  detecting a fourth period in which the PC facsimile data received by the line communication unit are opened by the information processing device;
  storing the fourth period detected;
  utilizing the utilization data stored in the third storage unit;
  detecting a second period in which the utilization data are utilized;
  specifying utilization-data specifying information that specifies the utilization data which are utilized in the second period;
  correlating and storing the second period and the utilization-data specifying information;
  determining that a fifth period obtained by adding a predetermined period to the end of the fourth period and the second period have a period overlapping with each other; and
  giving a correlation that the utilization data specified by the utilization-data specifying information correlated with the second period is correlated with the reception by the line communication unit, in response to the determination that the fifth period and the second period have the period overlapping with each other.

33. A tangible computer storage medium that stores a program of instructions executable by a computer to perform a function for processing information, the computer being connected to an external device having a line communication unit that receives PC facsimile data transmitted through a public telephone line and an output unit that outputs the PC facsimile data, and accessing a third storage unit that stores available utilization data, the function comprising the steps of:
  detecting a fourth period in which the PC facsimile data received by the line communication unit are opened by the information processing device;
  storing the fourth period detected;
  utilizing the utilization data stored in the third storage unit;
  detecting a second period in which the utilization data are utilized;
  specifying utilization-data specifying information that specifies the utilization data which are utilized in the second period;
  correlating and storing the second period and the utilization-data specifying information;
  determining that the fourth period and the second period have a period overlapping with each other; and
  giving a correlation that the utilization data specified by the utilization-data specifying information correlated with the second period is correlated with the reception by the line communication unit, in response to the determination that the fourth period and the second period have the period overlapping with each other.

34. A tangible computer storage medium that stores a program of instructions executable by a computer to perform a function for processing information, the computer being connected to an external device having a line communication unit that receives PC facsimile data transmitted through a public telephone line and an output unit that outputs the PC facsimile data, and accesses a third storage unit that stores available utilization data, the function comprising the steps of:
  detecting a fourth period in which the PC facsimile data received by the line communication unit are opened by the information processing device;
  storing the fourth period detected;
  utilizing the utilization data stored in the third storage unit;
  detecting a second period in which the utilization data are utilized;
  specifying utilization-data specifying information that specifies the utilization data which are utilized in the second period;
  correlating and storing the second period and the utilization-data specifying information;
  determining that a fifth period obtained by adding a predetermined period to the end of the fourth period and the second period have a period overlapping with each other; and
  giving a correlation that the utilization data specified by the utilization-data specifying information correlated with the second period is correlated with the reception by the line communication unit, in response to the determination that the fifth period and the second period have the period overlapping with each other.

* * * * *